United States Patent
Sagneri et al.

(10) Patent No.: US 11,038,428 B2
(45) Date of Patent: Jun. 15, 2021

(54) MULTI-PATH POWER FACTOR CORRECTION

(71) Applicant: FINsix Corporation, Menlo Park, CA (US)

(72) Inventors: Anthony Sagneri, Palo Alto, CA (US); George Hwang, Cambridge, MA (US); Justin Burkhart, Boston, MA (US); Fred Chen, Boston, MA (US)

(73) Assignee: FINsix Corporation, Menlo Park, CA (US)

(*) Notice: Subject to any disclaimer, the term of this patent is extended or adjusted under 35 U.S.C. 154(b) by 0 days.

(21) Appl. No.: 16/572,536

(22) Filed: Sep. 16, 2019

(65) Prior Publication Data
US 2020/0259420 A1  Aug. 13, 2020

Related U.S. Application Data

(63) Continuation of application No. 14/710,749, filed on May 13, 2015, now abandoned, which is a
(Continued)

(51) Int. Cl.
*H02M 3/335* (2006.01)
*H02M 3/158* (2006.01)
(Continued)

(52) U.S. Cl.
CPC ............. *H02M 3/335* (2013.01); *H02M 1/42* (2013.01); *H02M 1/4241* (2013.01); *H02M 3/07* (2013.01);
(Continued)

(58) Field of Classification Search
CPC ...... H02M 3/335; H02M 1/42; H02M 1/4241; H02M 2001/0058; H02M 2001/0074; H02M 3/285; H02M 3/07
See application file for complete search history.

(56) References Cited

U.S. PATENT DOCUMENTS 5,682,303 A   10/1997  Goad et al.
5,708,573 A   1/1998   Lusher et al.
(Continued)

FOREIGN PATENT DOCUMENTS

CN   1200594 A   12/1998
CN   1383256 A   12/2002
(Continued)

OTHER PUBLICATIONS

Extended European Search Report for European Application No. 11818813.5 dated Mar. 20, 2018.
(Continued)

*Primary Examiner* — Jue Zhang
(74) *Attorney, Agent, or Firm* — Wolf, Greenfield & Sacks, P.C.

(57) ABSTRACT

In an aspect, the present invention provides a high frequency switching power converter. The high frequency switching power converter may include a plurality of soft-switchable power cells flexibly connected to receive an input signal in series and provide an output. The high frequency switching power converter may further include a controller for configuring the flexible connection and for controlling the power cells to receive the input signal. In an embodiment, each of the plurality of power cells may be separately controllable by the controller. Further, a portion of the plurality of power cells may be arranged with parallel outputs. Additionally, at least one of the plurality of cells may include one or more switched capacitors. In another embodiment, the at least one of the plurality of cells may include at least one switched capacitor and a DC/DC regulating converter.

12 Claims, 28 Drawing Sheets

Related U.S. Application Data continuation of application No. 13/213,031, filed on Aug. 18, 2011, now Pat. No. 9,184,660.

(60) Provisional application No. 61/392,329, filed on Oct. 12, 2010, provisional application No. 61/374,993, filed on Aug. 18, 2010, provisional application No. 61/374,998, filed on Aug. 18, 2010.

(51) Int. Cl.
   *H02M 3/28*      (2006.01)
   *H02M 1/42*      (2007.01)
   *H02M 3/07*      (2006.01)
   *H02M 1/00*      (2006.01)

(52) U.S. Cl.
   CPC ......... *H02M 3/158* (2013.01); *H02M 3/1584* (2013.01); *H02M 3/285* (2013.01); *H02M 3/33592* (2013.01); *H02M 2001/007* (2013.01); *H02M 2001/0058* (2013.01); *H02M 2001/0074* (2013.01); *H02M 2001/0077* (2013.01); *Y02B 70/10* (2013.01)

(56) References Cited

U.S. PATENT DOCUMENTS

| | | | |
|---|---|---|---|
| 5,786,992 | A | 7/1998 | Vinciarelli et al. |
| 6,462,969 | B1 | 10/2002 | Sato et al. |
| 6,639,816 | B2 | 10/2003 | Liu |
| 6,930,893 | B2 | 8/2005 | Vinciarelli |
| 7,746,675 | B2 | 6/2010 | Wang et al. |
| 7,852,644 | B2 | 12/2010 | Larson, III |
| 7,889,519 | B2 | 2/2011 | Perreault et al. |
| 8,223,518 | B2 | 7/2012 | Luu |
| 8,300,438 | B1 | 10/2012 | Herbert |
| 8,542,509 | B2 | 9/2013 | Sagneri et al. |
| 8,848,399 | B2 | 9/2014 | Sagneri et al. |
| 9,184,660 | B2 * | 11/2015 | Sagneri ................ H02M 3/158 |
| 9,318,958 | B2 | 4/2016 | Sagneri et al. |
| 9,401,646 | B2 | 7/2016 | Sagneri et al. |
| 2002/0054497 | A1 | 5/2002 | Sato et al. |
| 2003/0142513 | A1 | 7/2003 | Vinciarelli |
| 2003/0227280 | A1 * | 12/2003 | Vinciarelli ............... H02M 3/28 323/265 |
| 2005/0185430 | A1 | 8/2005 | Vinciarelli |
| 2005/0243492 | A1 | 11/2005 | Imamura |
| 2005/0254272 | A1 | 11/2005 | Vinciarelli |
| 2009/0073730 | A1 | 3/2009 | Larson, III |
| 2009/0168475 | A1 | 7/2009 | Hirosawa |
| 2009/0225575 | A1 * | 9/2009 | Vinciarelli ........ H02M 3/33569 363/125 |
| 2012/0069606 | A1 | 3/2012 | Sagneri et al. |
| 2012/0206943 | A1 | 8/2012 | Sagneri et al. |
| 2012/0206946 | A1 | 8/2012 | Sagneri et al. |
| 2012/0217938 | A1 | 8/2012 | Sagneri et al. |
| 2015/0200601 | A1 | 7/2015 | Sagneri et al. |
| 2015/0263627 | A1 | 9/2015 | Sagneri et al. |

FOREIGN PATENT DOCUMENTS

| | | |
|---|---|---|
| CN | 101604913 A | 12/2009 |
| CN | 101720526 A | 6/2010 |
| EP | 1352468 A2 | 10/2003 |
| JP | 2000-277285 A | 10/2000 |
| JP | 2002-315327 A | 10/2002 |
| JP | 2004-215319 A | 7/2004 |
| JP | 2006-187140 A | 7/2006 |
| JP | 2007-195282 A | 8/2007 |
| JP | 2009-159727 A | 7/2009 |
| WO | WO 02/058231 A2 | 7/2002 |
| WO | WO 2012/024542 A2 | 2/2012 |
| WO | WO 2012/024542 A2 | 4/2012 |

OTHER PUBLICATIONS

International Search Report and Written Opinion for International Application No. PCT/US2011/048326 dated Feb. 27, 2012.
Korean Search Report for Korean Application No. KR10-2013-7006799 dated Mar. 2, 2016.
Office Action for Japanese Application No. JP10-2013-7006799 dated Feb. 16, 2016.
Office Action for Korean Application No. KR10-2013-7006799 dated Mar. 9, 2016.
Boonyaroonate et al., Analysis and Design of Class E Isolated dc/dc Converter Using Class E low dv/dt PWM Synchronous Rectifier. IEEE 32nd Annual Power Electronics Specialists Conference. Jun. 2001;1:404-409.
Boonyaroonate et al., Analysis and Design of Class E Isolated DC/DC Converter Using Class E Low dv/dt PWM Synchronous Rectifier. IEEE Transactions on Power Electronics. Jul. 2001;16(4):514-521.
Boonyaroonate et al., Class E isolated dc-dc converter using PWM synchronous rectifier. 2000 IEEE International Symposium on Circuits and Systems (ISCAS). May 28, 2000;1:252-255.
Glaser et al., A 900W, 300V to 50V Dc-dc power converter with a 30MHz switching frequency. 2009 Twenty-Fourth Annual IEEE Applied Power Electronics Conference and Exposition. Feb. 15, 2009:1121-1128.
Jha et al., Parallel power flow AC/DC converter with high input power factor and tight output voltage regulation for universal voltage application. 2006 International Conference on Power Electronic, Drives and Energy Systems. Dec. 12, 2006:1-7.
Kazimierczuk et al., Class E Low dv / dt Synchronous Rectifier with Controlled Duty Ratio and Output Voltage. IEEE Transactions on Circuits and Systems. Oct. 1991;38(10):1165-1172.
Nemati et al., Design of varactor-based tunable matching networks for dynamic load modulation of high power amplifiers. IEEE Transactions on Microwave Theory and Techniques. Apr. 14, 2009;57(5):1110-8.
Suetsugu et al., Feasibility Study of On-Chip Class E DC-DC Converter. IEEE International Symposium on Circuits and Systems. May 25, 2003;3:443-446.
EP 11818813.5, dated Mar. 20, 2018, Extended European Search Report.
KR10-2013-7006799, dated Mar. 2, 2016, Korean Search Report.
PCT/US2011/048326, dated Feb. 27, 2012, International Search Report.

\* cited by examiner

Figure 2: An implementation of the disclosed PFC architecture.

MULTI-PATH POWER FACTOR CORRECTION

CROSS-REFERENCE TO RELATED APPLICATIONS

This application is a continuation of U.S. Ser. No. 14/710,749, filed May 13, 2015, which is a continuation of U.S. Ser. No. 13/213,031, filed Aug. 18, 2011, which claims the benefit of the following provisional applications: U.S. Ser. No. 61/374,993 filed Aug. 18, 2010; U.S. Ser. No. 61/374,998 filed Aug. 18, 2010; and U.S. Ser. No. 61/392,329 filed Oct. 12, 2010. Each of the above-identified applications is hereby incorporated by reference in its entirety.

BACKGROUND OF THE INVENTION

Field

The methods and systems described herein relate to very high frequency power conversion technology, techniques, methods, applications, and systems.

Description of the Related Art

Increasing the switching frequency of a switched-mode power supply (SMPS) is a goal that is widely sought after as a means to increase power density and improve transient performance. However, increasing switching frequency using conventional power converter topologies (boost, buck, flyback, etc.) results with significantly degraded efficiency. Additionally, as switching frequency is increased, power density only increases until an optimal switching frequency is reached, at which point power density begins to decrease again. Therefore, conventional solutions appear to be lacking to satisfy demand.

SUMMARY OF THE INVENTION

The methods and systems described herein may comprise a next-generation very high frequency (VHF, 30-300 MHz) power supply architecture using chip-scale components. Fundamental technology and methods of VHF conversion and exemplary benefits for solid-state lighting applications and the like are outlined herein in light of several enhancements enabled by the methods and systems described herein. Further applications of the core VHF converter architecture, both AC-DC and DC-DC are enumerated in the figures and associated descriptions. Together these elements provide both a description of the basic innovations and methods and a range of useful and beneficial applications for those innovations.

In the case of line-connected LED drivers, which are AC-DC converters for general illumination applications, the benefits are several including a greater than 10-fold reduction in volume, much lower cost, higher reliability, a high degree of integration, high efficiency and very fast transient response. Taken together these characteristics form the basis for a useful array of LED driver systems suitable for both retrofit lamps, such as A19, MR16, GU10, and various PAR forms, as well as in solid-state luminaires. However, applications of the inventive very high frequency chip-scale power supply architecture are not limited to LED and/or solid state drivers. This technology may be used in any application that can benefit from the several benefits described herein.

The unique characteristics of the VHF power supply architecture described herein enables power converters with very high power density, high performance, and high transient response while utilizing very few components. This enables applications in many spaces, such as Solid State Lighting and portable mobile devices, where size and cost are of key concern, and military and industrial applications where the highest power densities and improved reliability due to simpler and fewer components are of interest. One exemplary application is radar, particularly air-intercept radar on fighter jets, where size, weight, and transient performance are key attributes. Present power converter systems require large and heavy capacitor banks to sustain transients demanded by the radar under transmit. By utilizing the invention described herein, these capacitors no longer need to be sized by transient considerations, rather ripple alone. This allows a dramatic reduction in bulk energy storage in combination with the reduction in the main power stage. This set of features will offer a clear advantage in such high-performance military applications.

In the retrofit lamp space the needs are several: foremost is the requirement for low cost, nearly as important is small size, while high-performance (efficiency), high-reliability, and a full range of functionality are all of keen interest depending on the particular lamp type and intended target market. In each case, the existing power converter technology falls short of desired characteristics necessary to propel SSL lamps to commercial success. The inventive technology described herein in this area addresses each of these shortfalls and offers a compelling package to a lamp maker.

In an aspect, the present invention provides a high frequency switching power converter. The high frequency switching power converter may include a plurality of soft-switchable power cells flexibly connected to receive an input signal in series and provide an output. The high frequency switching power converter may further include a controller for configuring the flexible connection and for controlling the power cells to receive the input signal. In an embodiment, each of the plurality of power cells may be separately controllable by the controller. Further, a portion of the plurality of power cells may be arranged with parallel outputs. Additionally, at least one of the plurality of cells may include one or more switched capacitors. In another embodiment, the at least one of the plurality of cells may include at least one switched capacitor and a DC/DC regulating converter.

The high frequency switching power converter may also include an output stage for receiving outputs from the portion of the plurality of power cells to provide a combined output and for delivering the combined output to a load. The output stage may include at least one transformer with multiple primary windings. Further, each of the multiple primary windings may receive an output from one of the plurality of power cells. The output stage may further include a plurality of capacitors, an input of each of which may be connected to an output from one of the plurality of cells. Further, an output of each of the plurality of capacitors may be connected in parallel for providing the combined output. In an embodiment, the output stage may facilitate configuring a parallel output combination of the plurality of power cells. The DC/DC regulating converter may be disposed between the at least one switched capacitor and the output stage.

In an embodiment, the high frequency switching power converter may include a plurality of sets of stacked cells each set providing at least one output. Further, a portion of the plurality of sets of stacked cells may be configured to provide parallel outputs. The high frequency switching power converter may further include PCB etched inductors and/or transformers with or without magnetic core material, varactor controlled network tuning, resonant switching, and the like. In another embodiment, the high frequency switching power converter may be adapted for use with a laptop, may be integrated into a display screen module, may be integrated into an AC line power cord assembly, may be adapted for use with a mobile phone, may be integrated into a wireless base station, may be integrated into an electrical vehicle, may be adapted for use with airborne radar, and the like.

In another aspect, the present invention provides a stacked cell switching power converter. The stacked cell switching power converter may include a plurality of stacked power cells flexibly connected to receive a DC input signal in series and may provide a DC output. The stacked cell switching power converter may also include a controller for configuring the flexible connection. The controller may control the plurality of stacked power cells to receive the DC input signal, and may facilitate resonant switching. Further, the stacked cell switching power converter may include an output stage for combining an output from each of a portion of the plurality of stacked power cells to deliver a combined DC output to a load.

In an embodiment, the stacked cell switching power converter may include PCB etched inductors and/or transformers with or without magnetic core material, varactor controlled network tuning, resonant switching, and the like. In another embodiment, the stacked cell switching power converter may be adapted for use with a laptop, may be integrated into a display screen module, may be integrated into an AC line power cord assembly, may be adapted for use with a mobile phone, may be integrated into a wireless base station, may be integrated into an electrical vehicle, may be adapted for use with airborne radar, and the like.

In yet another aspect, the present invention provides a stacked cell soft-switchable power converter. The stacked cell soft-switchable power converter may include a plurality of stacked power cells flexibly connected to receive an input signal and provide an output. Further, the stacked cell soft-switchable power converter may include a controller for configuring the flexible connection. The controller may control the plurality of stacked power cells to receive the input signal, and may facilitate power cell soft switching. The stacked cell soft-switchable power converter may also include an output stage for receiving an output from each of a portion of the plurality of stacked power cells and for delivering a combined output to a load.

In an embodiment, the stacked cell soft-switchable power converter may include PCB etched inductors and/or transformers with or without magnetic core material, varactor controlled network tuning, resonant switching, and the like. In another embodiment, the stacked cell soft-switchable power converter may be adapted for use with a laptop, may be integrated into a display screen module, may be integrated into an AC line power cord assembly, may be adapted for use with a mobile phone, may be integrated into a wireless base station, may be integrated into an electrical vehicle, may be adapted for use with airborne radar, and the like.

In still another aspect, the present invention provides a silicon-based stacked-cell switching power converter. The silicon-based stacked-cell switching power converter may include a plurality of silicon power cells configured in a series stack to receive an input signal with a peak amplitude greater than 50V and to provide an output from each of the plurality of silicon power cells. The silicon-based stacked-cell switching power converter may further include a controller for controlling the plurality of silicon power cells to receive the input signal. The controller may facilitate switching the silicon-based stacked-cell switching power converter at a frequency in excess of 5 MHz. In addition, the silicon-based stacked-cell switching power converter may include an output stage for receiving an output from a portion of the plurality of silicon power cells and for delivering a combined output to a load.

In an embodiment, the silicon-based stacked-cell switching power converter may include PCB etched inductors and/or transformers with or without magnetic core material, varactor controlled network tuning, resonant switching, and the like. In another embodiment, the silicon-based stacked-cell switching power converter may be adapted for use with a laptop, may be integrated into a display screen module, may be integrated into an AC line power cord assembly, may be adapted for use with a mobile phone, may be integrated into a wireless base station, may be integrated into an electrical vehicle, may be adapted for use with airborne radar, and the like.

In yet another aspect, the present invention provides a low power density stacked-cell switching power converter. The low power density stacked-cell switching power converter may include a plurality of power cells configured to receive an input signal with a peak amplitude greater than 50V in series and to provide an output. Further, the low power density stacked-cell switching power converter may include a controller for configuring the plurality of power cells to receive the input signal. The controller may facilitate switching the low power density stacked-cell switching power converter at a frequency in excess of 5 MHz. The low power density stacked-cell switching power converter may also include an output stage for receiving an output from a portion of the plurality of power cells and for delivering a combined output to a load. In an embodiment, the low power density stacked-cell switching power converter may provide power density that may be lower than power density provided by a single cell power converter providing a substantially identical function.

In an embodiment, the low power density stacked-cell switching power converter may include PCB etched inductors and/or transformers with or without magnetic core material, varactor controlled network tuning, resonant switching, and the like. In another embodiment, the low power density stacked-cell switching power converter may be adapted for use with a laptop, may be integrated into a display screen module, may be integrated into an AC line power cord assembly, may be adapted for use with a mobile phone, may be integrated into a wireless base station, may be integrated into an electrical vehicle, may be adapted for use with airborne radar, and the like.

In still another aspect, the present invention provides a stacked-silicon cell switching power converter. The stacked-silicon cell switching power converter may include a plurality of silicon power converter cells configured in a series stack to receive an input signal with a peak amplitude greater than 50V and to provide a plurality of outputs. Further, the stacked-silicon cell switching power converter may include a controller for controlling the plurality of silicon power converter cells to ensure that no silicon power converter cell receives an input signal in excess of 60V. The controller may facilitate switching the stacked-silicon cell switching power converter at a frequency in excess of 5 MHz. In addition, the stacked-silicon cell switching power converter may include an output stage for combining an output from each of a portion of the plurality of silicon power converter cells to deliver a combined output to a load.

In an embodiment, the stacked-silicon cell switching power converter may include PCB etched inductors and/or transformers with or without magnetic core material, varactor controlled network tuning, resonant switching, and the like. In another embodiment, the stacked-silicon cell switching power converter may be adapted for use with a laptop, may be integrated into a display screen module, may be integrated into an AC line power cord assembly, may be adapted for use with a mobile phone, may be integrated into a wireless base station, may be integrated into an electrical vehicle, may be adapted for use with airborne radar, and the like.

In yet another aspect, the present invention provides a stacked-silicon cell switching power converter. The stacked-silicon cell switching power converter may include a plurality of silicon power converter cells configured in a series stack to receive an input signal with a peak amplitude greater than 50V and to provide a plurality of outputs. The stacked-silicon cell switching power converter may further include a controller for controlling the plurality of silicon power converter cells to ensure that no silicon power converter cell receives an input signal less than 20V nor in excess of 60V. The controller may facilitate switching the stacked-silicon cell switching power converter at a frequency in excess of 5 MHz. The stacked-silicon cell switching power converter may also include an output stage for combining an output from each of a portion of the plurality of silicon power converter cells to deliver a combined output to a load.

In an embodiment, the stacked-silicon cell switching power converter may include PCB etched inductors and/or transformers with or without magnetic core material, varactor controlled network tuning, resonant switching, and the like. In another embodiment, the stacked-silicon cell switching power converter may be adapted for use with a laptop, may be integrated into a display screen module, may be integrated into an AC line power cord assembly, may be adapted for use with a mobile phone, may be integrated into a wireless base station, may be integrated into an electrical vehicle, may be adapted for use with airborne radar, and the like.

In still another aspect, the present invention provides a VHF power converter. The VHF power converter may include a switched capacitor stage. The switched capacitor stage may include a plurality of switched capacitors for dividing the input voltage among the plurality of capacitors. The VHF power converter may further include a bypass switch. The bypass switch may select between the input voltage and an output of the switched capacitor stage. Further, a control of the bypass switch may be based on the input voltage. The VHF power converter may also include a VHF regulating stage for converting an input voltage to an output voltage. The switched capacitor stage may be followed by the by-pass switch that may be further connected to the VHF regulating stage.

In an embodiment, the VHF power converter may include PCB etched inductors and/or transformers with or without magnetic core material, varactor controlled network tuning, resonant switching, and the like. In another embodiment, the VHF power converter may be adapted for use with a laptop, may be integrated into a display screen module, may be integrated into an AC line power cord assembly, may be adapted for use with a mobile phone, may be integrated into a wireless base station, may be integrated into an electrical vehicle, may be adapted for use with airborne radar, and the like.

In another aspect, the present invention provides a method of controlling average power delivered from a VHF power converter to an auxiliary output. The method may include rectifying AC power that may be generated from an inverter of the VHF power converter and providing it to an auxiliary power port in a first phase. The auxiliary power port may be used to supply the power required to drive gates of one or more powered devices. In an embodiment, the powered device may be an LED-based lighting unit. The auxiliary power port may also be used to provide power to a portion of the VHF power converter.

The method may further include generating AC power from the auxiliary power port and providing it to the VHF power converter in a second phase. Switching between generating auxiliary power in the first phase to generating AC power in the second phase may be controlled to facilitate controlling an average power delivered from the VHF power converter. In an embodiment, the method may further include controlling the auxiliary rectifier in an auxiliary power control loop that may be independent of a control loop of the VHF power converter for providing power to a load. In embodiments, the auxiliary power control loop may be a feed forward control loop.

In another aspect, the present invention provides a method. The method may include receiving a varying input voltage signal to be applied to a plurality of series stacked high frequency power converter cells. The plurality of series stacked high frequency power converter cells for producing an output from the varying input voltage signal. In an embodiment, the varying input voltage signal may be an AC line signal. Further, the output may be a DC voltage, a fixed current, and the like. In an embodiment, individual cells of the plurality of series stacked high frequency power converter cells may be activated at different determined amplitudes as the amplitude of the varying input voltage signal varies. The individual cells of the plurality of series stacked high frequency power converter cells may be deactivated at different amplitudes as the determined amplitude of the varying input voltage signal decreases. Further, the individual cells of the plurality of series stacked high frequency power converter cells may be bypassed at different determined amplitudes as the determined amplitude of the varying input voltage signal decreases.

In another embodiment, each of the plurality of series stacked high frequency power converter cells may be separately controllable. Also, a portion of the plurality of series stacked high frequency power converter cells may be arranged with parallel outputs. At least one of the plurality of series stacked high frequency power converter cells may include one or more switched capacitors. Further, at least one of the plurality of series stacked high frequency power converter cells may include at least one switched capacitor and a DC/DC regulating converter. The DC/DC regulating converter may be disposed in series with the at least one switched capacitor.

The method may further include determining an amplitude of the varying input voltage signal. The method may also include controlling the series stacked high frequency power converter cells to produce the output based on the amplitude of the varying input voltage signal. The controlling may include soft switching of the plurality of series stacked high frequency power converter cells. Further, the controlling may be based on an instantaneous amplitude of the varying input voltage signal, a local average of the varying input voltage signal, and the like.

In an embodiment, the controlling may include operating at least one high frequency power converter cell bypass function for the plurality of series stacked high frequency power converter cells. The controlling may further include maintaining efficiency of the plurality of series stacked high frequency power converter cells above a minimum efficiency threshold. In another embodiment, the minimum efficiency threshold may be seventy percent, seventy-five percent, eighty percent, and the like. In addition, the controlling may include passive switched capacitor voltage balancing. The method may further include an output stage that may facilitate configuring a parallel output combination of the plurality of series stacked high frequency power converter cells.

In yet another aspect, the present invention provides a method. The method may include receiving a varying input voltage signal to be applied to a plurality of series stacked high frequency power converter cells. The plurality of series stacked high frequency power converter cells for producing an output from the varying input voltage signal. In an embodiment, the varying input voltage signal may be an AC line signal. Further, the output may be a DC voltage, a fixed current, and the like. In an embodiment, individual cells of the plurality of series stacked high frequency power converter cells may be activated at different determined amplitudes as the amplitude of the varying input voltage signal varies. The individual cells of the plurality of series stacked high frequency power converter cells may be deactivated at different amplitudes as the determined amplitude of the varying input voltage signal decreases. Further, the individual cells of the plurality of series stacked high frequency power converter cells may be bypassed at different determined amplitudes as the determined amplitude of the varying input voltage signal decreases.

In another embodiment, each of the plurality of series stacked high frequency power converter cells may be separately controllable. Also, a portion of the plurality of series stacked high frequency power converter cells may be arranged with parallel outputs. At least one of the plurality of series stacked high frequency power converter cells may include one or more switched capacitors. Further, at least one of the plurality of series stacked high frequency power converter cells may include at least one switched capacitor and a DC/DC regulating converter. The DC/DC regulating converter may be disposed in series with the at least one switched capacitor.

The method may further include determining an amplitude of the varying input voltage signal. The method may also include controlling the series stacked high frequency power converter cells to produce the output based on the amplitude of the varying input voltage signal. The controlling may include soft switching of the plurality of series stacked high frequency power converter cells. Further, the controlling may be based on an instantaneous amplitude of the varying input voltage signal, a local average of the varying input voltage signal, and the like.

In an embodiment, the controlling may include operating at least one high frequency power converter cell bypass function for the plurality of series stacked high frequency power converter cells. The controlling may further include maintaining efficiency of the plurality of series stacked high frequency power converter cells above a minimum efficiency threshold. In another embodiment, the minimum efficiency threshold may be seventy percent, seventy-five percent, eighty percent, and the like. In addition, the controlling may include passive switched capacitor voltage balancing. The method may further include an output stage that may facilitate configuring a parallel output combination of the plurality of series stacked high frequency power converter cells. In an embodiment, the requirement of the output may be a current requirement, a voltage requirement, a ripple requirement, a power requirement, an isolation requirement, and the like.

In still another aspect, the present invention provides a method. The method may include receiving a varying input voltage signal to be applied to a plurality of series stacked high frequency power converter cells. The plurality of series stacked high frequency power converter cells for producing an output from the varying input voltage signal. In an embodiment, the varying input voltage signal may be an AC line signal. Further, the output may be a DC voltage, a fixed current, and the like. In an embodiment, individual cells of the plurality of series stacked high frequency power converter cells may be activated at different determined amplitudes as the amplitude of the varying input voltage signal varies. The individual cells of the plurality of series stacked high frequency power converter cells may be deactivated at different amplitudes as the determined amplitude of the varying input voltage signal decreases. Further, the individual cells of the plurality of series stacked high frequency power converter cells may be bypassed at different determined amplitudes as the determined amplitude of the varying input voltage signal decreases.

In another embodiment, each of the plurality of series stacked high frequency power converter cells may be separately controllable. Also, a portion of the plurality of series stacked high frequency power converter cells may be arranged with parallel outputs. At least one of the plurality of series stacked high frequency power converter cells may include one or more switched capacitors. Further, at least one of the plurality of series stacked high frequency power converter cells may include at least one switched capacitor and a DC/DC regulating converter. The DC/DC regulating converter may be disposed in series with the at least one switched capacitor.

The method may further include determining an amplitude of the varying input voltage signal. The method may also include controlling the series stacked high frequency power converter cells to produce the output based on the amplitude of the varying input voltage signal. The controlling may include soft switching of the plurality of series stacked high frequency power converter cells. Further, the controlling may be based on an instantaneous amplitude of the varying input voltage signal, a local average of the varying input voltage signal, and the like.

In an embodiment, the controlling may include operating at least one high frequency power converter cell bypass function for the plurality of series stacked high frequency power converter cells. The controlling may further include maintaining efficiency of the plurality of series stacked high frequency power converter cells above a minimum efficiency threshold. In another embodiment, the minimum efficiency threshold may be seventy percent, seventy-five percent, eighty percent, and the like. In addition, the controlling may include passive switched capacitor voltage balancing. The method may further include an output stage that may facilitate configuring a parallel output combination of the plurality of series stacked high frequency power converter cells. Further, the feedback may be a measure of output current.

In yet another aspect, the present invention provides a method. The method may include receiving a varying input voltage signal to be applied to a plurality of series stacked high frequency power converter cells. The plurality of series stacked high frequency power converter cells for producing an output. The input voltage may be greater than that which may be sustainable by any one of the plurality of cells. In an embodiment, the varying input voltage signal may be an AC line signal. Further, the output may be a DC voltage, a fixed current, and the like. In an embodiment, individual cells of the plurality of series stacked high frequency power converter cells may be activated at different determined amplitudes as the amplitude of the varying input voltage signal varies. The individual cells of the plurality of series stacked high frequency power converter cells may be deactivated at different amplitudes as the determined amplitude of the varying input voltage signal decreases. Further, the individual cells of the plurality of series stacked high frequency power converter cells may be bypassed at different determined amplitudes as the determined amplitude of the varying input voltage signal decreases.

In another embodiment, each of the plurality of series stacked high frequency power converter cells may be separately controllable. Also, a portion of the plurality of series stacked high frequency power converter cells may be arranged with parallel outputs. At least one of the plurality of series stacked high frequency power converter cells may include one or more switched capacitors. Further, at least one of the plurality of series stacked high frequency power converter cells may include at least one switched capacitor and a DC/DC regulating converter. The DC/DC regulating converter may be disposed in series with the at least one switched capacitor.

The method may also include controlling the series stacked high frequency power converter cells distribute the input voltage among a portion of the plurality of power converter cells so that no cell may receive a portion of the input that exceeds that which may be sustainable by the cell. The controlling may include soft switching of the plurality of series stacked high frequency power converter cells. Further, the controlling may be based on an instantaneous amplitude of the varying input voltage signal, a local average of the varying input voltage signal, and the like.

In an embodiment, the controlling may include operating at least one high frequency power converter cell bypass function for the plurality of series stacked high frequency power converter cells. The controlling may further include maintaining efficiency of the plurality of series stacked high frequency power converter cells above a minimum efficiency threshold. In another embodiment, the minimum efficiency threshold may be seventy percent, seventy-five percent, eighty percent, and the like. In addition, the controlling may include passive switched capacitor voltage balancing. The method may further include an output stage that may facilitate configuring a parallel output combination of the plurality of series stacked high frequency power converter cells. Further, each cell of the plurality of cells may be silicon-based.

In another aspect, the present invention provides a method. The method may include receiving a varying input voltage signal to be applied to a plurality of series stacked high frequency power converter cells. The plurality of series stacked high frequency power converter cells for producing an output from the varying input voltage signal. In an embodiment, the varying input voltage signal may be an AC line signal. Further, the output may be a DC voltage, a fixed current, and the like. In an embodiment, individual cells of the plurality of series stacked high frequency power converter cells may be activated at different determined amplitudes as the amplitude of the varying input voltage signal varies. The individual cells of the plurality of series stacked high frequency power converter cells may be deactivated at different amplitudes as the determined amplitude of the varying input voltage signal decreases. Further, the individual cells of the plurality of series stacked high frequency power converter cells may be bypassed at different determined amplitudes as the determined amplitude of the varying input voltage signal decreases.

In another embodiment, each of the plurality of series stacked high frequency power converter cells may be separately controllable. Also, a portion of the plurality of series stacked high frequency power converter cells may be arranged with parallel outputs. At least one of the plurality of series stacked high frequency power converter cells may include one or more switched capacitors. Further, at least one of the plurality of series stacked high frequency power converter cells may include at least one switched capacitor and a DC/DC regulating converter. The DC/DC regulating converter may be disposed in series with the at least one switched capacitor.

The method may further include determining an average of the output voltage. The method may also include synchronously controlling the series stacked high frequency power converter cells to produce the output from the varying input voltage based on the determined average. The controlling may include soft switching of the plurality of series stacked high frequency power converter cells. Further, the controlling may be based on an instantaneous amplitude of the varying input voltage signal, a local average of the varying input voltage signal, and the like.

In an embodiment, the controlling may include operating at least one high frequency power converter cell bypass function for the plurality of series stacked high frequency power converter cells. The controlling may further include maintaining efficiency of the plurality of series stacked high frequency power converter cells above a minimum efficiency threshold. In another embodiment, the minimum efficiency threshold may be seventy percent, seventy-five percent, eighty percent, and the like. In addition, the controlling may include passive switched capacitor voltage balancing. The method may further include an output stage that may facilitate configuring a parallel output combination of the plurality of series stacked high frequency power converter cells.

In another aspect, the present invention provides a method. The method may include receiving a single input voltage signal into a soft-switched high frequency power converter. The soft-switched high frequency power converter may produce a plurality of output values. The plurality of output values may be individually controllable. Further, the plurality of output values may be individually selected from a current output value and a voltage output value. In an embodiment, the single input voltage signal may be an AC input, a DC input, a fixed voltage, a varying voltage, and the like. The method may further include controlling the soft-switched high frequency power converter to produce a first output during a first time interval for a first load and a second output during a second time interval for a second load. The method may also include providing at least one load isolation control signal to facilitate bypassing the second load during the first time interval and bypassing the first load during the second time interval.

In an embodiment, the first output may be one of a current and a voltage. Further, the first output may be regulated during the first time interval. In another embodiment, the second output may be one of a current and a voltage. Further, the second output may be regulated during the second time interval. In embodiments, the voltage output during at least one of the first and second time intervals may be a substantially fixed voltage. Further, each portion of the load may receive a different output voltage, a substantially fixed current, a different current, and the like. Power from the single input voltage signal may be time-division-multiplexed among the outputs. In addition, at least one of the first load and the second load may be a portion of a string of LEDs. Also, the output provided during each time interval may drive separate LEDs to facilitate achieving a substantially constant color temperature light output.

In yet another aspect, the present invention provides a method. The method may include receiving a single input voltage signal into a soft-switched high frequency power converter including a plurality of series stacked high frequency power converter cells. The soft-switched high frequency power converter may produce a plurality of output values. Each of the plurality of series stacked high frequency power converter cells may be separately controllable. Further, a portion of the plurality of series stacked high frequency power converter cells may be arranged with parallel outputs. In an embodiment, at least one of the plurality of series stacked high frequency power converter cells may include one or more switched capacitors. In another embodiment, the at least one of the plurality of series stacked high frequency power converter cells may include at least one switched capacitor and a DC/DC regulating converter. The DC/DC regulating converter may be disposed in series with the at least one switched capacitor.

The method may further include controlling the soft-switched high frequency power converter cells to produce a first output during a first time interval for a first load and a second output during a second time interval for a second load. The method may also include providing at least one load isolation control signal to facilitate bypassing the second load during the first time interval and bypassing the first load during the second time interval. The controlling may include soft switching of the plurality of series stacked high frequency power converter cells. The controlling may also include operating at least one high frequency power converter cell bypass function for the plurality of series stacked high frequency power converter cells.

Further, the controlling may include maintaining efficiency of the plurality of series stacked high frequency power converter cells above a minimum efficiency threshold. In an embodiment, the minimum efficiency threshold may be seventy percent, seventy-five percent, eighty percent, and the like. The controlling may further include passive switched capacitor voltage balancing. In an embodiment, the method may include an output stage that may facilitate configuring a parallel output combination of the plurality of series stacked high frequency power converter cells.

In an embodiment, the first output may be one of a current and a voltage. The first output may be regulated during the first time interval. In another embodiment, the second output may be one of a current and a voltage. The second output may be regulated during the second time interval. Further, the plurality of output values may be individually controllable. The plurality of output values may be individually selected from a current output value and a voltage output value. In an embodiment, the single input voltage signal may be an AC input, a DC input, a fixed voltage, a varying voltage, and the like.

In another embodiment, the voltage output during at least one of the first and second time intervals may be a substantially fixed voltage. Further, each portion of the loads may receive a different output voltage, a substantially fixed current, a different current, and the like. At least one of the first load and the second load may be a portion of a string of LEDs. The output provided during each time interval may drive separate LEDs to facilitate achieving a substantially constant color temperature light output.

In still another aspect, the present invention provides a method. The method may include receiving a single input voltage signal into a soft-switched high frequency power converter for producing a plurality of output values on an output port. The method may further include controlling the soft-switched high frequency power converter to produce a first output during a first time interval and a second output during a second time interval. The controlling may include maintaining efficiency of the soft-switched high frequency power converter above a minimum efficiency threshold. In an embodiment, the minimum efficiency threshold may be seventy percent, seventy-five percent, eighty percent, and the like. The controlling may further include passive switched capacitor voltage balancing. In an embodiment, the first output may be one of a current and a voltage. The first output may be regulated during the first time interval. In another embodiment, the second output may be one of a current and a voltage. The second output may be regulated during the second time interval.

Further, the plurality of output values may be individually controllable. The plurality of output values may be individually selected from a current output value and a voltage output value. The single input voltage signal may be an AC input, a DC input, a fixed voltage, a varying voltage, and the like. The voltage output during at least one of the first and second time intervals may be a substantially fixed voltage. The method may also include connecting a string of LEDs substantially in parallel to the output port. The string of LEDs may be configured so that a first portion of the LEDs may be controllable to form a circuit with the soft-switched high frequency power converter during the first time interval and a second portion of the LEDs may be controllable to form a circuit with the soft-switched high frequency power converter during the second time interval to facilitate achieving substantially constant color temperature light.

Further, each LED in the string of LEDs may receive a different output voltage, a substantially fixed current, a different current, and the like. In addition, power from the single input voltage signal may be time-division-multiplexed among the outputs. The soft-switched high frequency power converter may employ time-division-multiplexing of the output port.

In another aspect, the present invention provides a method. The method may include receiving a single input voltage signal into a soft-switched high frequency power converter for producing a plurality of output values on an output port. The method may further include controlling the soft-switched high frequency power converter to output a first output during a first time interval for a first motherboard circuit load and a second output during a second time interval for a second motherboard circuit load. The controlling may include maintaining efficiency of the plurality of soft-switched high frequency power converter above a minimum efficiency threshold. In an embodiment, the minimum efficiency threshold may be seventy percent, seventy-five percent, eighty percent, and the like.

The controlling may further include passive switched capacitor voltage balancing. In an embodiment, the first output may be one of a current and a voltage. The first output may be regulated during the first time interval. In another embodiment, the second output may be one of a current and a voltage. The second output may be regulated during the second time interval. Further, the plurality of output values may be individually controllable. The plurality of output values may be individually selected from a current output value and a voltage output value. In an embodiment, the single input voltage signal may be an AC input, a DC input, a fixed voltage, a varying voltage, and the like.

Further, the voltage output during at least one of the first and second time intervals may be a substantially fixed voltage. The method may also include providing at least one output to facilitate disconnecting the second motherboard circuit load from the converter during the first time interval and disconnecting the first motherboard circuit load from the soft-switched high frequency power converter during the second time interval. In an embodiment, the first motherboard circuit load and the second motherboard circuit load may receive a different output voltage, a substantially fixed current, a different current, and the like. In addition, power from the single input voltage signal may be time-division-multiplexed among the outputs.

In yet another aspect, the present invention provides a method. The method may include receiving a single input voltage signal into a soft-switched high frequency power converter for producing a plurality of voltages on an output. The method may further include connecting at least one color changing LED to the output. The method may also include controlling the soft-switched high frequency power converter to produce a first color out of the at least one color changing LED during a first time interval and a second color during a second time interval. Further, the controlling may include maintaining efficiency of the soft-switched high frequency power converter above a minimum efficiency threshold. In an embodiment, the minimum efficiency threshold may be seventy percent, seventy-five percent, eighty percent, and the like. The controlling may further include passive switched capacitor voltage balancing.

In an embodiment, the first color may be regulated during the first time interval. In another embodiment, the second color may be regulated during the second time interval. The plurality of voltages may be individually controllable. The plurality of voltages may be individually selected from a current output value and a voltage output value. In an embodiment, the single input voltage signal may be an AC input, a DC input, a fixed voltage, a varying voltage, and the like. Further, the voltage output during at least one of the first and second time intervals may be a substantially fixed voltage.

In embodiments, each LED in the at least one color changing LED may receive a different output voltage, a substantially fixed current, a different current, and the like. In addition, power from the single input voltage signal may be time-division-multiplexed among the outputs. Further, the soft-switched high frequency power converter may employ time-division-multiplexing of the output port.

In another aspect, the present invention provides a system. The system may include a VHF power converter adapted for driving an LED-based light. The VHF power converter may include at least one soft-switched power converter cell and at least one inductor. Each inductor may include an inductance value no greater than one micro henry. In an embodiment, the at least one inductor may be a PCB etch-based inductor. Further, the at least one soft-switched power converter cell may be silicon-based. The at least one soft-switched power converter cell may switch at greater than 5 MHz.

In yet another aspect, the present invention provides a system. The system may include a VHF power converter adapted for driving an LED-based light. The power converter may include at least one soft-switched power converter cell and at least one inductor. Each inductor may include an inductance value no greater than five micro henries. In an embodiment, the at least one inductor may be a PCB etch-based inductor. Further, the at least one soft-switched power converter cell may be silicon-based. The at least one soft-switched power converter cell may switch at greater than 5 MHz.

In still another aspect, the present invention provides a system. The system may include a high efficiency VHF power converter adapted for driving an LED-based light. The power converter may include at least one soft-switched power converter cell and a plurality of electronic components. Further, none of the plurality of electronic components may have an inductance value greater than one micro henry. In an embodiment, the at least one inductor may be a PCB etch-based inductor. Further, the at least one soft-switched power converter cell may be silicon-based. The at least one soft-switched power converter cell may switch at greater than 5 MHz.

In another aspect, the present invention provides a system. The system may include a stacked-cell, high efficiency, soft-switched AC to DC power converter. The power converter may include at least one soft-switched power converter cell and a plurality of electronic components. Further, none of the plurality of electronic components may have an inductance value greater than one micro henry. Further, the at least one soft-switched power converter cell may be silicon-based. The at least one soft-switched power converter cell may switch at greater than 5 MHz.

In another aspect, the present invention provides a system. The system may include a high efficiency, soft-switched power converter for converting line AC to DC. The power converter may include a plurality of electronic components. Further, none of the plurality of electronic components may have an inductance value greater than five micro henries. Further, the at least one soft-switched power converter cell may be silicon-based. The at least one soft-switched power converter cell may switch at greater than 5 MHz.

In yet another aspect, the present invention provides a stacked cell switching power converter. The stacked cell switching power converter may include a plurality of stacked power cells flexibly connected to receive an AC input signal in series and provide a DC output. The stacked cell switching power converter may further include a controller for configuring the plurality of stacked power cells and the flexible connection to receive the DC input signal and for facilitating fully resonant switching. The stacked cell switching power converter may also include one or more output synchronous rectifiers for receiving an output from each of a portion of the plurality of stacked power cells in parallel and for delivering a combined DC output to a load. Further, each of the plurality of stacked power cells may be separately controllable. In an embodiment, a portion of the plurality of stacked power cells may be arranged with parallel outputs.

The stacked cell switching power converter may further include an output stage that may facilitate configuring a parallel output combination of the plurality of stacked power cells. Further, at least one of the plurality of stacked power cells may include one or more switched capacitors. At least one of the plurality of stacked power cells may include at least one switched capacitor and a DC/DC regulating converter. The DC/DC regulating converter may be disposed in series with the at least one switched capacitor.

In an embodiment, the controlling may include soft switching of the plurality of stacked power cells. The controlling may further include operating at least one power cell bypass function for the plurality of stacked power cells.

The controlling may also include maintaining converter efficiency above a minimum efficiency threshold. In another embodiment, the minimum efficiency threshold may be seventy percent, seventy-five percent, eighty percent, and the like. Further, the controlling may include passive switched capacitor voltage balancing.

In still another aspect, the present invention provides a method of converting AC to DC. The method may include disposing a plurality of fully resonant switching VHF power converter cells into a series stack to receive an AC input signal and output a DC signal therefrom. Each of the plurality of fully resonant switching VHF power converter cells may be separately controllable. Further, a portion of the plurality of fully resonant switching VHF power converter cells may be arranged with parallel outputs. The output may facilitate powering an LED-based light with substantially no visible light flicker. In an embodiment, the output may include substantially no ripple voltage. Further, substantially no AC frequency harmonics may be propagated to the output.

The method may further include connecting the DC signal output from at least a portion of the plurality of fully resonant switching VHF power converter cells in parallel to form a combined output. The method may also include synchronously rectifying the combined output. In addition, the method may include controlling the plurality of fully resonant switching VHF power converter cells for facilitating fully resonant switching and controlling the output rectifier for synchronous rectification. In an embodiment, the method may further include an output stage that may facilitate configuring a parallel output combination of the plurality of fully resonant switching VHF power converter cells. Further, at least one of the plurality of fully resonant switching VHF power converter cells may include one or more switched capacitors.

In another embodiment, at least one of the plurality of fully resonant switching VHF power converter cells may include at least one switched capacitor and a DC/DC regulating converter. The DC/DC regulating converter may be disposed in series with the at least one switched capacitor. The controlling may include soft switching of the plurality of fully resonant switching VHF power converter cells. Further, the controlling may include operating at least one power cell bypass function for the plurality of fully resonant switching VHF power converter cells. The controlling may also include maintaining converter efficiency above a minimum efficiency threshold.

In an embodiment, the minimum efficiency threshold may be seventy percent, seventy-five percent, eighty percent, and the like. The controlling may also include passive switched capacitor voltage balancing. The output may facilitate powering an LED-based light with substantially no visible light flicker. The output may include substantially no ripple voltage. Further, substantially no AC frequency harmonics may be propagated to the output.

In another aspect, the present invention provides a method of converting DC to DC. The method may include disposing a plurality of fully resonant switching VHF power converter cells into a series stack to receive a DC input signal and output a DC signal therefrom. Each of the plurality of fully resonant switching VHF power converter cells may be separately controllable. Further, a portion of the plurality of fully resonant switching VHF power converter cells may be arranged with parallel outputs. The method may further include connecting the DC signal output from at least a portion of the plurality of fully resonant switching VHF power converter cells in parallel to form a combined output.

The method may also include synchronously rectifying the combined output. In addition, the method may include controlling the plurality of fully resonant switching VHF power converter cells for facilitating resonant switching. The method may further include controlling the output rectifier for synchronous rectification.

In an embodiment, the method may include an output stage that may facilitate configuring a parallel output combination of the plurality of fully resonant switching VHF power converter cells. Further, at least one of the plurality of fully resonant switching VHF power converter cells may include one or more switched capacitors. At least one of the plurality of fully resonant switching VHF power converter cells may include at least one switched capacitor and a DC/DC regulating converter. The DC/DC regulating converter may be disposed in series with the at least one switched capacitor.

Further, controlling the plurality of fully resonant switching VHF power converter cells may include soft switching of the plurality of fully resonant switching VHF power converter cells. The controlling the plurality of fully resonant switching VHF power converter cells may include operating at least one power cell bypass function for the plurality of fully resonant switching VHF power converter cells. Furthermore, controlling the plurality of fully resonant switching VHF power converter cells may include maintaining converter efficiency above a minimum efficiency threshold. In an embodiment, the minimum efficiency threshold may be seventy percent, seventy-five percent, eighty percent, and the like. The controlling the plurality of fully resonant switching VHF power converter cells may also include passive switched capacitor voltage balancing.

In yet another aspect, the present invention provides a method of converting DC to DC. The method may include disposing a plurality of fully resonant switching VHF power converter cells into a serial stack to receive a DC input signal and output a DC signal therefrom. The method may further include connecting the DC signal output from at least a portion of the plurality of converter cells in parallel to form a combined output. The method may also include synchronously rectifying the combined output. Further, the method may include controlling the power converter cells for facilitating resonant switching. In addition, the method may include controlling the power converter cells for facilitating resonant switching. Each of the plurality of fully resonant switching VHF power converter cells may be separately controllable. Further, a portion of the plurality of fully resonant switching VHF power converter cells may be arranged with parallel outputs.

In an embodiment, the method may further include an output stage that may facilitate configuring a parallel output combination of the plurality of fully resonant switching VHF power converter cells. At least one of the plurality of fully resonant switching VHF power converter cells may include one or more switched capacitors. Further, at least one of the plurality of fully resonant switching VHF power converter cells may include at least one switched capacitor and a DC/DC regulating converter. The DC/DC regulating converter may be disposed in series with the at least one switched capacitor.

In another embodiment, controlling the plurality of fully resonant switching VHF power converter cells may include soft switching of the plurality of fully resonant switching VHF power converter cells. The controlling the plurality of fully resonant switching VHF power converter cells may include operating at least one power cell bypass function for the plurality of fully resonant switching VHF power converter cells. Further, the controlling the plurality of fully resonant switching VHF power converter cells may include maintaining converter efficiency above a minimum efficiency threshold. In an embodiment, the minimum efficiency threshold may be seventy percent, seventy-five percent, eighty percent, and the like. The controlling the plurality of fully resonant switching VHF power converter cells may also include passive switched capacitor voltage balancing. In addition, the output may facilitate powering an LED-based light with substantially no visible light flicker. The output may include substantially no ripple voltage.

In another aspect of the present invention, a method of multi-path power factor correction is provided. The method may include providing a plurality of energy transfer paths from an voltage-varying input to an output. The method may also include delivering a first fraction of available input energy to one or more energy storage networks at the input of at least one of the plurality of energy transfer paths. Further, the method may include delivering a second fraction of available input energy to the output. In addition, the method may include adjusting the first fraction and second fraction for facilitating outputting a substantially constant output and for controlling the energy drawn from the input.

In an embodiment, the controlling may include controlling a VHF power converter comprising the plurality of energy paths. Further, a portion of the plurality of energy paths may include a plurality of soft-switched power converter cells. The power factor correcting may include switching at least one of the interleaved power converter cells. The switching may produce unity power factor. Further, a portion of the plurality of energy paths may include a plurality of soft-switched stacked-cell power converters. A portion of the stacked-cell power converters may be connected to a common node. In an embodiment, the power converter may operate above 5 MHz.

In yet another aspect of the present invention, a VHF switching power converter is provided. The VHF switching power converter may include at least one power cell configured to receive an AC line input signal to provide an output suitable for powering an LED. Each of the at least one power cell may be separately controllable. Further, a portion of the at least one power cell may be arranged with parallel outputs. The VHF switching power converter may also include a controller for configuring the at least one power cell to receive the input signal and for facilitating switching the power converter at a frequency in excess of 5 MHz. In addition, the VHF switching power converter may include an output stage for receiving an output from the at least one power cell and for delivering a combined output to an LED.

In an embodiment, the VHF switching power converter may further include an output stage that may facilitate configuring a parallel output combination of the at least one power cell. The at least one power cell may include one or more switched capacitors. Further, the at least one power cell may include at least one switched capacitor and a DC/DC regulating converter. The DC/DC regulating converter may be disposed in series with the at least one switched capacitor. The controller soft switching of the at least one power cell. In an embodiment, the minimum efficiency threshold may be seventy percent, seventy-five percent, eighty percent, and the like. Further, the controlling the at least one power cell may include passive switched capacitor voltage balancing. The VHF switching power converter may operate above 5 MHz. In addition, powering the LED-based light may not require use of electrolytic capacitors.

In another aspect of the present invention, a method of powering an LED is provided. The method may include receiving an AC line input signal with at least one VHF switching power cell. The method may further include operating the power cell at a frequency in excess of 5 MHz for providing a DC output suitable for powering an LED. The method may also include receiving an output from the at least one VHF switching power cell to provide a combined output. In addition, the method may include delivering the combined output to an LED. Each of the at least one power cell may be separately controllable. A portion of the at least one VHF switching power cell may be arranged with parallel outputs.

In an embodiment, the method may further include an output stage that may facilitate configuring a parallel output combination of the at least one VHF switching power cell. The at least one VHF switching power cell may include one or more switched capacitors. The at least one VHF switching power cell may include at least one switched capacitor and a DC/DC regulating converter. The DC/DC regulating converter may be disposed in series the at least one switched capacitor.

In yet another aspect of the present invention, a stacked cell soft-switchable power converter is provided. The stacked cell soft-switchable power converter may include a plurality of stacked power cells flexibly connected to receive an AC input signal and provide an output suitable for powering an LED. The stacked cell soft-switchable power converter may also include a controller for configuring the power cells and the flexible connection to receive the input sign. Further, the stacked cell soft-switchable power converter may include an output stage for receiving an output from each of a portion of the plurality of stacked power cells and for delivering a combined DC output to an LED.

In an embodiment, each of the plurality of stacked power cells may be separately controllable. Further, a portion of the plurality of stacked power cells may be arranged with parallel outputs. The stacked cell soft-switchable power converter may further include an output stage that may facilitate configuring a parallel output combination of the plurality of stacked power cells. The plurality of stacked power cells may include one or more switched capacitors. Further, the plurality of stacked power cells may include at least one switched capacitor and a DC/DC regulating converter. The DC/DC regulating converter may be disposed in series the at least one switched capacitor.

In another embodiment, the controller operating at least one power cell may bypass function for at least one power cell. Further, the controller may maintain converter efficiency above a minimum efficiency threshold. The minimum efficiency threshold may be seventy percent, seventy-five percent, eighty percent, and the like. The controller may be configured for passive switched capacitor voltage balancing. Further, powering the LED-based light may include controlling the operation of at least one cell in the stacked power cell. The powering may include pulse-width-modulating at least one cell in the stacked power cell. Further, the powering may include power factor correcting.

In an aspect, the present invention provides a method. The method may include receiving an input voltage signal to be applied to a plurality of series stacked very high frequency power converter cells. The plurality of series stacked very high frequency power converter cells for producing an output voltage or current. The method may also include determining an output current. The method may further include controlling a portion of the plurality of series stacked high frequency power converter cells through pulse-width modulation to control the output current. Each of the plurality of series stacked very high frequency power converter cells may be separately controllable. A portion of the plurality of series stacked very high frequency power converter cells may be arranged with parallel outputs.

In an embodiment, the method may include an output stage that may facilitate configuring a parallel output combination of the plurality of series stacked very high frequency power converter cells. Further, at least one of the plurality of series stacked very high frequency power converter cells may include one or more switched capacitors. At least one of the plurality of series stacked very high frequency power converter cells may include at least one switched capacitor and a DC/DC regulating converter. The DC/DC regulating converter may be disposed in series the at least one switched capacitor. The controlling the plurality of series stacked very high frequency power converter cells may include soft switching of the plurality of series stacked very high frequency power converter cells.

Further, the controlling the plurality of series stacked very high frequency power converter cells may include operating at least one power cell bypass function for the plurality of series stacked very high frequency power converter cells. The controlling the plurality of series stacked very high frequency power converter cells may include maintaining converter efficiency above a minimum efficiency threshold. The minimum efficiency threshold may be seventy percent, seventy-five percent, eighty percent, and the like. Further, the controlling the plurality of series stacked very high frequency power converter cells may include passive switched capacitor voltage balancing.

In another aspect of the present invention, a system for providing high isolation AC to DC power conversion within a bounding box no larger than five US quarter dollar coins is provided. The system may include a power cell disposed to receive an AC input signal and provide a DC output. The system may also include a controller for configuring the power cell to receive the input signal. Further, the system may include an output stage for receiving an output from the power cell and for delivering an isolated output to a load. In an embodiment, the controller may soft switch the power cell. Further, the controller may operate the power cell bypass function for the power cell. The controller may maintain converter efficiency above a minimum efficiency threshold. The minimum efficiency threshold may be seventy percent, seventy-five percent, eighty percent, and the like. In an embodiment, the controller may be configured for passive switched capacitor voltage balancing. The bounding box no larger than five US quarter dollar coins may include a cubic volume of less than 4050 cubic millimeters.

In yet another aspect, the present invention may include a system for providing high isolation AC to DC power conversion within a bounding box no larger than five US quarter dollar coins. The system may include a soft-switchable power cell disposed to receive an AC input signal and provide a DC output. The system may further include a VHF speed controller for configuring the soft-switchable power cell to receive the input signal. Also, the system may include a transformer stage for receiving an output from the soft-switchable power cell and for delivering an isolated output to a load. The VHF speed controller may soft switch the soft-switchable power cell. Further, the VHF speed controller may operate the soft-switchable power cell bypass function for the power cell. The VHF speed controller may maintain converter efficiency above a minimum efficiency threshold. In an embodiment, the minimum efficiency threshold may be seventy percent, seventy-five percent, eighty percent, and the like. In addition, the VHF speed controller may be configured for passive switched capacitor voltage balancing.

In still another aspect, the present invention provides a system for providing high isolation AC to DC power conversion within a bounding box no larger than five US quarter dollar coins. The system may include a plurality of soft-switchable power cells flexibly connected to receive an input signal in series and provide an output. The system may also include a controller for configuring the plurality of soft-switchable power cells and the flexible connection to receive the input signal. Further, the system may include a transformer stage for receiving outputs from a portion of the plurality of soft-switchable power cells and for delivering a combined isolated output to a load. Each of the plurality of soft-switchable power cells may be separately controllable. Further, a portion of the plurality of soft-switchable power cells may be arranged with parallel outputs.

In an embodiment, the system may further include an output stage that may facilitate configuring a parallel output combination of the plurality of soft-switchable power cells. The plurality of soft-switchable power cells may include one or more switched capacitors. The plurality of soft-switchable power cells may include at least one switched capacitor and a DC/DC regulating converter. The DC/DC regulating converter may be disposed in series the at least one switched capacitor. Further, the controller may soft switch the soft-switchable power cell. The controller may operate the soft-switchable power cell bypass function for the power cell. The controller may also maintain converter efficiency above a minimum efficiency threshold. In an embodiment, the minimum efficiency threshold may be seventy percent, seventy-five percent, eighty percent, and the like. The controller may be configured for passive switched capacitor voltage balancing. Further, a bounding box no larger than five US quarter dollar coins may include a cubic volume of less than 4050 cubic millimeters.

In another aspect, the present invention provides a power converter for providing a DC output comprising arbitrarily small ripple from an AC source within a bounding box no larger than five US quarter dollar coins. The power converter may include a power cell disposed to receive an input signal and provide an output. The power converter may also include a controller for controlling the power cell to convert the input signal to an output comprising arbitrarily small ripple. Further, the power converter may include a feedback path for providing a representation of the output to the controller to facilitate providing the arbitrarily small ripple. The controller may soft switch the power cell. The controller may operate the power cell bypass function for the power cell. The controller may maintain converter efficiency above a minimum efficiency threshold.

In an embodiment, the minimum efficiency threshold may be seventy percent, seventy-five percent, eighty percent, and the like. The controller may also be configured for passive switched capacitor voltage balancing. Further, a bounding box no larger than five US quarter dollar coins may include a cubic volume of less than 4050 cubic millimeters.

The present invention further provides a VHF power converter for providing a DC output comprising arbitrarily small ripple from an AC source within a bounding box no larger than five US quarter dollar coins. The VHF power converter may include a soft-switchable power cell disposed to receive an input signal and provide an output. The VHF power converter may further include a VHF frequency controller for controlling the power cell to convert the input signal to an output comprising arbitrarily small ripple. In addition, the VHF power converter may include a feedback path for providing a representation of the output to the controller to facilitate providing the arbitrarily small ripple. The controller may soft switch the power cell. The controller may operate the power cell bypass function for the power cell.

In an embodiment, the controller may maintain converter efficiency above a minimum efficiency threshold. The minimum efficiency threshold may be seventy percent, seventy-five percent, eighty percent, and the like. Further, the controller may be configured for passive switched capacitor voltage balancing. In another embodiment, the bounding box no larger than five US quarter dollar coins may include a cubic volume of less than 4050 cubic millimeters.

In still another aspect of the present invention, a high efficiency VHF power converter for providing at least two watts of DC output power from an AC source within a bounding box no larger than five US quarter dollar coins is provided. The high efficiency VHF power converter may include a soft-switchable power cell disposed in the converter to receive an input signal and provide an output. The high efficiency VHF power converter may further include a VHF frequency controller for controlling the power cell to produce at least two watts of power from the input signal with at least seventy percent conversion efficiency. The controller may soft switch the power cell. In addition, the controller may operate the power cell bypass function for the power cell.

In an embodiment, the controller may maintain converter efficiency above a minimum efficiency threshold. The minimum efficiency threshold may be seventy percent, seventy-five percent, eighty percent, and the like. The controller may be configured for passive switched capacitor voltage balancing. In an embodiment, a bounding box no larger than five US quarter dollar coins may include a cubic volume of less than 4050 cubic millimeters.

In another aspect, the present invention provides a high efficiency VHF power converter for providing at least two watts of DC output power from an AC source within a bounding box no larger than five US quarter dollar coin. The high efficiency VHF power converter may include a soft-switchable power cell disposed in the converter to receive an input signal and provide an output. Further, the high efficiency VHF power converter may include a VHF frequency controller for controlling the power cell to produce at least two watts of power from the input signal with at least seventy-five percent conversion efficiency. The controller may soft switch the power cell.

In an embodiment, the controller may operate the power cell bypass function for the power cell. The controller may maintain converter efficiency above a minimum efficiency threshold. The minimum efficiency threshold may be seventy percent, seventy-five percent, eighty percent, and the like. The controller may be configured for passive switched capacitor voltage balancing. In an embodiment, a bounding box no larger than five US quarter dollar coins may include a cubic volume of less than 4050 cubic millimeters.

In still another aspect of the present invention, a high efficiency VHF power converter for providing at least fifty watts of DC output power within a bounding box no larger than three US quarter dollar coins is provided. The high efficiency VHF power converter may include a plurality of series-stacked soft-switchable power cells disposed in the converter to receive an input signal and provide at least fifty watts of power to an output. The high efficiency VHF power converter may also include a VHF frequency controller for controlling the plurality of power cells to produce the at least fifty watts of power from the input signal. In an embodiment, the bounding box no larger than three US quarter dollar coins may include a cubic volume of less than 2430 cubic millimeters.

In yet another aspect of the present invention, a high efficiency VHF power converter for providing at least fifteen watts of output power within a bounding box no larger than one US quarter dollar coin is provided. The high efficiency VHF power converter may include a plurality of series-stacked soft-switchable power cells disposed in the converter to receive an input signal and provide at least fifteen watts of power to an output. Further, the high efficiency VHF power converter may include a VHF frequency controller for controlling the plurality of power cells to produce the at least fifteen watts of power from the input signal. In an embodiment, the bounding box no larger than one US quarter dollar coin may include a cubic volume of less than 810 cubic millimeters.

In an aspect of the methods and systems described herein, a method of control may include receiving a varying input voltage signal to be applied to a plurality of series stacked high frequency power converter cells, the power converter cells for producing an output from the varying input; determining an average of the input voltage; and synchronously controlling the series stacked high frequency power converter cells to produce the output from the varying input voltage based on the determined average.

In an aspect of the methods and systems described herein, a method of control may include receiving a varying input voltage signal to be applied to a plurality of series stacked high frequency power converter cells, the power converter cells for producing an output from the varying input; determining an average of the input current; and synchronously controlling the series stacked high frequency power converter cells to produce the output from the varying input voltage based on the determined average.

In an aspect of the methods and systems described herein, a method of control may include receiving a varying input voltage signal to be applied to a plurality of series stacked high frequency power converter cells, the power converter cells for producing an output from the varying input; determining an average of the output current; and synchronously controlling the series stacked high frequency power converter cells to produce the output from the varying input voltage based on the determined average.

In an aspect of the methods and systems described herein, a method of controlling a stacked-cell VHF power converter may include sensing a voltage input to the converter; adjusting a by-pass function for at least one stacked-cell based on the sensed input voltage; sensing the input current; sensing the output current; and adjusting operation of at least one stacked-cell to control the input current and the output current based at least in part on one of the sensed input current and the sensed output current.

In an aspect of the methods and systems described herein, a method of controlling a stacked-cell VHF power converter may include sensing a voltage input to the converter; adjusting a by-pass function for at least one stacked-cell based on the sensed input voltage; sensing the input current; sensing at least one of the output voltage and the output current; and adjusting operation of at least one stacked-cell to control the input voltage to at least one other stacked-cell based at least in part on one of the sensed input voltage, the sensed input current, the output voltage, and the sensed output current.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF THE FIGURES

The invention and the following detailed description of certain embodiments thereof may be understood by reference to the following figures.

DETAILED DESCRIPTION OF THE PREFERRED EMBODIMENT(S)

Increasing the switching frequency of a switched-mode power supply (SMPS) is a goal that is widely sought after as a means to increase power density and improve transient performance. However, increasing switching frequency using conventional power converter topologies (boost, buck, flyback, etc.) results with significantly degraded efficiency. Additionally, as switching frequency is increased, power density only increases until an optimal switching frequency is reached, at which point power density begins to decrease again. A new power converter architecture is described herein that breaks the bounds of conventional techniques, enabling efficient high frequency operation while delivering increased power per converter volume.

Figure 1:
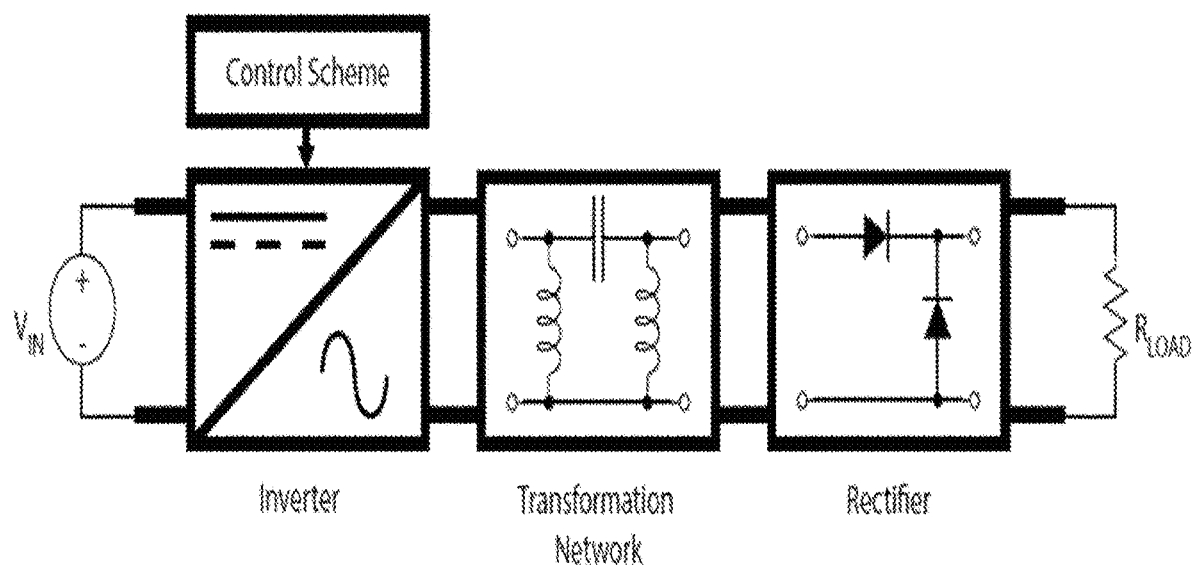
FIG. 1 depicts a basic structure of a switching DC/DC converter.

Soft-switched resonant inverters have been developed for high efficiency radio-frequency (RF) transmitter applications. These techniques have been adapted to form efficient DC/DC converters at switching frequencies greater than 100 MHz. The basic structure of this type of converter is shown in FIG. 1. The inverter stage takes DC power from the input and delivers RF AC power to the transformation network. The transformation network scales the AC signal to the appropriate level using either passive components and/or a transformer. The rectifier takes AC power from the transformation network and converters it back to DC.

Inverters that are suitable for efficient operation at VHF use resonance and characteristics of the load to achieve zero-voltage switching. Resonant rectifier topologies are often used and can be modeled as an impedance in a describing function sense. The transformation stage serves to form an impedance match between the inverter and the rectifier impedance, providing the appropriate voltage and current level shifting and isolation if required. The transformation stage can be realized from passive transformation networks, conventional transformers, wide-band or transmission-line transformers, or similar means. An example of this type of converter is formed by joining a Class-E inverter with a series loaded resonant rectifier, shown in FIG. 2. For this converter to operate with high efficiency at VHF three primary loss mechanisms that grow with frequency must be overcome: switching loss due to the overlap of voltage and current at the switching instance and due to capacitive discharge, gating loss due to charging and discharging the gate capacitor once per cycle, and losses in magnetic materials. Switching losses are overcome by operating with zero-voltage switching (ZVS). As shown in the waveforms of FIG. 3, the resonant components in the circuit are tuned specifically such that when the switch $S_1$ is opened, the voltage across the switch ($V_D(t)$) will naturally ring up and then back to zero at a known time period later, offering an opportunity to turn the switch back on with no penalty. With switching losses overcome, gating losses that arise from charging and discharging the gate capacitor once per cycle are mitigated by either using a resonant gate drive scheme to recover a portion of the energy stored in the gate, rather than discharging it to ground, or by optimizing the size of the transistor such that gating loss is a small portion of the overall converter loss. Finally, with switching and gating losses minimized, losses in magnetic materials are avoided by operating the converter at a high enough frequency such that high permeability core material can be eliminated and air-core magnetics or low-permeability RF magnetic materials are used.

Figure 2:
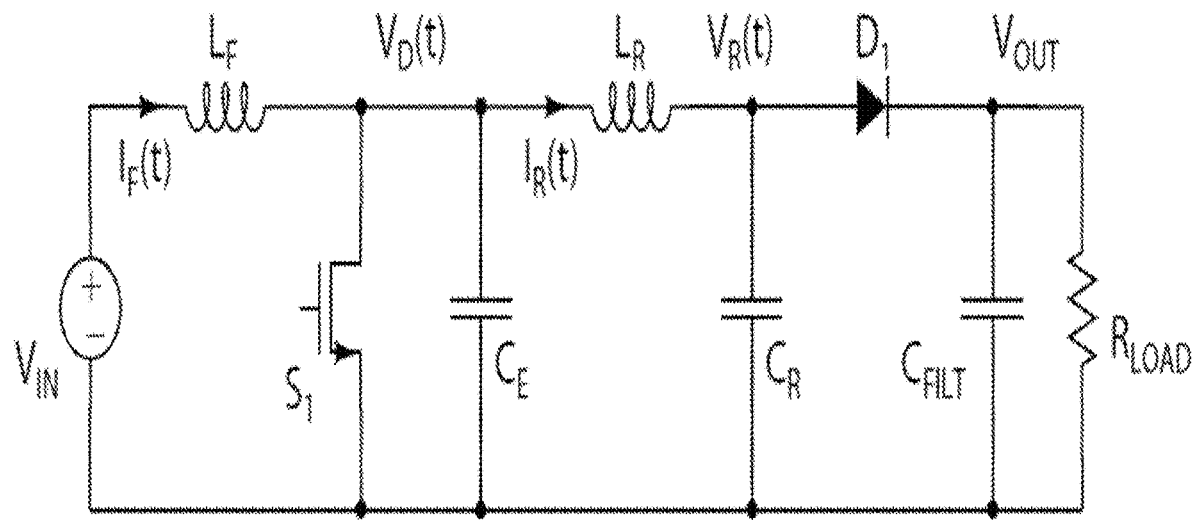
FIG. 2 depicts a Class-E inverter joined with a series loaded resonant rectifier.
Figure 3:
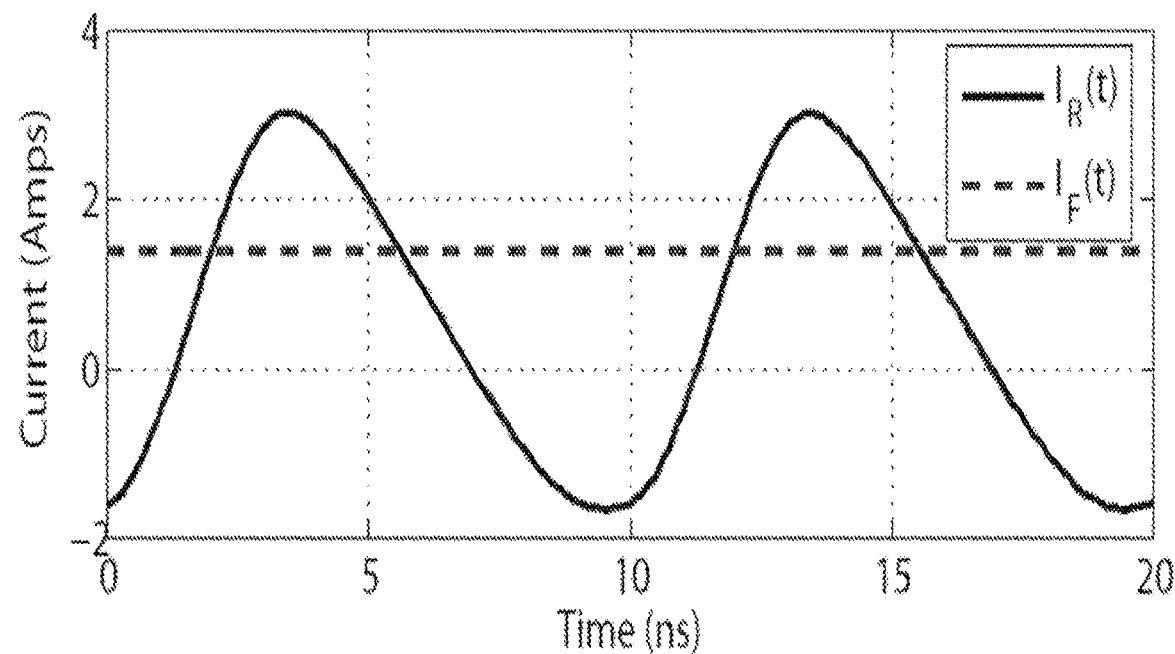
FIG. 3 depicts current and voltage waveforms of an AC/DC converter.
Figure 3:
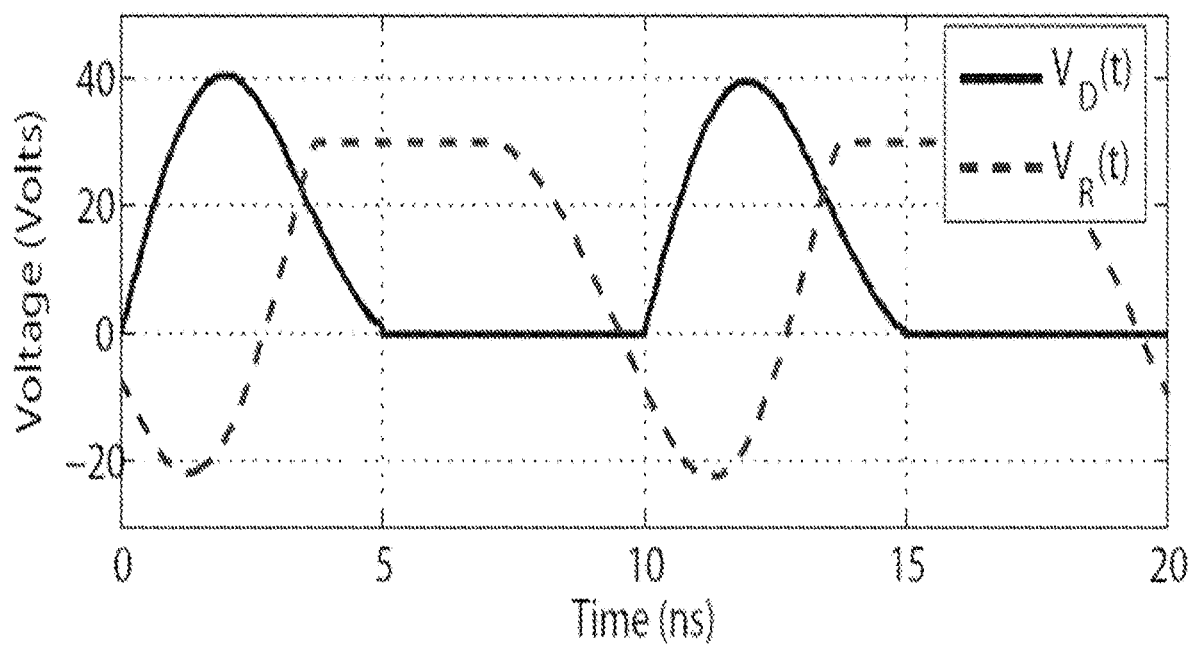
Figure 4:
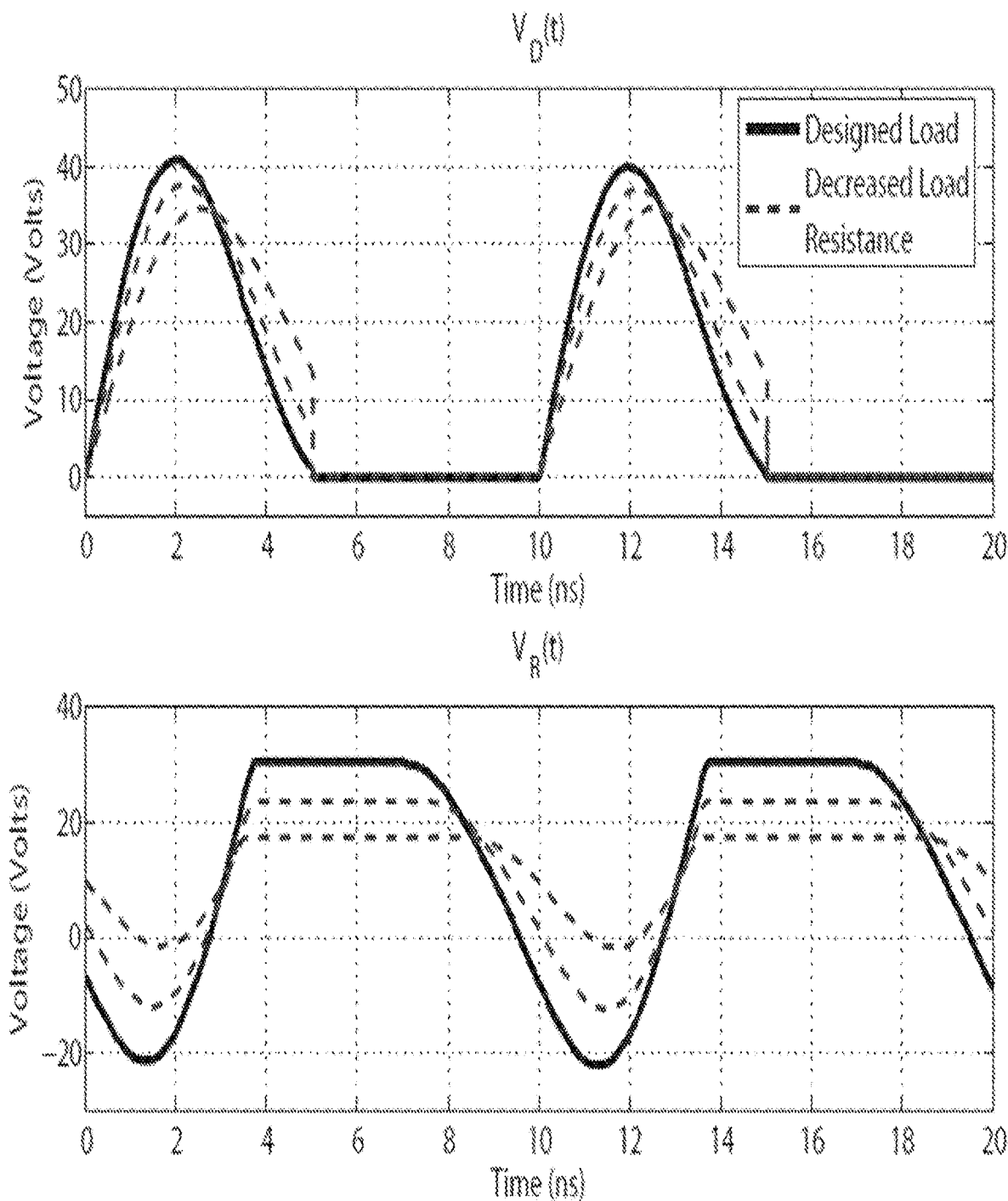
FIG. 4 depicts waveforms representing loss of ZVS as load is decreased.
Figure 5:
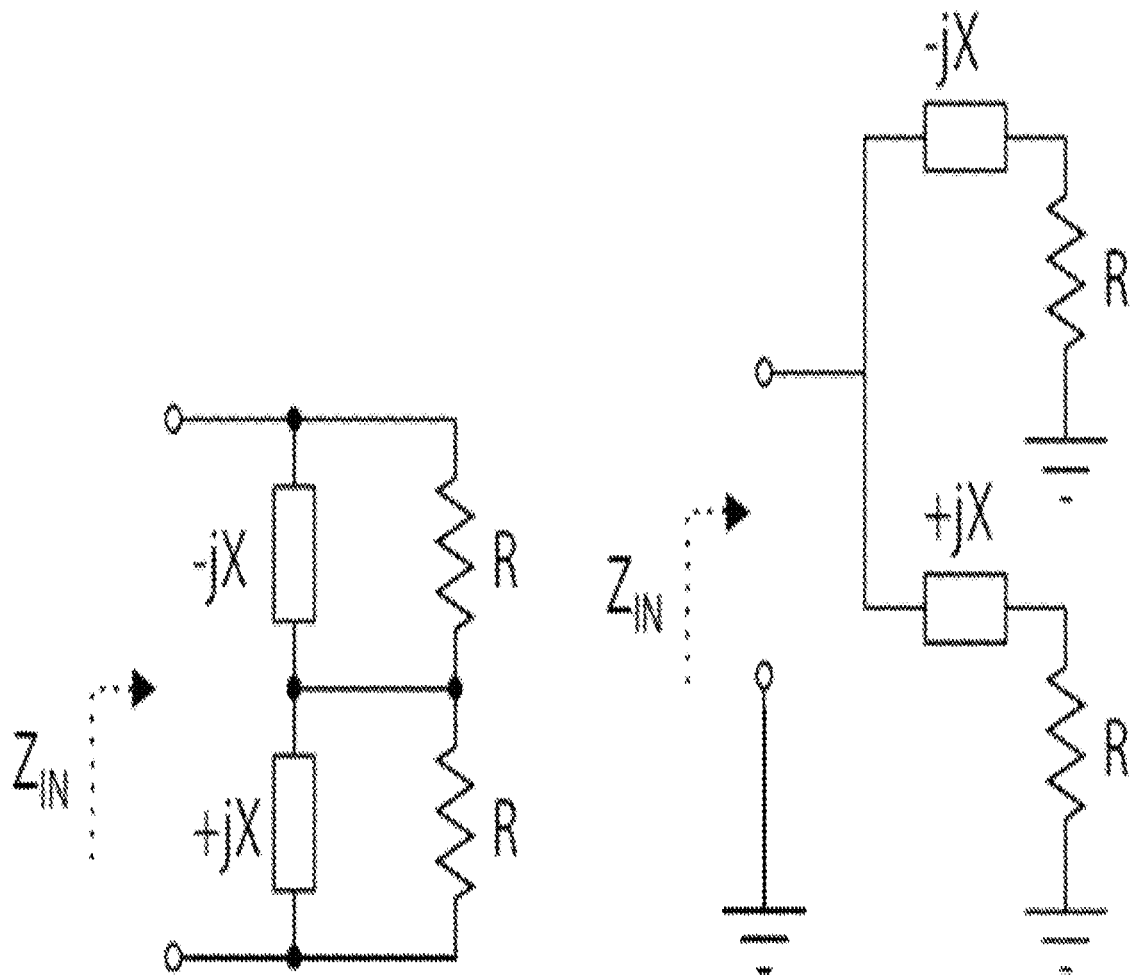
FIG. 5 depicts resistance compression networks.
Figure 6:
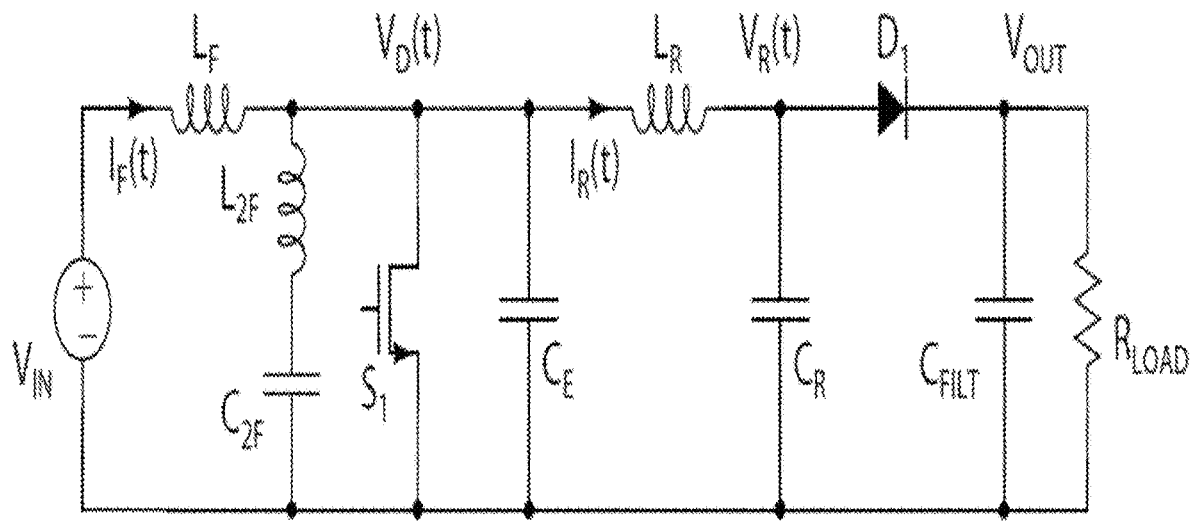
FIG. 6 depicts topology of a $\Phi_2$ inverter.

While the circuit of FIG. 2 overcomes all of the major frequency dependent loss mechanisms that prohibit conventional power converter circuits from operation at VHF, it has a number of drawbacks. First, the switch $S_1$ must survive a peak voltage stress of about 3.6 times the input voltage. It is well known that increasing the breakdown voltage of a transistor results in increased on-state resistance and increased parasitic capacitance. The performance of converters of this type has been shown to be directly related to the product of the on-state resistance and device output capacitance squared. Thus, a topology with lower peak voltage stress will typically suffer less device loss. Second, the minimum output power is limited by the parasitic drain-to-source capacitance of the switch $S_1$. Additionally, the circuit can only operate with ZVS over a very narrow load range. Since the quality factor (Q) of the resonant components is set by the load resistance, ZVS can only be obtained for a single load. As the load changes the circuit becomes de-tuned, and ZVS is lost. This effect is demonstrated in FIG. 4, where the loss of ZVS is observed as the load is decreased. Resistance compression networks, shown in FIG. 5, are a matching/transformation passive network that can be employed to reduce the sensitivity of the tuned inverter circuit to variations in the load. These drawbacks have led to the development of numerous other topologies that utilize higher-order resonant networks to reduce the peak voltage stress and break the tight coupling of output power and device capacitance. An example of such a topology is the $\Phi_2$ converter, shown in FIG. 6

Figure 7:
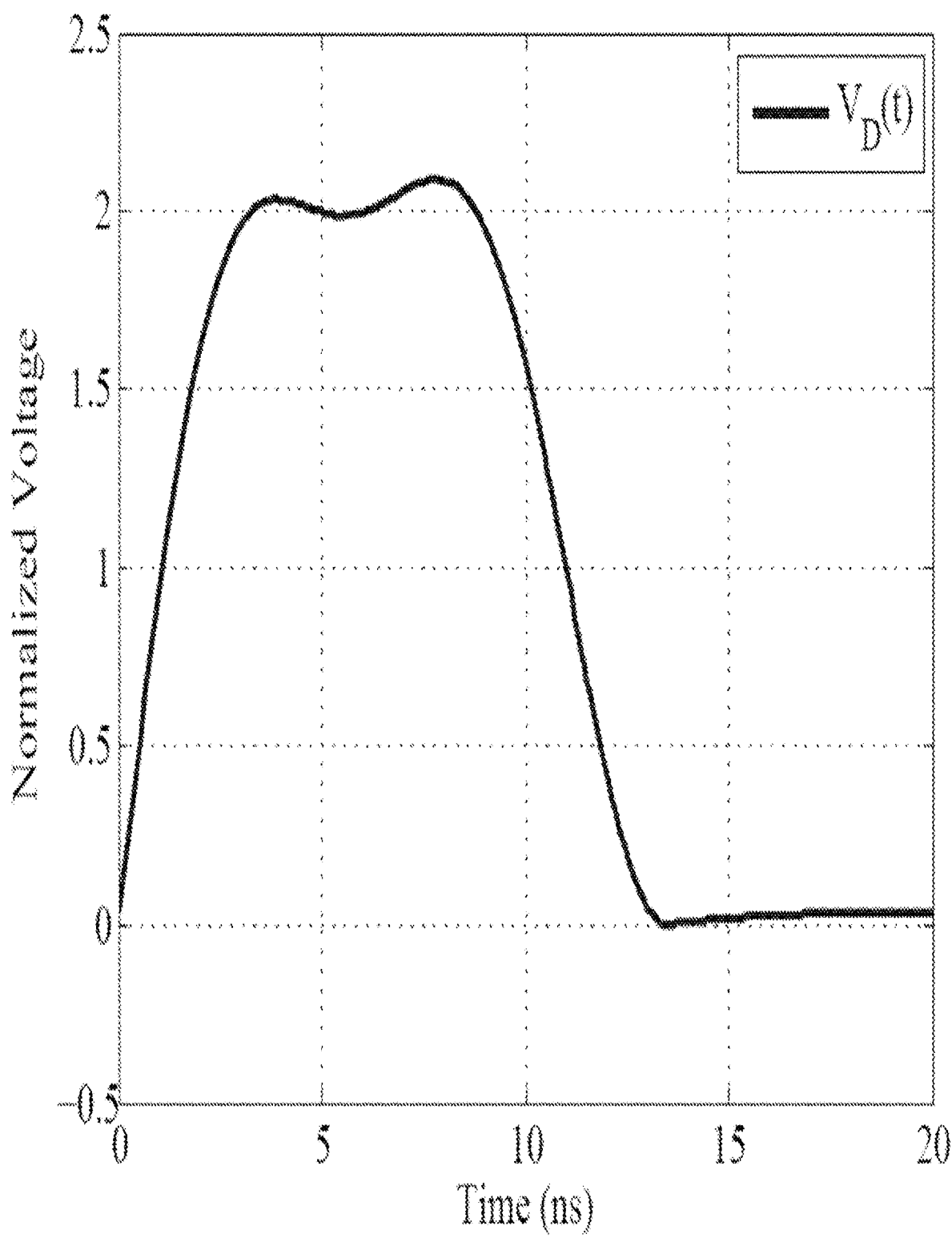
FIG. 7 depicts a voltage waveform across a switch of the circuit of FIG. 6.

The $\Phi_2$ uses a multi-resonant network to shape the voltage waveform across the switch to approximate a square-wave with a peak value of approximately 2 times the input voltage, as shown in FIG. 7. This allows a lower voltage transistor to be used, reducing device loss. Additional resonant components are required, however, increasing the complexity (and potentially size) of the converter. In addition to the $\Phi_2$ there are numerous other converter topologies employing the similar strategy of increasing the circuit complexity to gain additional control over the shape of the converter waveforms. The $\Phi_2$, however, is considered to be the preferred embodiment as it strikes a good balance between additional complexity and performance. While a resistance compression network allows the converter to operate over a wide load range without loss of ZVS, it does not provide a means of regulation. Pulse-Width Modulation (PWM) is a commonly used technique for controlling power converter circuits. However, PWM control at VHF is not practical since the converters are designed to achieve ZVS at a particular duty cycle. Frequency modulation provides a method of control, however, it is a challenge to maintain high efficiency over a wide load range as losses from gating and losses from providing the resonant currents required to achieve ZVS do not scale back with power.

Figure 8:
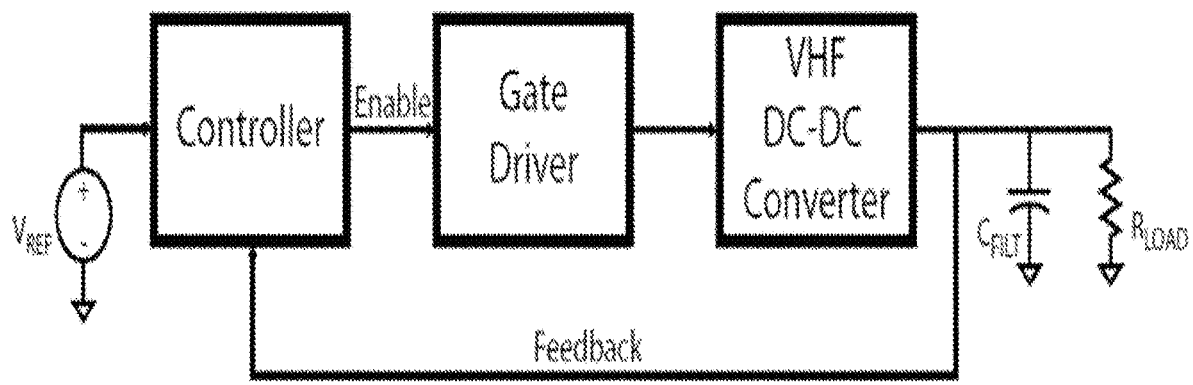
FIG. 8 depicts an on-off modulation converter schematic.

A method that achieves high efficiency over a wide load range is on/off modulation, shown in FIG. 8. This technique separates the functions of energy conversion and regulation by designing the converter to operate at full power, and then regulating average delivered power by modulating the converter on and off at a frequency less than the switching frequency of the converter. With this technique the resonant components of the converter are sized relative to the switching frequency and the input and output filter components are sized relative to the modulation frequency. Inclusion of a resistance compression network with a converter that is controlled through on/off modulation increases the input and output voltage range of the converter.

Figure 9:
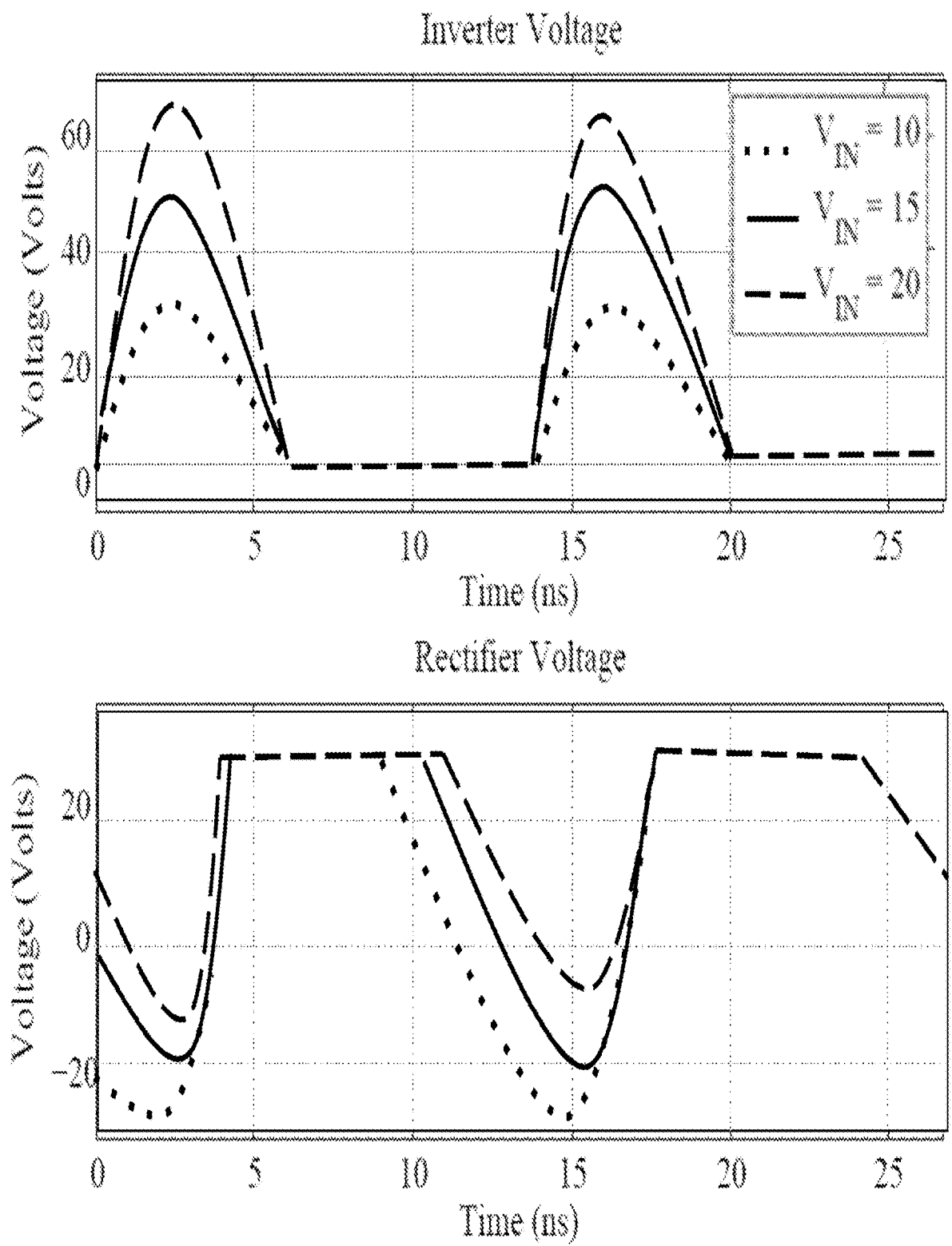
FIG. 9 shows inverter and rectifier voltages for a plurality of input voltages.
Figure 10:
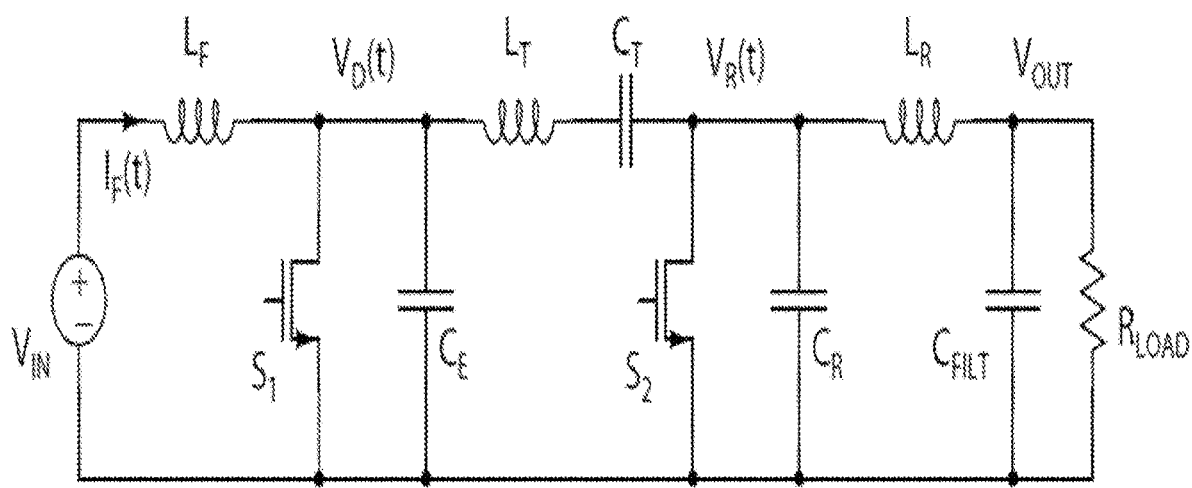
FIG. 10 depicts a Class-E inverter connected to a rectifier dual circuit.
Figure 11:
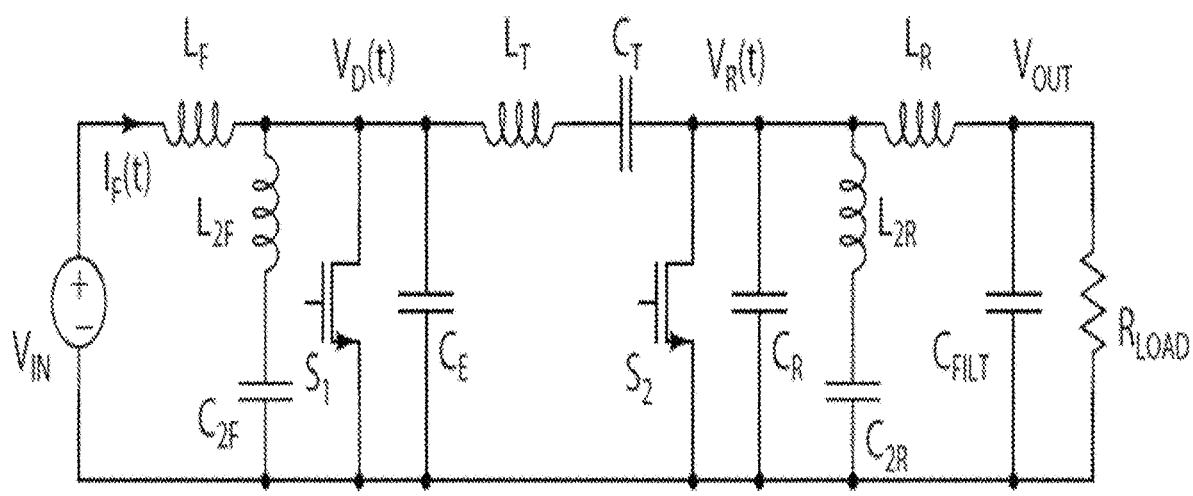
FIG. 11 depicts a $\Phi_2$ inverter connected to a rectifier dual circuit.

While the rectifier stage of FIG. 1 is classically realized using diodes, transistors can also be used to build a synchronous rectifier. Replacing an uncontrolled switch with a controlled switch adds the requirement of knowing the correct times to turn the switch on and off within a cycle. This is demonstrated in FIG. 9 by varying the input voltage of the converter of FIG. 2 and observing that the rectifier's duty cycle and phase vary relative to the inverter. All of the soft-switched resonant inverter topologies previously introduced have a dual circuit that operates as a rectifier. FIGS. 10 and 11 show schematics of both the Class-E and $\Phi_2$ inverters connected to their respective rectifier dual circuit. In these examples the transformation network is only a simple impedance, but just as with converters built with diode rectifiers, more complex passive transformation networks, conventional transformers, wide-band or transmission-line transformers, or similar means can also be used.

When designing a synchronous rectifier in a converter that is controlled through on/off modulation, the primary task is to control the duty cycle of the rectifier and inverter switches as well as the phase shift between the inverter and rectifier to achieve the desired switching waveform. This may be accomplished through the following method:

1. Determine the duty cycle for the inverter and rectifier switches as well as the phase shift between the inverter and rectifier as a function of input and output voltage that results with the desired switching waveforms. Since ZVS is not necessarily obtainable for all combinations of input and output voltage, the desired waveforms are chosen to minimize converter loss and/or damage to the converter for the cases when ZVS cannot be obtained. Depending on the converter topology used this can be done using different methods. Converters for which closed for solutions describe their operation the duty cycles and phase shift can be determined from analysis of the equations. If no such set of equations exist for the topology simulation sweeps across parameters or through a numerical converter solution.

2. With the desired duty cycles and phase shift known as a function of input and output voltage, the remaining task is to realize a practical system that implements the desired transfer functions. One method to accomplish this is to read the input and output voltage at a bandwidth less than the switching frequency. This ensures that the duty cycles and phase are being adjusted with the DC input and output voltages, where the term DC loosely is meant to mean slowly varying local average relative to a switching cycle.

3. Using the measured local average input and output voltages, the duty cycle of the inverter and rectifier circuits are set as well as the phase shift between the inverter and rectifier. Synchronous rectifiers can also be used to implement a phase-shift control system in which in addition to ensuring the converter operates with the desired switching waveforms, regulation is also controlled through adjustment of the phase shift between the inverter and rectifier.

Figure 12:
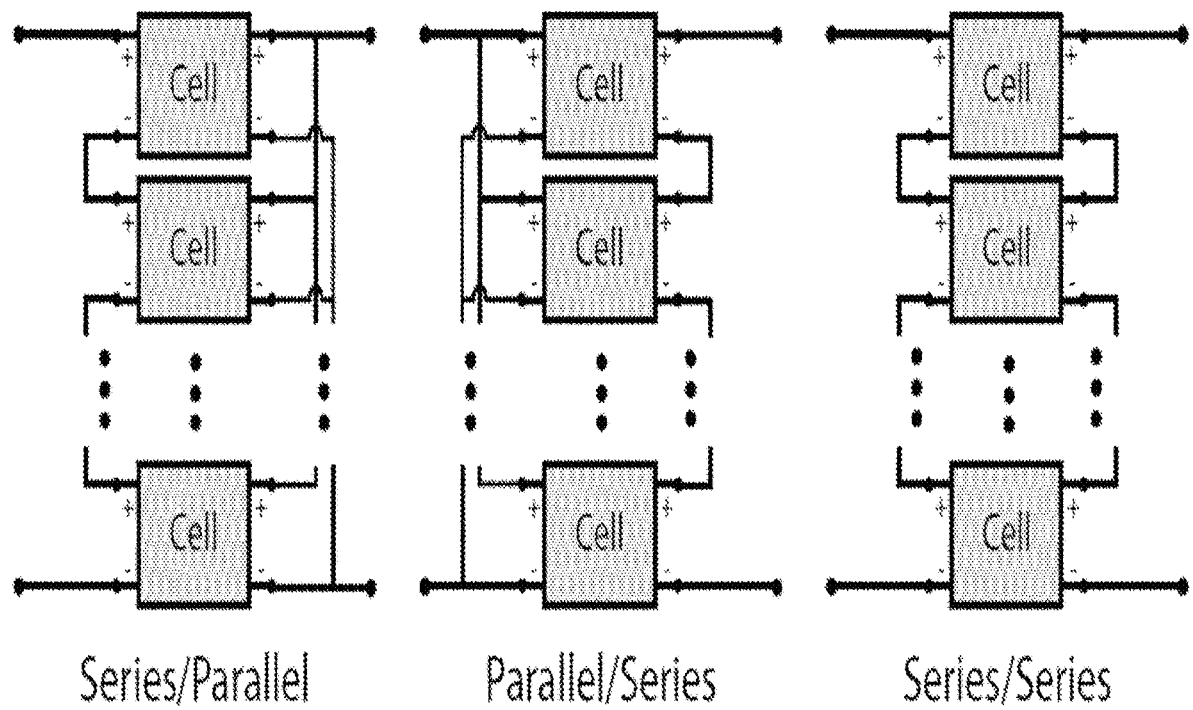
FIG. 12 depicts various configurations of series stacked cell embodiments.

Building VHF power converters where the main switching devices are fabricated in an integrated power process typically limits the selection of suitable devices to those having a breakdown voltage of 80-100 Volts at most. Since the best designed resonant converters of this type have a peak voltage stress of 2 times the input voltage in the inverter and 2 times the output voltage in the rectifier, the input and output voltages are both constrained to being less than 50 Volts at most. Many applications exist that require higher input or output voltage, however. For example, a system that is powered directly from the AC line must handle a peak input voltage of about 190 Volts and a peak device stress of 380 Volts, forcing the converter to be built from either poorly integrated devices or external devices. Here we describe a method and system of extending the peak input and/or output voltage of a VHF resonant DC/DC converter without requiring devices with a higher breakdown voltage. Rather than using a single converter cell, the converter can be built from multiple converter cells, and peak voltage is extended by connecting the converters in series. It is not necessary that both the converter's input and output both be series connected, but rather as shown in FIG. 12 the cells' inputs can be connect in series and their output is parallel, such as to extend peak input voltage. Similarly, to increase the peak output voltage of the converter only, the cells' outputs can be connected in series and the inputs in parallel. Additionally, some combination of series and parallel can be utilized at the input and/or output to achieve a particular peak voltage and power. It is further envisioned that sets of series stacked inverters may be configured in parallel (e.g. parallel outputs) for providing greater power than could be provided by a single series stack. A determination of which type of configuration may be based on a requirement to deliver a required amount of output power. Configuring series stacked inverters in parallel may be an arrangement that satisfies the output power delivery requirement.

The cells used to form the multi-cell converter will be described herein and may vary depending on a variety of factors including size, cost, performance objectives, input voltage range limit, and the like. In addition to increasing the converter's peak input and/or output voltage for a particular device breakdown voltage, the range at which the converter can operate over can also be increased. This may be accomplished by selectively using only a subset of the cells that make up the multi-cell converter. For example, if a multi-cell converter is formed from 5 converter cells that can each operate over an input voltage range of 20-30 Volts, with all cells in use, the multi-cell converter can operate over a voltage range of 100 Volts-150 Volts. However, by selectively using a subset of the cells in the series stack, the multi-cell converter can operate over an input voltage range of 20-150 Volts. A multi-cell converter may additionally include control functionality for each cell so that active cells remain within their input and output voltage range.

In the present disclosure some embodiments of a VHF converter are described as including VHF soft-switching resonant DC/DC converter stages that are cascaded with an AC bridge to form an AC/DC converter that can operate efficiently with a VHF switching frequency. This AC/DC converter may be used to drive light emitting diodes as well as space constrained consumer devices, such as an AC/DC converter used to power a laptop computer, and the like.

Figure 13:
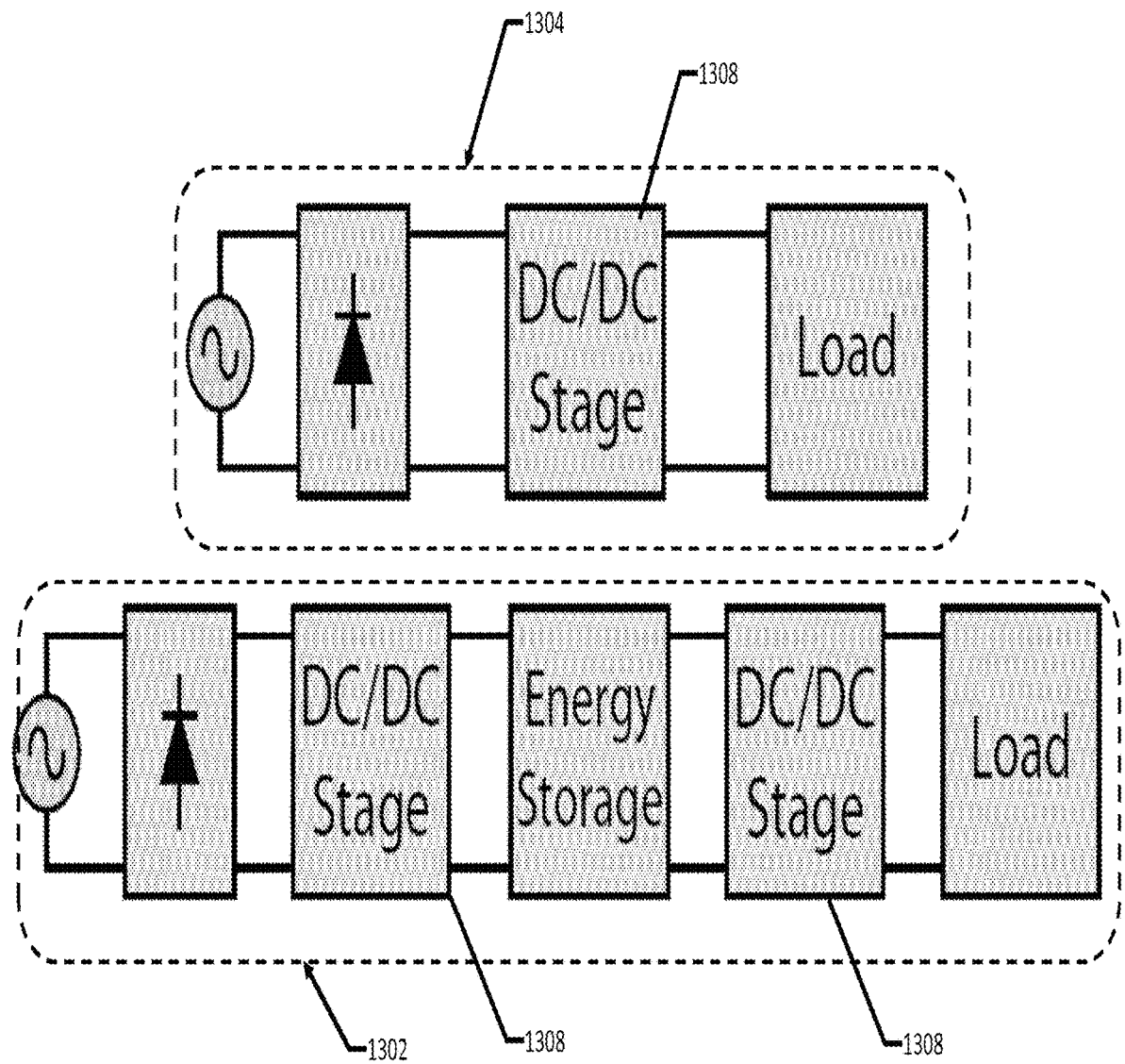
FIG. 13 depicts two embodiments of a VHF converter system.

A block diagram of two similar embodiments of such a VHF converter system is presented in FIG. 13. Embodiment VHF1302 includes energy storage, whereas embodiment VHF1304 does not. The DC/DC converter stages VHF1308 may be operated with a switching frequency that is much greater than the line frequency so that the line voltages appears to the DC/DC converter VHF1308 to be a widely but slowly varying DC voltage. The stages VHF1308 may be formed from any of the previously described VHF resonant DC/DC converter cells and/or multi-cell configurations, including combinations thereof.

The input voltage range of the stage may determine which portion of the line cycle that the stage is able to operate over. For a portion of the line cycle where the line voltage is below the minimum input operation voltage of the stage, energy storage may be required to maintain the output voltage or output current to within any ripple limits specified by a particular application system. Additionally, in many applications, the method in which power is drawn from the AC line is constrained by government standards. This may further reduce the ability of the stage to regulate the output voltage or current to within the specified ripple limits. Although one option to maintain output ripple to within its limits is to increase the energy storage buffer at the output, this may reduce the flexibility and increase the complexity.

An alternative solution is to cascade a second DC/DC converter stage with energy storage to perform load regulation and ripple reduction. This allows the amount of energy stored to ripple widely within a line cycle, thereby reducing the total amount of energy storage required which may reduce complexity, overall size, and cost.

A very high frequency power converter suitable for implementation in a semiconductor process that overcomes size, efficiency, and cost limitations of larger discrete component embodiments is described herein. The VHF power converter may be configured to deliver substantial benefits of high frequency operation while providing power output that is far greater than may have economically been provided by VHF converter technology heretofore. The VHF power converter may take advantage of a switched stacked cell architecture that enables the converter to accept an input voltage far greater than could be tolerated by any single cell while achieving performance, cost, size, and efficiency levels afforded by the current VHF power converter as described herein.

A VHF power converter may include a core cell architecture that may include a switched capacitor stage followed by a switched VHF converter stage. A switched capacitor stage may facilitate each cell accepting a wider range of input voltage by providing a controllable voltage halving function. By employing one or more switched capacitors, each capacitor can be charged up to one-half of the input voltage by alternating capacitor charging with capacitor discharging. Therefore, an input voltage to a cell of 60V may be divided in half to 30 V through the switched capacitor stage. The number of switched capacitors may be dependent on a variety of factors such as reduced input current, and the like. The output of the switched capacitor stage may be provided to a VHF power converter stage so that the VHF converter stage receives no more than 30V. This concept may be further enhanced by providing a switched direct path from the input to the VHF converter to support input voltages that do not exceed 30V and therefore do not necessarily benefit from being divided in half by the switched capacitor stage. In an example, a switched capacitor-based VHF converter cell may accept an input voltage from 15V to 60V while never presenting more than 30V to the VHF stage.

When a VHF converter is configured with a plurality of switched cells, such as the capacitor stage plus VHF stage cells describe above are configured in series across an input, an input voltage to the converter may range from as little as a minimum required for VHF conversion in a single cell to a maximum determined by the number of cells. In an example, a VHF converter using four of the switched capacitor stage plus VHF stage described above may support an input range of 15V minimum to as much as 240V maximum peak.

Figure 14:
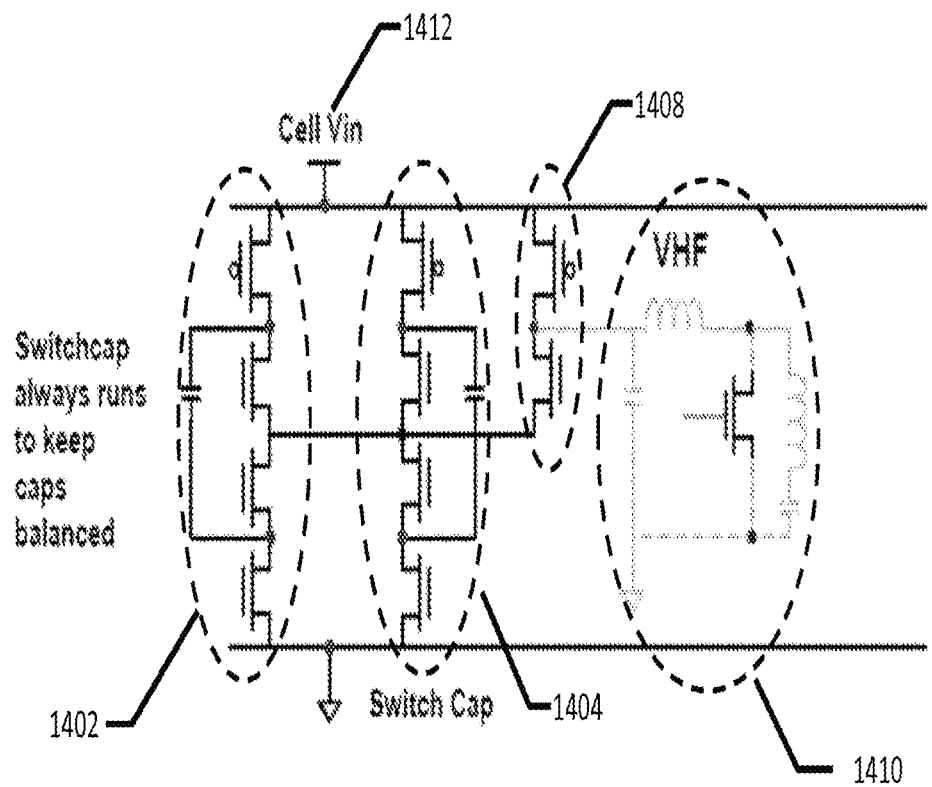
FIG. 14 depicts a switched cell based on a switched capacitor stage followed by a VHF stage.

An exemplary embodiment of a switched cell based on a switched capacitor stage followed by a VHF stage is depicted in FIG. 14. This exemplary cell architecture may comprise a pair of switched capacitor charging circuits 1402 and 1404 wherein energy in each capacitor may be provided to a VHF stage 110 via a VHF stage input switch 1408. Each capacitor circuit, such as 1402 may comprise four series switching transistors and a capacitor connected between a junction of the top two series switches and the bottom two series switches. The capacitor may be alternatively charged and discharged by operating the switches in two phases. In the first phase the top switch and the switch just below the midpoint are closed and the remaining two switches are open. In this phase, energy drawn by the VHF stage 1410 through input switch 1408 charges the capacitor. In the second phase, the state of each switch is reversed, and the energy drawn by the VHF stage 1410 through input switch 1408 discharges the capacitor. With the VHF stage 1410 drawing substantially the same energy in both phases, the switched capacitor circuit presents a voltage half of the cell input voltage 1412 to the VHF stage 1410 through input switch 1408. Switched capacitor charging circuit 1404 operates similarly to switched capacitor charging circuit 1402. Switched capacitor charging circuits 1402 and 1404 may be operated cooperatively with opposite phase to reduce the RMS current stress of the converter. The example of FIG. 14 includes two switched capacitor charging circuits; however any practical number of capacitor charging circuits or switch configurations may be used, such as to facilitate different cell input voltages 1412, make system efficiency tradeoffs, and the like.

VHF stage input switch 1408 may comprise a pair of switches connected in series between the cell input voltage 1412 and the center point of each switch capacitor charging circuit 1402 and 1404. The joining point of the two switches may be an input point to a VHF stage 1410. VHF stage input switch 1408 may facilitate selecting either cell input 1412 or voltage from switched capacitor converter as an input to the VHF stage 1410. If both switches in VHF stage input switch 1408 are off/open, no power will be input to the VHF stage 1410. Control of the two switched capacitor circuits 1402 and 1404 along with the VHF stage input switch 1408 may be coordinated to ensure that VHF stage 1410 receives a voltage that is sufficient for operation but does not exceed a safe operating voltage by controlling the charging of capacitors 1402 and 1404 and selecting between the power sources provided to VHF stage input switch 1408. In an example of steady state operation of the cell depicted in FIG. 14 with an AC cell input voltage 1412, VHF stage input switch 1408 may connect the VHF stage 1410 to the cell input voltage 1412 while the cell input voltage 1412 is within the input voltage range of the VHF stage 1410. Furthermore, stage input switch 1408 may connect the switched capacitor circuits as a source of power to the VHF stage 1410 while the switched capacitor output voltage in within the input voltage range of the VHF stage 1410 One example of selecting the cell input voltage to directly energize the VHF stage 1410 may include a configuration in which the cell input voltage is a DC voltage within the safe operating input range of the VHF stage 1410.

Figure 15:
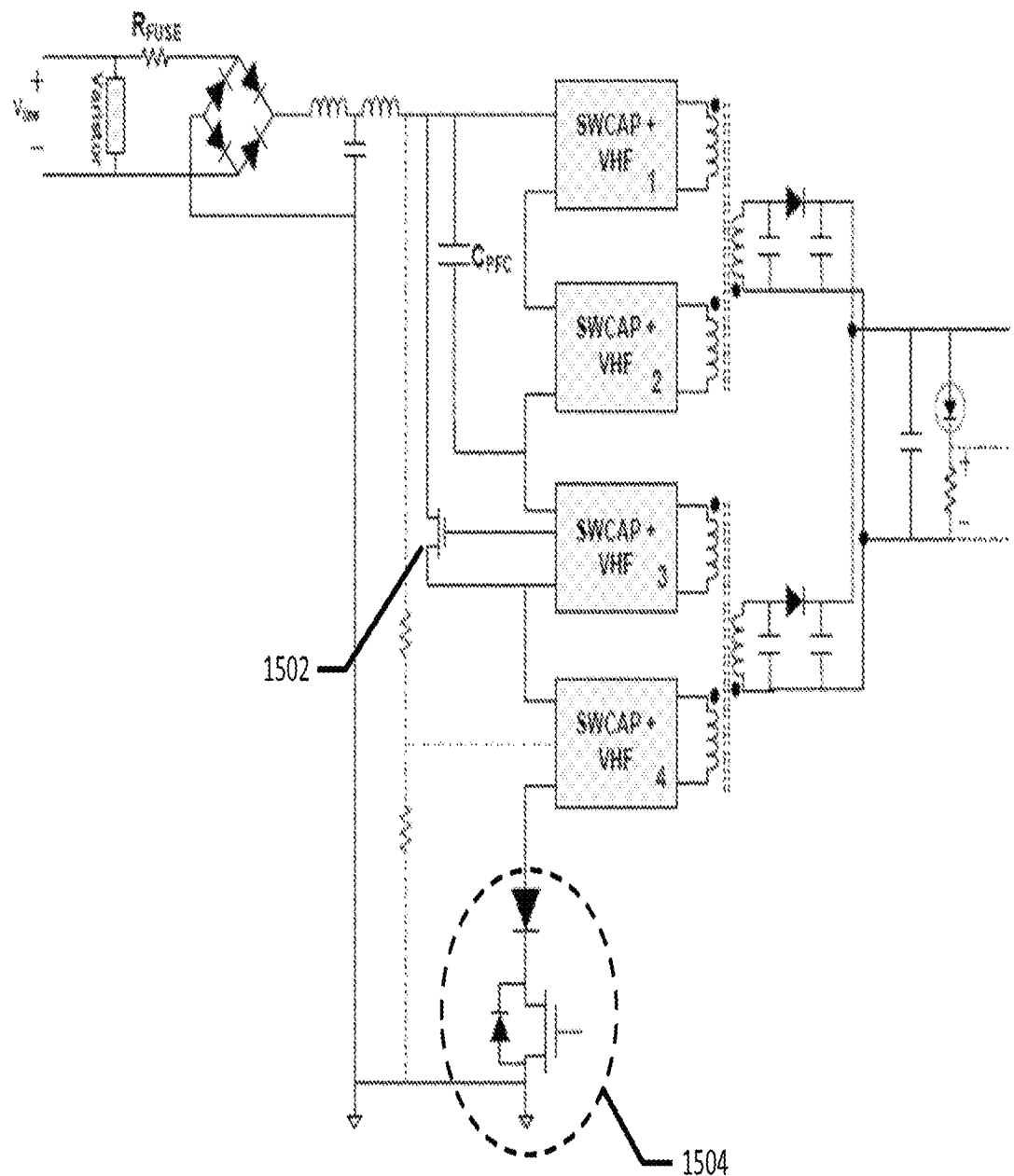
FIG. 15 depicts a serial stacked cell VHF converter.

An exemplary embodiment of a serial stacked cell VHF converter is depicted in FIG. 15. The embodiment of FIG. 15 includes four switched VHF cells that are arranged in pairs to drive a load through transformer isolation. The four switched VHF cells work cooperatively to handle a rectified AC line voltage up to 120 VAC. Each of the cells has at least one specific function that is activated based on the input voltage. Cells 1 and 2 provide an output power regulation throughout the full line cycle. Cell 3 is bypassed until the input reaches approximately 125V above which it provides input voltage regulation across cells 3 and 4. Cell 4 is off until the input reaches approximately 80V above which it provides input current regulation for the entire stack.

Figure 16:
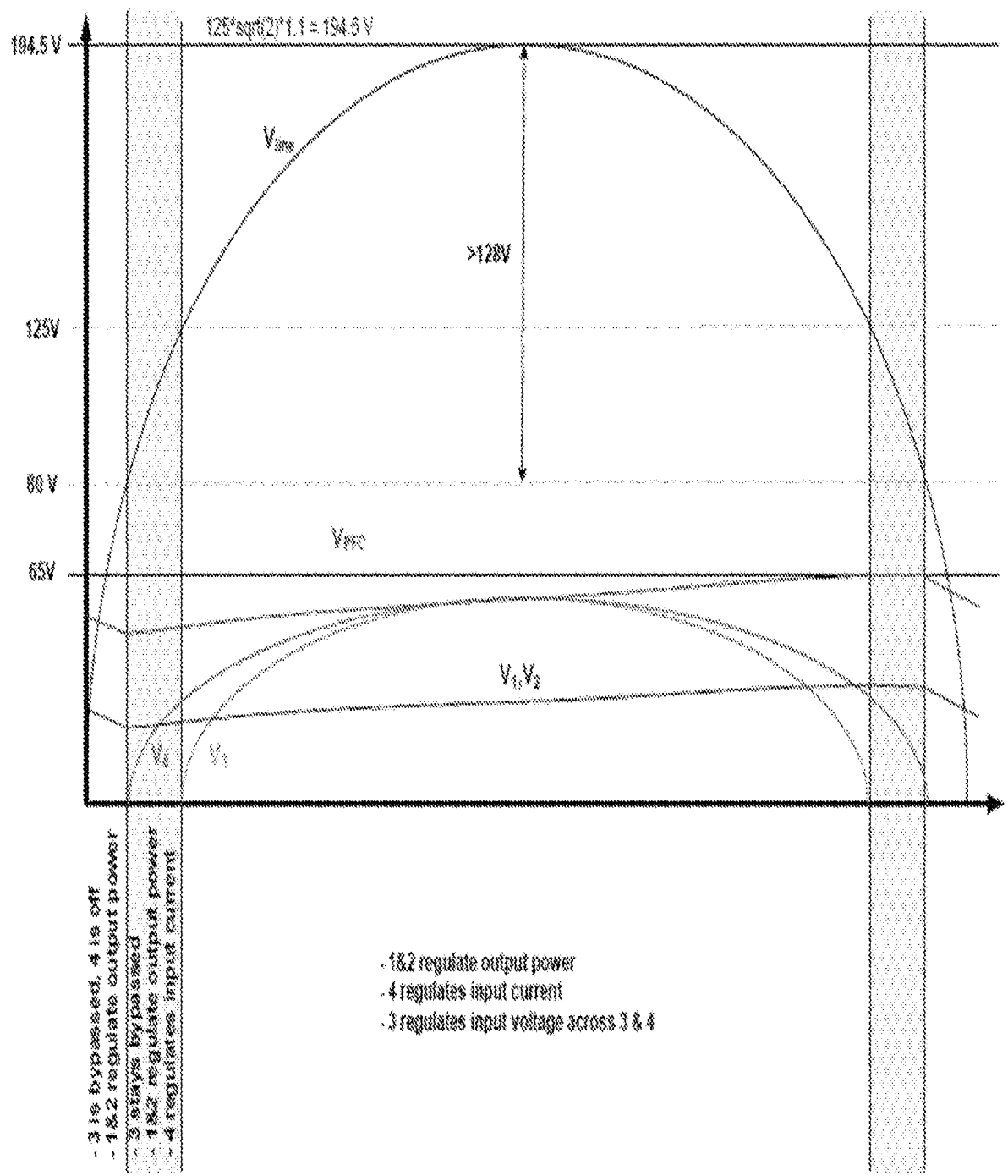
FIG. 16 depicts a timeline view of one rectified cycle of an 137.5 VAC input.

FIG. 16 provides a timeline view of one rectified cycle of an 137.5 VAC input that helps one visualize the portions of the cycle for which each of the four cells performs its at least one specific function. In FIG. 16, the cycle is divided into five voltage zones rising 0-80V, rising 80-125V, rising and falling above 125V, falling 125-80V, and falling 80-0V. As noted above cells 1 and 2 provide an output power regulation function throughout the cycle. During the rising 0-80V zone and during the falling 80-0V zone cell 3 is bypassed and cell 4 is off. During rising 80-125V and falling 125-80V zones, cell 3 is bypassed and cell 4 regulates input current. During the rising and falling above 125V zone cell 3 is activated to regulate input voltage across cells 3 and 4, cell 4 continues to regulate input current, and cells 1 and 2 continue to regulate output power. Also depicted in the timeline of FIG. 16 are the typical voltages present on each cell represented by V1 for cell 1, V2 for cell 2, V3 for cell 3, and V4 for cell 4. The cells are controlled (switched) so that at no time is a voltage across any one cell greater than 60V.

Referring back to FIG. 15, in addition to the four switched cells that are arranged in pairs, each pair drives the load through multiple primary windings of a transformer. Because the embodiment of FIG. 15 includes four cells arranged in two groups, two transformers are depicted. Although the embodiment of FIG. 15 depicts pairs of cells connected through a single transformer with multiple primary windings, an alternate embodiment could include other arrangements, such as a separate transformer for each cell. Although other types of isolation are possible (e.g. capacitive), transformer isolation also may provide benefits, such as facilitating storage of converter energy. Therefore, as depicted in FIG. 15, a VHF switched power converter may be configured to deliver power through a transformer connected to outputs of multiple switched cells through multiple primary transformer windings. Also, a plurality of such configured multiple switched cell to transformer circuits may be configured substantially in parallel to drive a load, such as an LED-based light. The embodiment of FIG. 15 further depicts controlling each switched cell separately while coordinating control of each cell within a designated pair to facilitate achieving various functional and/or performance objectives and/or coordinating control of each of the pairs of cells to achieve various functional and/or performance objectives as described herein and otherwise understood by one knowledgeable in the state of the art.

The embodiment depicted in FIG. 15 also facilitates power factor correction through at least the use of capacitor designated as CPFC and at least through the control of cell 3. Power factor may be corrected by controlling cell 3 in FIG. 15 so that capacitor CPFC charges and discharges throughout the power AC line cycle. In the AC line cycle portion depicted in FIG. 16, capacitor CPFC discharges during rising 0-80V and during falling 80-0V portions. Capacitor CPFC charges during rising and falling above 80V portions of the cycle.

Selected thresholds shown in FIG. 16 are representative only and may be adjusted based on the fabrication technology chosen for the cells, the number of cells, the frequency of switching, the output power, the capacitance value of CPFC, and various other design choices that may impact such thresholds.

Each cell in the stacked-cell configuration of FIG. 15 may require control bandwidth that facilitates proper control of each cell throughout an AC cycle. In an example wherein harmonics within the system are generally 1 kHz, cell 1 may be controlled at a 1 MHz rate, cells 2 and 3 at a 100 kHz rate, and cell 4 at a 10 kHz rate. This difference in control frequency may enable control for high efficiency, accurate cell voltage balancing, and the like.

The embodiment of FIG. 15 further includes an overvoltage protection circuit 1504 to facilitate protecting the VHF converter circuits from voltage spikes, overvoltage conditions, and the like. The protection circuit 1504 may be controlled so that input voltages to the converter and/or to any element or group of elements of the converter that exceed a maximum safe operating threshold may be limited by the protection circuit 1504 to avoid damage or overstress thereto.

In applications of the VHF power converter of FIG. 15 for driving a light, such as an LED-based light, dimming, such as by a phase-cutting line input switch (e.g. Triac for conventional incandescent bulb dimming), may be accommodated by the VHF power converter. For reliable phase-cut dimming, a minimum load may be required to be presented to the phase-cut dimmer throughout the phase-cut dimming function. This may be accomplished by controlling the VHF converter to present a low impedance when the phase-cut dimmer is blocking the AC line voltage through switch 1502 controlled by cell 3 in FIG. 15 and controlling the VHF converter to maintain a minimum holding current when the phase-cut dimmer passing the AC line voltage during the dimming function.

One approach to operate the VHF converter with a phase-cut dimmer for light dimming is for the VHF converter to detect the AC line conduction angle and adjust capacitor charging and output current accordingly. In LED-based lighting applications, the minimum holding current required by the phase-cut dimmer may be greater than the current required to power the LED. In this scenario, cells 1 and 2 in FIG. 15 may be controlled to regulate the output, cells 3 and 4 in FIG. 15 may be controlled to draw the required holding current and deliver no output power, and switch 1502 in FIG. 15 may be controlled to charge CPFC to the desired value to maintain the output power while the phase-cut dimmer is blocking the AC line voltage. By adjusting the control scheme based on conduction angle, dimming with a VHF power converter can be accomplished without adding components that are dedicated to the dimming function. This reduces footprint and costs of such a VHF solution over other multi-component dimming solutions.

VHF converters, and in particular multiple cell VHF converters may benefit from precise clock synchronization among the cells. When multiple cells share an output rectifier (as depicted in FIG. 15 for cells 1/3 and 2/4), clocks of the rectifier-paired cells may be synchronized. Generally cell to cell clock skew of 500 ps or greater may result in reduction in efficiency due to energy losses when operating at VHF frequencies. Although cells may be implemented within a single integrated circuit, some applications may demand separation of cells to distinct integrated circuits that are connected by printed circuit board traces and/or through additional components which may introduce additional skew. To accommodate precise synchronization of cell clocking, a reference clock may be provided throughout the VHF circuit topology that can be used to adjust for circuit related frequency skew. In addition, clock phase skew may be detected from analyzing flux generated by cell switching and transformer coupling with peak and hill climbing algorithms because phase skewed clocks may produce flux peaks that could be determined from such analysis. Clocks to the cells can be adjusted based on the detected peak analysis with the objective of improving cell to cell clock synchronization which may be determined by detecting a single flux peak. In embodiments in which cells do not share a rectifier stage, demand for cell-to-cell clock synchronization may be reduced.

Clock frequency accuracy (e.g. repeatability) that may also be important for highly efficient VHF conversion may be accomplished by use of Zero Voltage Sensing (ZVS) sensors that may facilitate accurate clocks without the use of a crystal oscillator, a complex calibration architecture, and the like. By taking a snapshot of an amplitude (voltage) of an input of one or more of the switched circuits an instant before the circuit is switched one can determine if the switch clock is occurring precisely as desired (e.g. when the input voltage is zero). The snapshot voltage may be used to control a phase-lock loop or the like to adjust the clock frequency as desired. In an application in which an AC line signal is used as an input to the VHF converter, the clock may initially be synchronized to the AC line input. This may facilitate effective use of a phase-lock loop by configuring the phase-lock loop to track the zero voltage crossing of the AC line input that is generally controlled to within approximately 10 percent. Once the clock frequency is locked to the a multiple of the AC line frequency, the converter can begin to run, and the ZVS sensors may be used to further set the clock frequency. The techniques for clock period adjustment and/or clock synchronization as described herein may further be used to overcome variations in manufacturing process and temperature-based drift that may impact clock related issues without requiring extensive production or test time calibration.

In VHF converter configurations that include a synchronous rectifier stage, maintaining a particular phase angle for the synchronous rectification may provide benefits including efficient and accurate operation of the conversion function. Detection and control of the phase angle of a synchronous rectifier may be implemented in a VHF converter through phase angle sensing and processing techniques, such as through the use of a delay locked loop, and the like. Phase angle control of synchronous rectification may include average feed forward sensing, zero voltage detection feedback, average sensing, duty ratio/clock frequency/phase angle adjustment based on sensed voltage changes, and the like.

Figure 18:
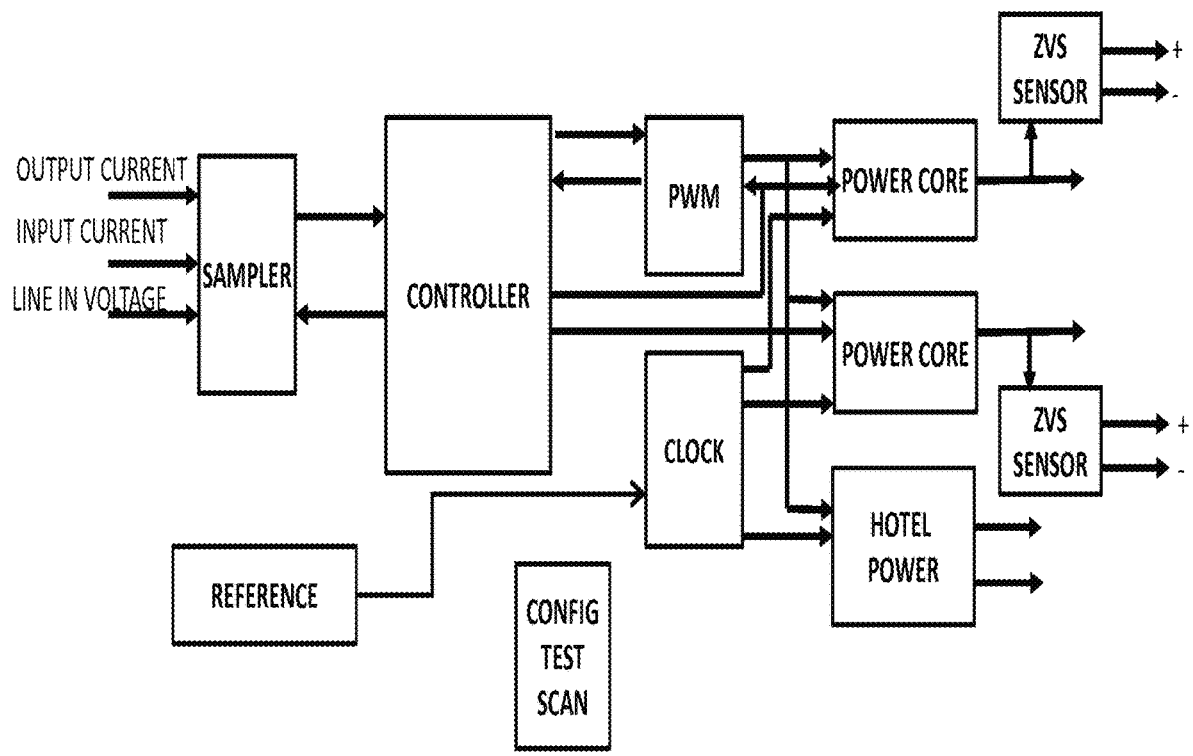
FIG. 18 depicts an exemplary VHF converter architecture block diagram.

A multi-cell VHF converter, such as based on the switched stacked cell converter architecture depicted in FIG. 15 may include control to facilitate cooperative operation of the cells and related components to achieve various functional and performance objectives, such as clock synchronization and others. Control may further be based on any of a variety of parameters including feedback associated with converting an input to an output voltage, predetermined parameters, learned parameters, user provided parameters, and the like. Control may be provided by a controller, such as logic, state machines, microcontrollers, and the like. FIG. 18 depicts a block diagram of a VHF power converter that includes control. A controller may facilitate control of the VHF converter to achieve a degree of constant input current, constant output current, and cell control based on aspect of an input voltage such as an AC line voltage.

Control may be based on a plurality of control loops a portion of which may be nested. In one embodiment of the VHF converter for powering an LED-based light, control may include at least two control loops—an outer loop and an inner loop that operates at a faster cycle time than an outer loop and that may implement proportional feedback to directly control each aspect of the VHF converter (e.g. cell clocks, feedback sampler, and the like). The outer slower loop may facilitate providing input to the inner loop when the inner loop is controlling the VHF converter to maintain a constant input current. The outer loop may facilitate detection and feedback of an average of the output current to ensure that an average of the output current is also controlled. The outer loop may first integrate the difference between an instantaneous output current and an output current reference (e.g. an average of the output current from a previous AC line cycle). This integral is then processed to generate a reference value for the inner loop.

Figure 17:
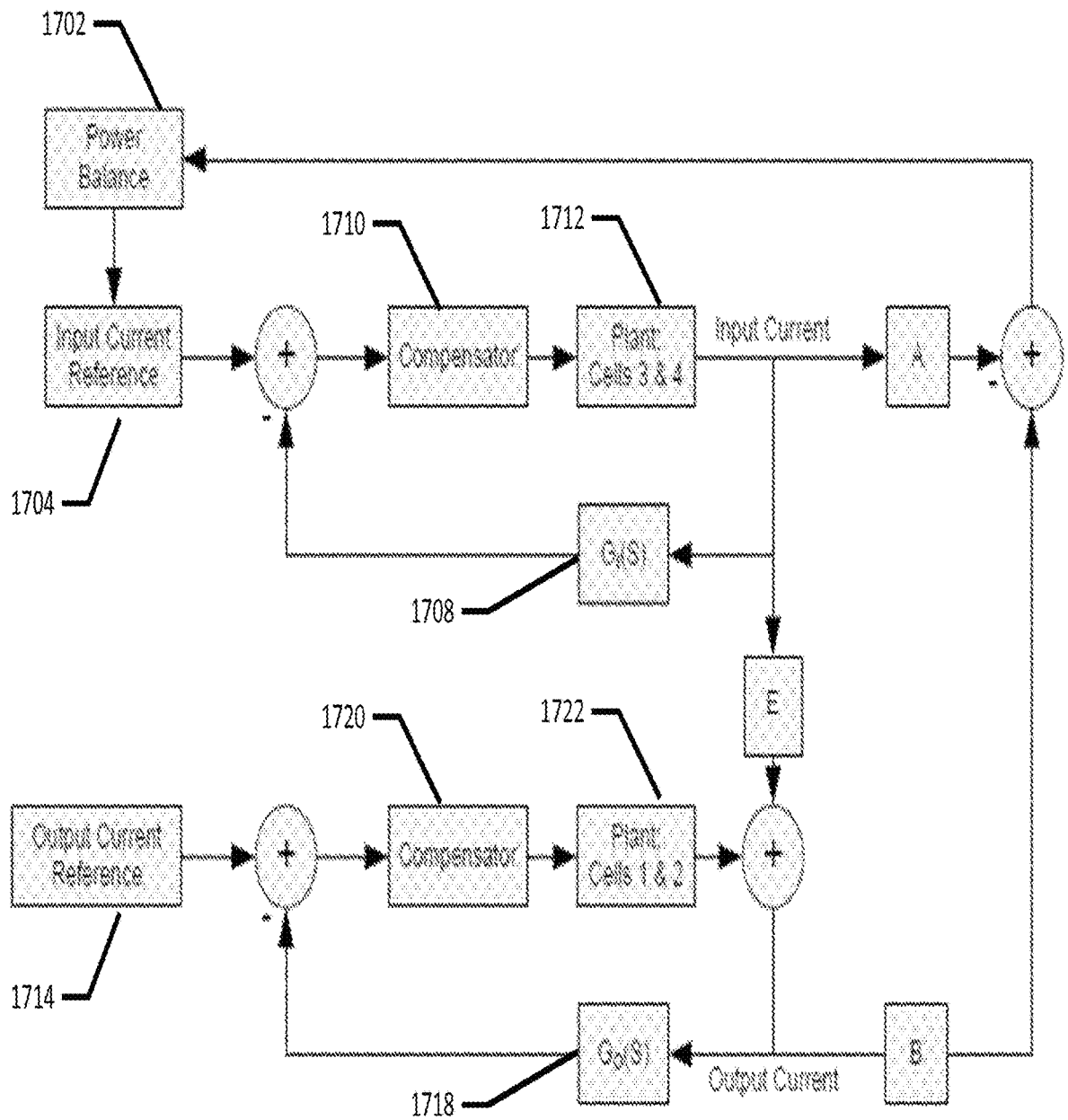
FIG. 17 depicts an input current control loop and an output current control loop.

Any number of control loops that may be required may be implemented in a controller, such as depicted in FIG. 17. Generally a VHF converter is controlled to maintain at least one of a desired input current and a desired output current. However, control of both input and output currents may be required to ensure high efficiency VHF conversion, to manage thermal impact, to perform power-factor correction, and the like. In another embodiment, a controller may include control for dimming, line voltage variation (normal cycle and exceptional variation), VHF converter start-up mode, steady state mode, line transient, and the like. Startup mode may be controlled to facilitate avoiding damage to the cells as power to the VHF converter turns on. Steady state mode may be controlled to facilitate efficient, high quality power conversion; Line transient or over-voltage may be controlled to facilitate protection of the converter cells and other devices, such as with the protection circuit 1704 described herein. Dimming may require control for operation of a phase-cut dimer, and the like as described herein.

Referring to FIG. 17, an input current control loop and an output current control loop are depicted. As noted in the description of FIG. 15, cells 1 and 2 primarily control output current and cells 3 and 4 primarily control input current. The flow diagram of FIG. 17 provides a visualization of control flow with respect to both input and output current. Input current (A) and output current (B) may be combined to provide feedback for power balance 1702 which may impact an input current reference 1704.

An input current control loop may include input current reference 1704 and filtered input current 1708 may be combined and processed, such as through compensator 1710, to impact control of cells 3 and 4 1712.

An output current control loop may include an output reference 1714 and filtered output current 1718 that may be combined and processed, such as through compensator 1720 to impact control of cells 1 and 2 1722. Output current control may further include combining sensed portions of input current (E) and sensed portions of cells 1 and 2 1722.

The cells of the converter are modulated on and off as a primary means for providing control of the input current, output current and voltage, and the like. In FIG. 18, a PWM block provides pulse width modulation control of the various cells, the power core, and the like. The PWM block may also provide overall PWM control of the converter output to enable pulse-width modulation of the output voltage or current presented to a load, such as to an LED-based light. This may be helpful in applications in which PWM operation of an LED-based light may facilitate adjusting color of an LED string, brightness of the LED, and the like. PWM control of the output may facilitate dimming an LED-based light in response to the converter input being controlled by a conventional phase-cut dimmer.

As described herein, control of a VHF converter, such as an AC to DC converter, a VHF stacked cell, soft switched converter, and the like may be based on input voltage requirements, output voltage requirements, instantaneous input voltage, average output voltage, and the like. In an AC-DC VHF converter, stack control varies throughout the AC cycle as described above in regards to FIG. 15 and FIG. 16. As noted above a control loop, such as may be executed by a controller, may be responsible for adjusting the number of active cells because the number may vary with the amplitude of the input voltage and/or the direction of the amplitude (rising or falling). Generally control may attempt to ensure that the active number of cells is proportional to a measure of input voltage. Activating (adding/turning on) a cell may be appropriate as input voltage rises. Deactivating (turning off/bypassing/removing) a cell may be appropriate as voltage decreases. Control may include a cell bypass function that may switch in/out cells from the active stack of cells to achieve certain objectives. In an example, opening a cell bypass switch as the input voltage increases may enable support for greater input voltages. In another example, closing a cell bypass switch as the input voltage decreases may maintain efficiency and facilitate staying within an operating range of the stacked cells.

Control of the various functions, cells, switches, and the like of the VHF converter may be provided by a communications channel among the elements. The communication channel may be an asynchronous bus that may be implemented as any type of physical bus. The communication channel may be an isolated. Examples include a level shifting bus, a digital bus, capacitive coupling, magnetic coupling, optical coupling, and the like. The communication channel infrastructure may include individually addressable cells and subsystems on and among circuits in the converter. Messaging over the communication channel may include high/low priority messages, broadcast messages, single listener messages, and the like.

Figure 19:
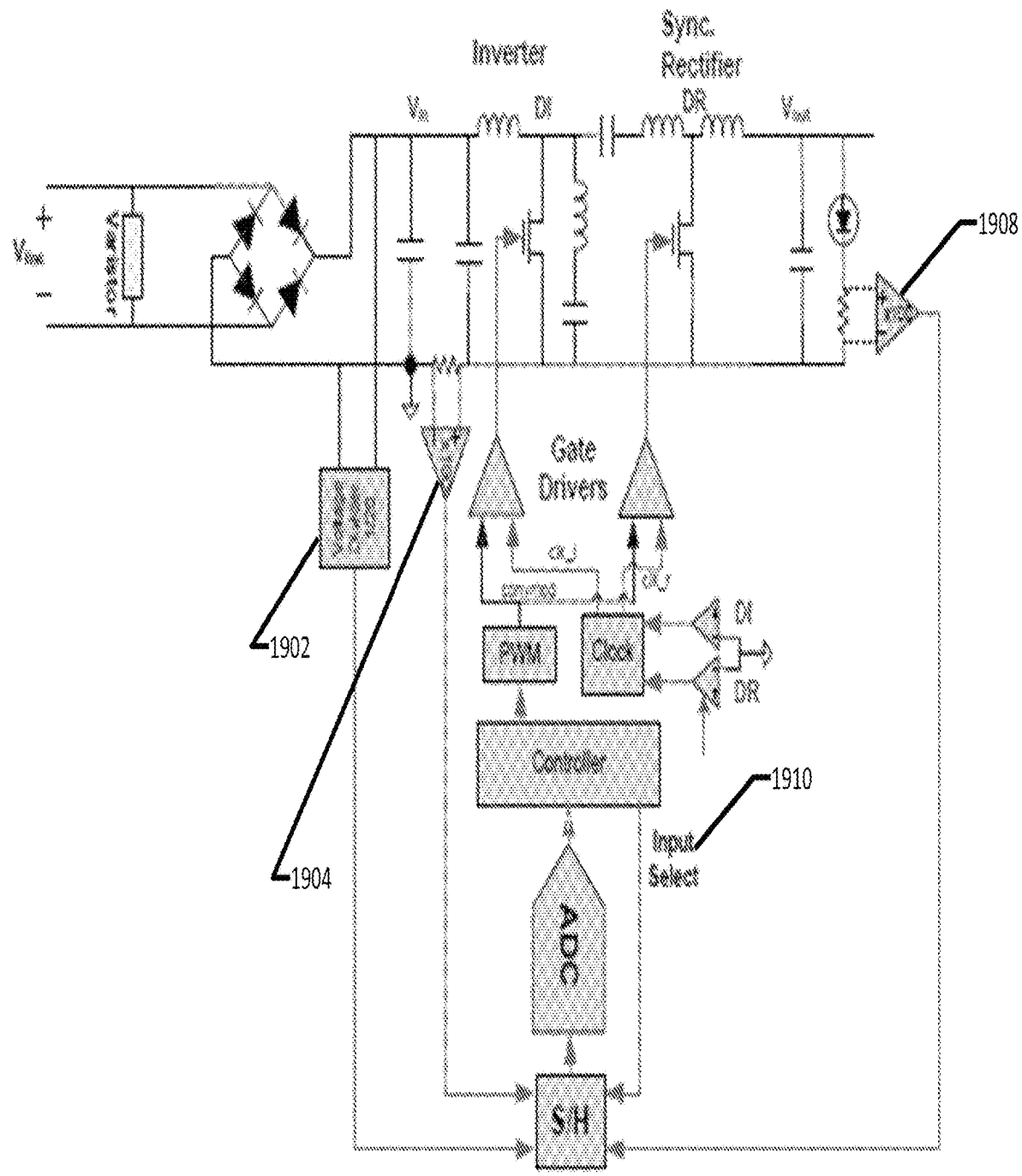
FIG. 19 depicts an embodiment of a VHF converter that maybe suitable for use with MR16 lighting applications.

Referring to FIG. 19, an embodiment of the inventive VHF power converter system described herein that may be suitable for use in MR16 type lighting power applications, some additional control-related techniques are depicted. In addition to PWM, control, input and output sensing, and the like, characteristics of any of the inverters and/or of the synchronous rectifier may be sensed and used in control, such as to control clock phase, skew, zero voltage switching, and the like. In the embodiment of FIG. 19, waveform characteristics for an inverter denoted as DI and/or waveform characteristics of a synchronous rectifier denoted as DR may be sensed, compared to a threshold, and provided to clock control logic for use in controlling clocks to individual cells, to gate drivers, and the like. Sensing DI and/or DR may enable dynamic control of clock related aspects to facilitate compensating for manufacturing variations, temperature drift, and the like. FIG. 19 also depicts various other control inputs including sampling the VHF converter input voltage that may be optionally divided by divider 1902 to support full AC line voltages, input current sensing 1904, output current sensing 1908, controller state/input sensing 1910, and the like.

Powering switch drive gates in a VHF power converter may require a substantial amount of drive energy (e.g. hundreds of milliwatts). In a semiconductor process, a switch drive gate may need to be driven in the range of 0-3 volts, yet a typical VHF power converter may receive as much as 120 VAC input. Therefore, converting a rectified AC line to the 3 volts required for driving a switch drive gate can be costly in real estate, heat, efficiency, or the like. In addition to requiring a power source for the switch drive gates, digital logic for a VHF power converter also needs a continuous source of power to keep the digital logic functioning properly to control the VHF power converter for example. To provide the continuous power for digital logic and/or for switch drive gate operation, an auxiliary source of power may be provided. This auxiliary power may be provided by a dedicated VHF converter circuit that converts a main power close to the required voltage.

An embodiment of a dedicated VHF converter for auxiliary power may be designed to overcome many of the drawbacks noted above while providing a continuous source of power. Such an embodiment may function in two controlled power phases (i) using the main VHF power input for charging an auxiliary power capacitor that provides energy storage to drive auxiliary power loads (sending energy to the auxiliary power subsystem), and (ii) discharging the auxiliary power capacitor to generate power that can be provided back to the main VHF converter that provides power to the main load (sending electrical energy from the auxiliary power subsystem to the main power converter system). A ratio of time driving power to the auxiliary power subsystem versus time driving power from the auxiliary power system to the primary VHF converter system may determine the average auxiliary power provided. Switching between driving power into the auxiliary power system and driving power out of the auxiliary power system may be adjusted (phase, duty cycle, and the like) to manage average auxiliary power consumption. A dedicated VHF converter configured as described herein for providing auxiliary power may be much more efficient than a linear regulator and much smaller than a Buck-type converter.

Operation of a dedicated Auxiliary power converter may include alternating between a first phase that rectifies AC power generated from a portion of a main VHF converter stage (e.g. an inverter) and provides the rectified power to an auxiliary output for use and storage thereby and a second phase that generates AC power from the stored auxiliary power and provides the generated AC power to the main VHF converter.

Figure 20:
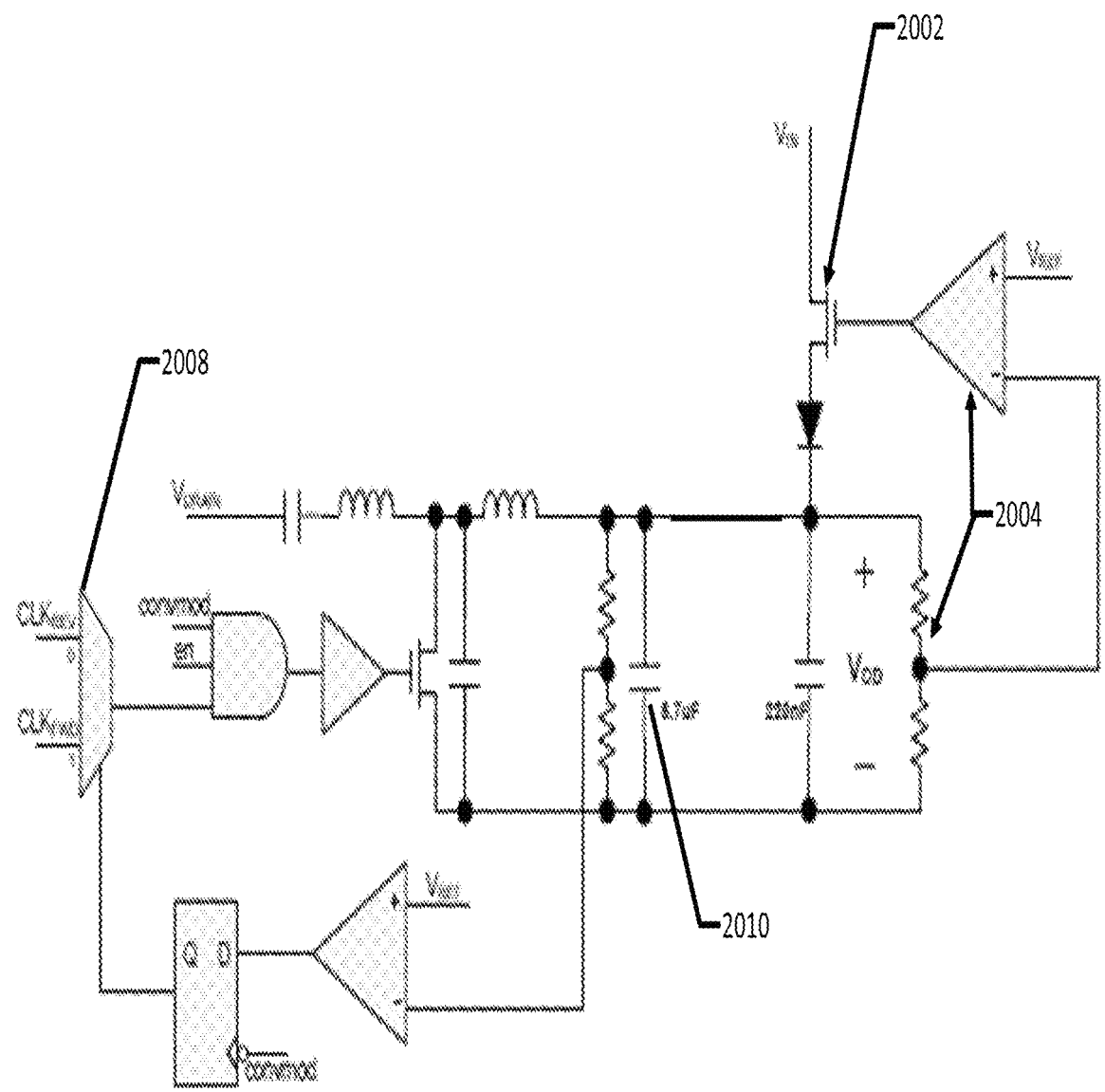
FIG. 20 depicts a bi-phase auxiliary power circuit.

Such a bi-phase auxiliary power circuit is depicted in FIG. 20. First to facilitate proper operation during initial power-up (e.g. before the auxiliary power VHF rectifier is a reliable power source), a linear regulator circuit 2002 may be included to power circuits during power-up. Once the converter control logic and power circuits are stable, the linear regulator may be disabled via linear regulator monitor 2004 to reduce overall power consumption.

Energy transfer direction may be controlled by selecting a clock source 2008 for the auxiliary power dedicated converter. CLKFWD and CLKREV may clock the auxiliary VHF converter at different phases of the AC cycle to result in energy being transferred to auxiliary power capacitor 2010 when clocked by CLKFWD. When clocked by CLKREV, energy may be reversed from capacitor 2010. Auxiliary power VDD may be maintained during CLREV operation by the energy stored in capacitor 2010.

Figure 21:
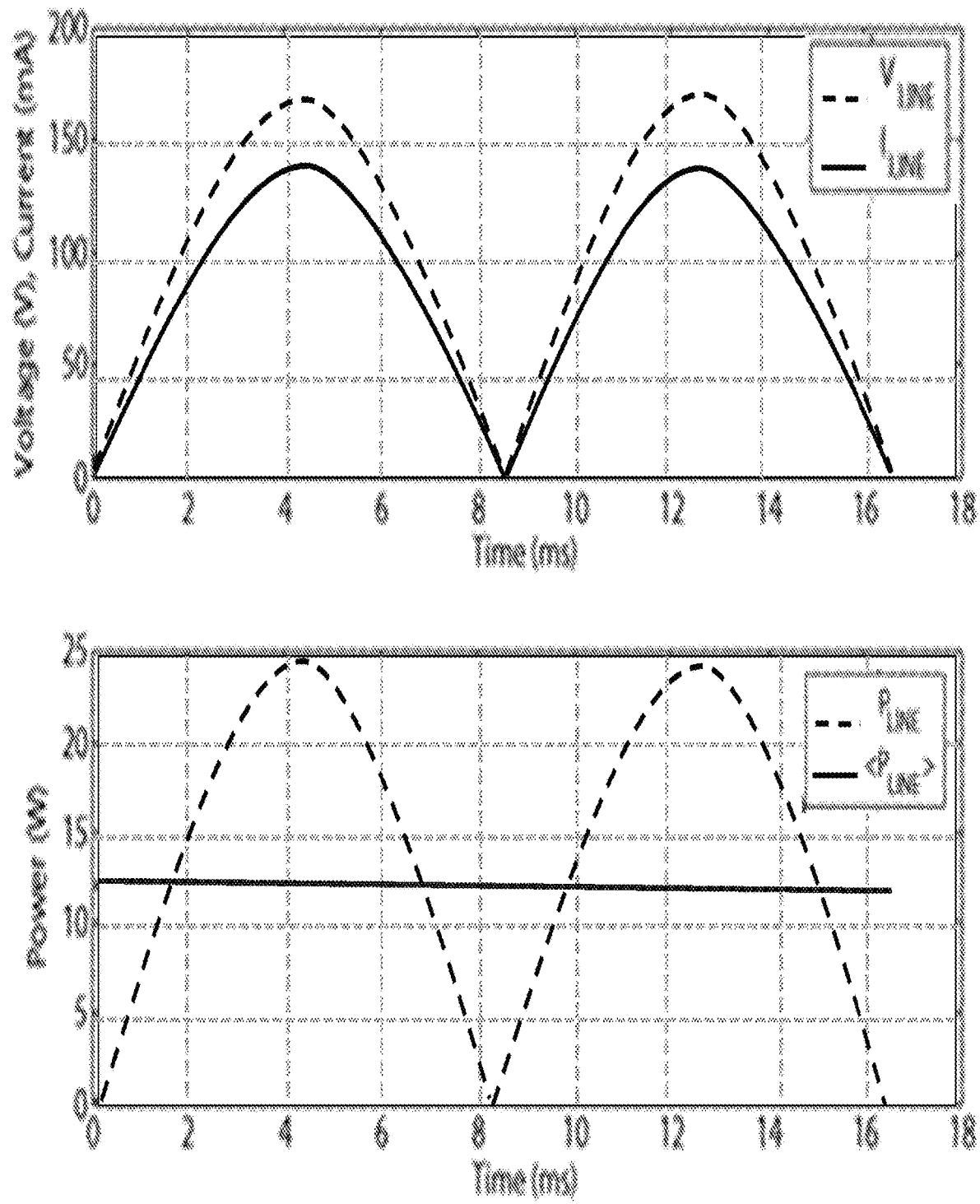
FIG. 21 depicts a waveform of a rectified AC voltage with a current waveform that achieves unity power-factor.

Power-Factor Correction (PFC) is a power conversion technique that limits the amount of reactive power drawn from a source. High power factor, which is defined as the ratio of real to apparent power, is achieved by controlling the current that is drawn from a source such that the load appears to be substantially resistive. PFC is often employed in devices that are connected to the AC main as reactive power unnecessarily loads the AC grid. FIG. 21 shows the waveform of a rectified AC voltage with a current waveform that achieves unity power-factor. From this figure it is readily observed that a key limitation and challenge faced by AC/DC PFC converters is the necessity to buffer energy at twice the AC line frequency as the power drawn from the AC source reduces to zero twice per cycle.

An energy buffer may be required to maintain the DC output power while the input power drops to zero. This energy buffer is often realized as a capacitor. A simple method of implementing the buffer is to include a capacitor at the output of single-stage PFC converter. An arbitrarily small output ripple can be obtained by increasing the size of this capacitor. However, in many space-constrained applications this can be prohibitive as the volume occupied by the capacitor can be quite large.

For a given output power, the size of the energy buffer capacitor may be reduced if its voltage is allowed to ripple as a function of the line power. However, this method is incompatible with the simple single-stage PFC solution described previously. In that solution the capacitor is connected directly across the output and the load ripple voltage and capacitor ripple voltage are identical. Since most loads require a stable DC output with very small ripple, a second converter may be cascaded in series with the first to remove the ripple from the output as was shown in FIG. 13. In such a configuration, the output port of the first converter is attached to the input port of the second converter and this common port is also shared by the capacitor. This allows a pure DC output to be obtained while the capacitor voltage is rippling, but efficiency suffers owing to the system efficiency being the product of the efficiencies of each stage.

Yet another approach to reduce the capacitor size involves a single stage AC/DC converter with the energy storage capacitor located at the input. This allows a much smaller total capacitance because the energy is buffered at line voltage and the total energy stored in a capacitor is proportional to its terminal voltage squared. This solves the problem of poor efficiency experienced with two-stage converters while also allowing for a small capacitance. However, existing examples of this approach have poor power factor (typically 0.5 or less) because the capacitor contributes a current component that is orthogonal to the rectified line voltage.

Herein we describe an AC/DC PFC converter architecture that achieves a fully-regulated DC output with arbitrarily small ripple, high efficiency, and high power factor with use of a small energy storage capacitor. The architecture uses a plurality of converter cells connected to provide multiple single-converter-cell paths from the source to the load. This allows for high efficiency while providing control over the current drawn by an energy storage capacitor connected to the input side of the converter cells such that the system has high power factor. This capacitor can store energy at a relatively high voltage and with substantial ripple enabling it to be very small. The resulting converter, fully described below, is a significant advance over state-of-the-art PFC converter technology.

Figure 22:
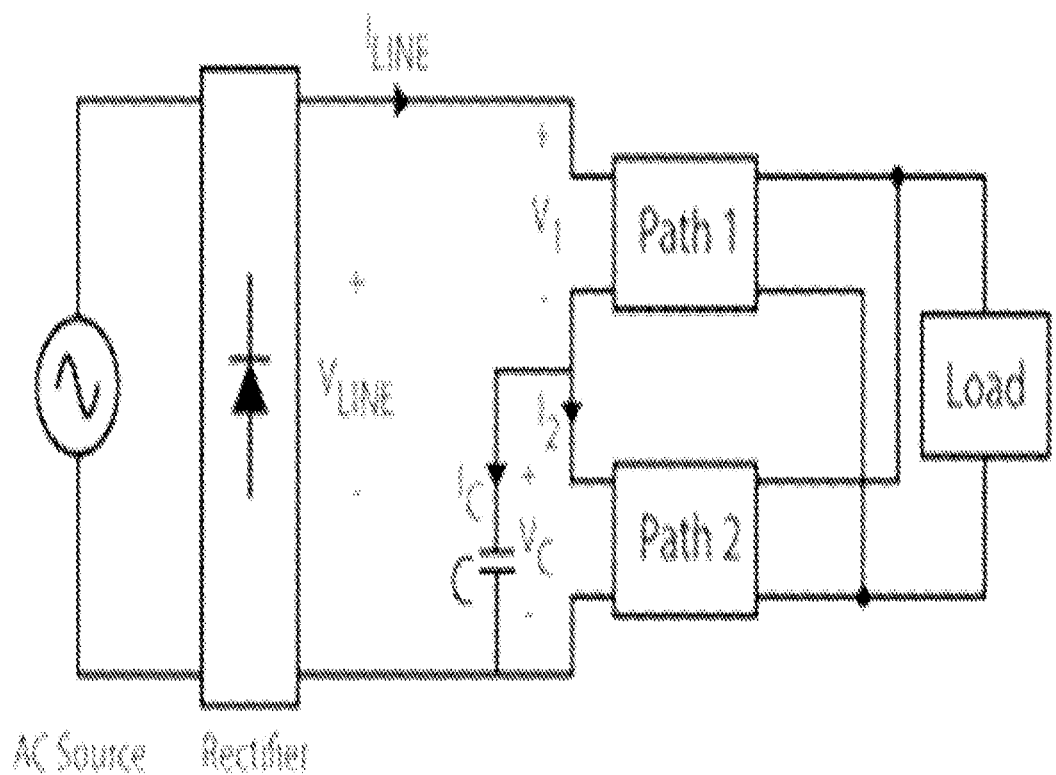
FIG. 22 depicts a block diagram that illustrates one implementation of power factor correction.

FIG. 22 presents a block diagram that illustrates one implementation of the power factor correction methods and systems of this disclosure. This implementation operates with two paths for energy transfer to the load that are series connected across the rectified AC source and parallel connected across the load. This implementation also includes a capacitive energy storage network in parallel with the input to one of the energy transfer paths. The energy transfer paths are controlled such that a fraction of the energy drawn from the AC source is delivered to the load, and the remaining fraction of the energy is delivered to the capacitor. As shown in FIG. 22, the input voltage of energy transfer path 1 (V1) is equal to the rectified AC voltage (VLINE) minus the capacitor voltage (VC). Since Path 1 is in series with the rectifier, the power that is drawn by this path sets the current that is drawn from the AC source (ILINE). The capacitor current (IC) is set by the difference between the ILINE current and the current drawn by energy transfer path 2 (I2). This allows the ratio of power delivered to the load and power delivered to the capacitor to be controlled.

One method to perform AC/DC PFC with this architecture is to control Path 1 to draw the desired PFC current waveform from the AC source. Since the voltage V1 is set by the difference between VLINE and VC, Path 1 is unable to perform PFC by controlling the input current and simultaneously regulate the output. However, if over the entire line cycle the instantaneous power drawn by Path 1 is no more than the DC output power delivered to the load, Path 2 can be used to regulate the power delivered to the load by supplying the difference between the DC output power and the power delivered by Path 1. The difference in energy (e.g. an instantaneous difference) between what is drawn from the AC line and what is delivered to the load is naturally sourced or sunk by the capacitor.

Figure 23:
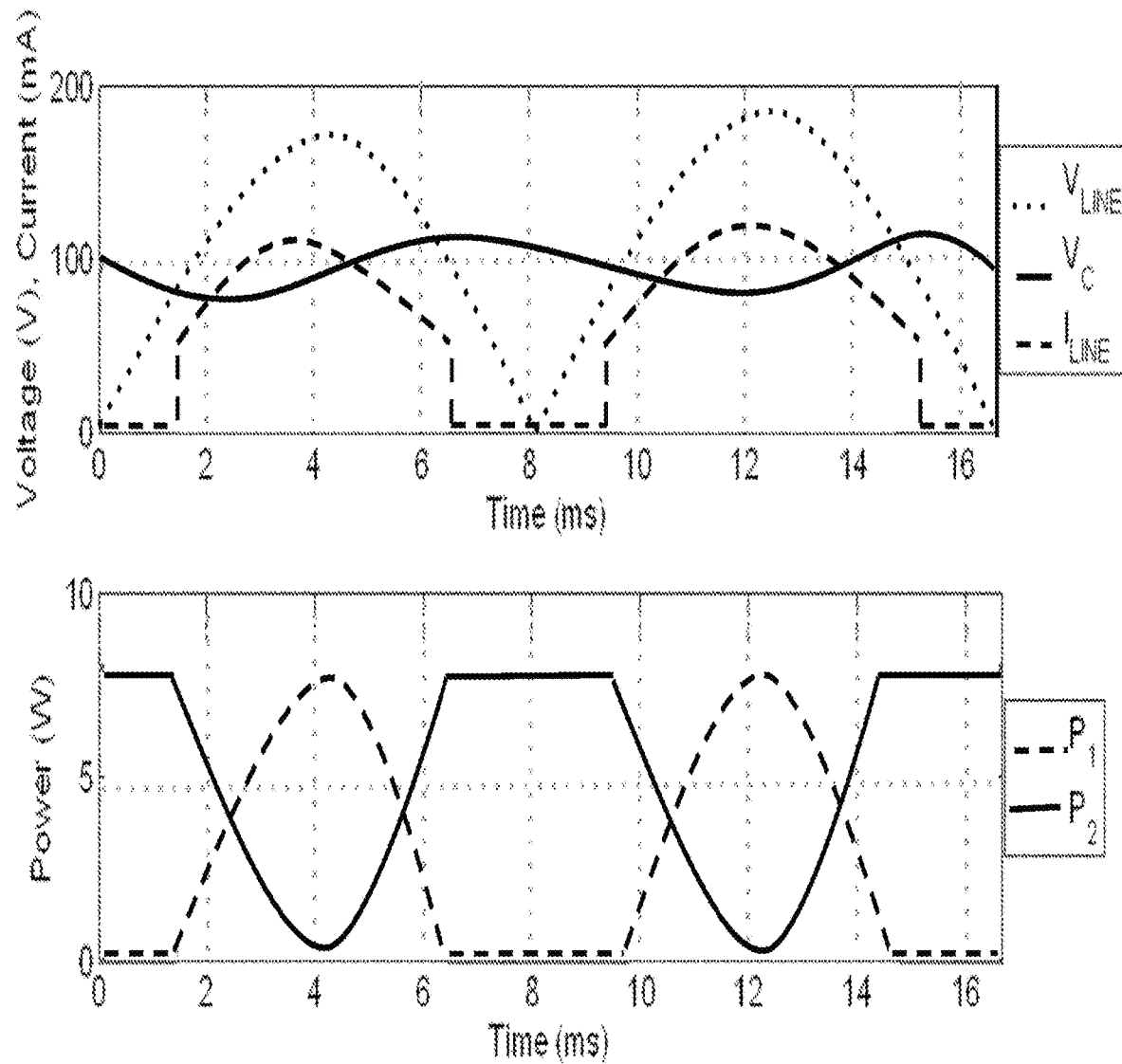
FIG. 23 depicts simulated waveforms over a single AC line cycle for the power factor correction embodiment of FIG. 22.

FIG. 23 presents simulated waveforms over a single AC line cycle for the PFC implementation of FIG. 22. Energy transfer path 1 begins conducting when VLINE rises above VC. A pure DC output can be obtained if the sum of P1 and P2 is equal to average power drawn from the AC source. This condition is met if $$V_C \geq V_{LINE} - \frac{P_{AVG}}{I_{LINE}}$$

while Path 1 is conducting. The capacitance must be chosen such that the capacitor voltage does not violate this relationship. Path 1 ceases conduction when VLINE drops below VC. Path 2 then discharges the capacitor to maintain the DC output power until VLINE rises above VC in the next half line cycle, at which point the cycle repeats.

With this configuration, unity power factor might not be obtained since current might not be drawn from the AC source throughout the entire line cycle (i.e. the portion where VC is greater than VLINE). While unity power factor might not be obtained, the waveforms of FIG. 23 achieve a power factor greater than 0.95 which is sufficient for many applications.

One method to implement each energy transfer path is through the use of a high frequency switched-mode power supply (SMPS) (e.g. with a switching frequency that is greater than 1 MHz, for example). On/off control can be used to obtain the desired average output of each SMPS to supply the load.

Figure 24:
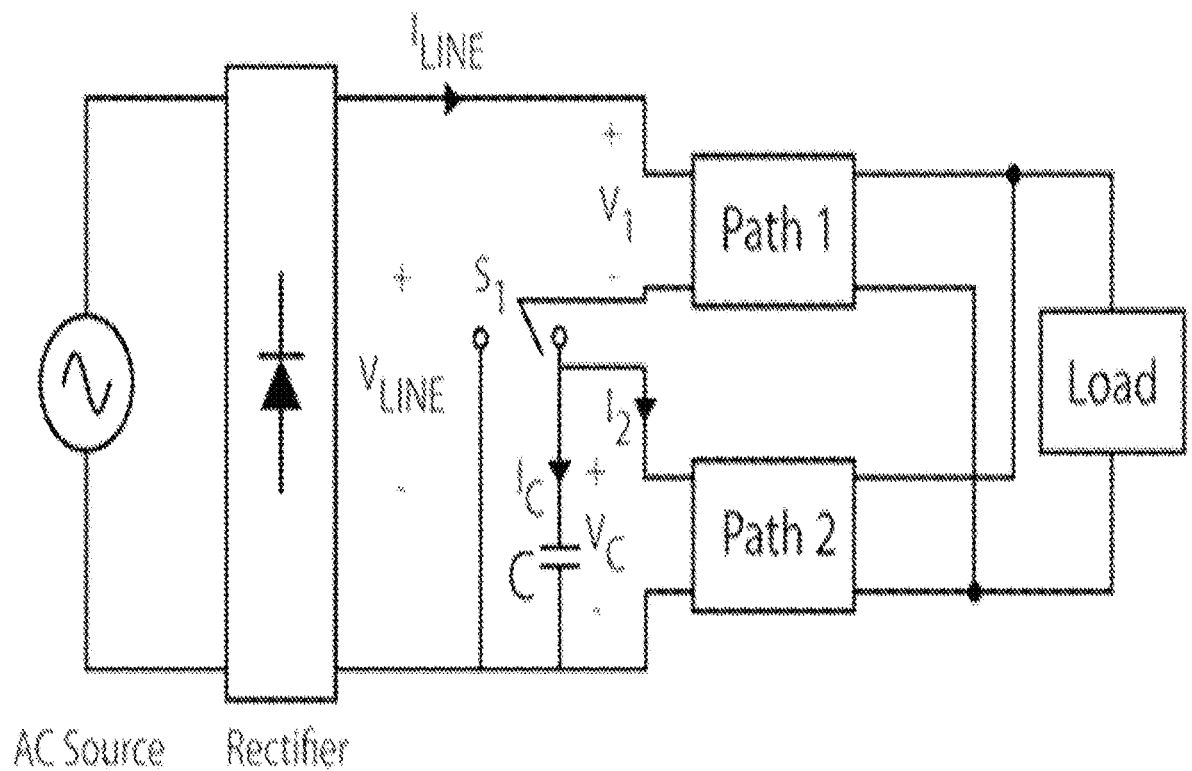
FIG. 24 depicts a switch network embodiment of a power factor correction circuit.
Figure 25:
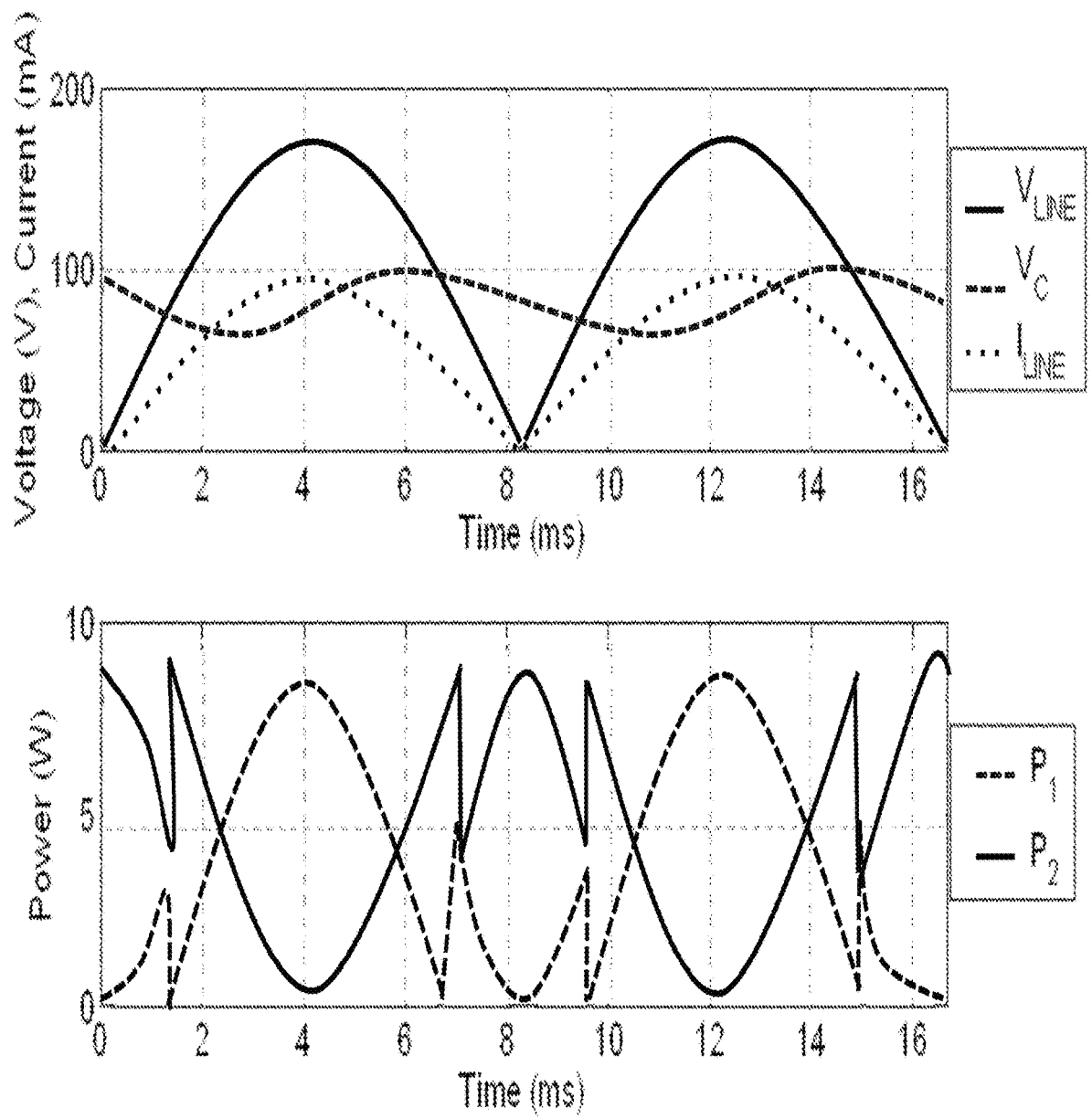
FIG. 25 depicts sample waveforms over a complete AC cycle for the embodiment of FIG. 24.

A second implementation of power factor correction includes a switch network in addition to the previously described implementation such that unity power factor may be obtained. FIG. 24 presents a block diagram of the implementation. The switch network, labeled S1 in FIG. 24, is utilized to enable energy transfer path 1 to conduct current (e.g. control ILINE) throughout the entire AC cycle. In the portion of the AC cycle for which VC is greater than VLINE, the switch S1 is used to bypass the capacitor and energy transfer path 2, such that the voltage across the input of Path 1 is not driven negative. This enables Path 1 to conduct current throughout the entire line cycle and unity power factor may be achieved. FIG. 25 presents sample waveforms over a complete AC cycle for this implementation. Since Path 1 is enabled to control ILINE throughout the entire line cycle, unity power factor is achievable. Furthermore, this implementation has an advantage when used in applications in which the frequency components of ILINE are constrained since ILINE is controlled throughout the entire AC cycle.

Figure 26:
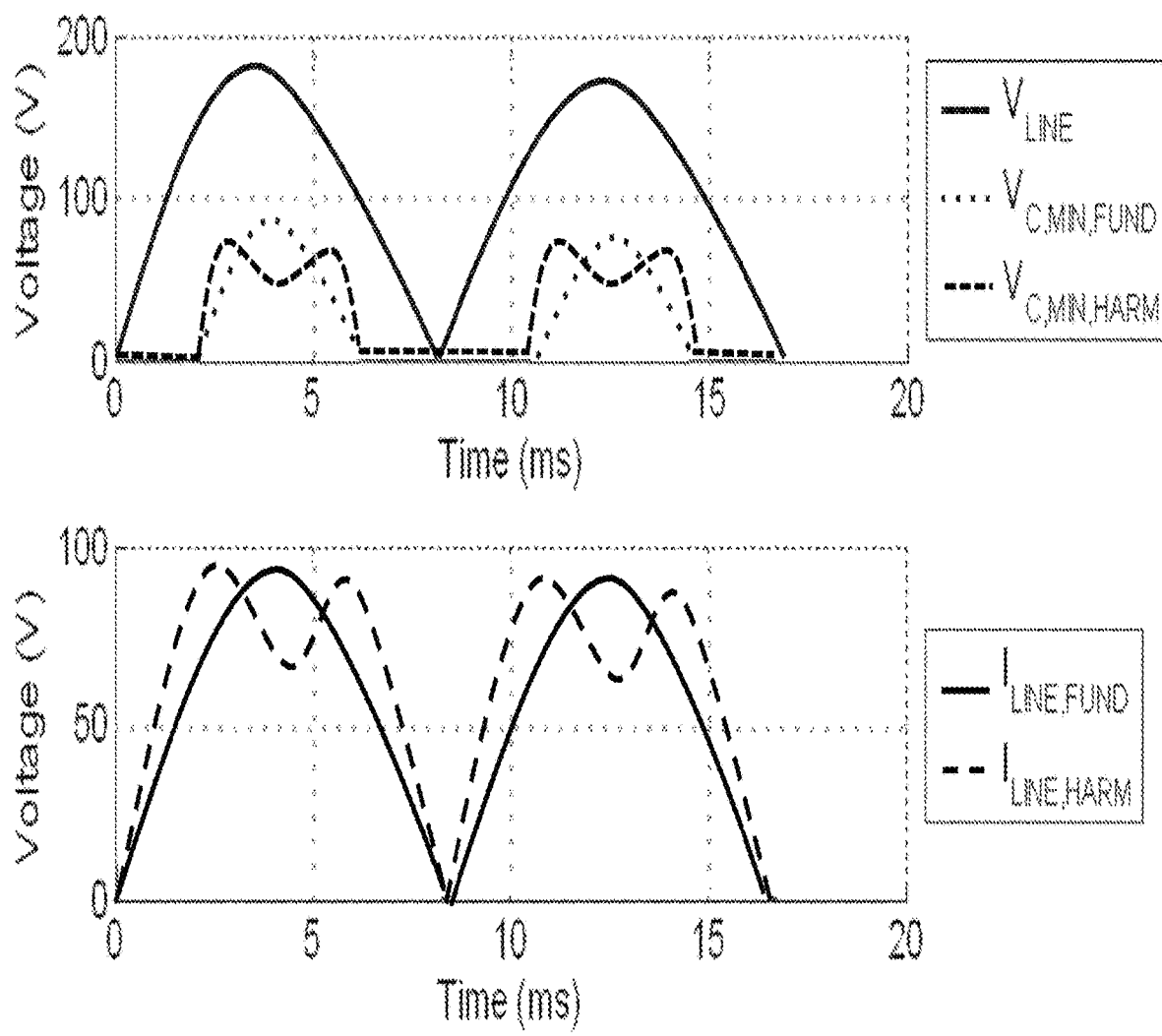
FIG. 26 depicts an example current waveform is presented that contains odd harmonics in addition to the fundamental.

It will be appreciated that there are a range of variants to the PFC architecture discussed herein that fall within the scope of this disclosure. For example, it is not necessary that the current drawn from the AC source be substantially sinusoidal. In many applications it is acceptable to draw current from the AC source that contains frequency components in addition to the fundamental. In FIG. 26 an example current waveform is presented that contains odd harmonics in addition to the fundamental. The current waveform has a shape that may not peak at the same time as the AC voltage within an AC cycle. As a result, the peak minimum capacitor voltage for maintaining a pure DC output may be reduced. With this reduced peak, a smaller capacitance can be used because VC may ripple over a wider range without violating the minimum.

Furthermore, while the exemplary embodiments have described a pure DC output, a time varying output (e.g. AC) can be utilized without departing from the scope of the disclosure. For example, allowing the output to ripple with a fundamental frequency equal to that of the AC source reduces the size of the capacitor required. Additionally, in many applications it is desirable to control the output to an average value, such as through on/off modulation. One such application is driving one or more LEDs for illumination or other applications where it is desirable to achieve a consistent set of light emission characteristics as the power delivered to the LEDs is varied. This may be accomplished by driving the LEDs at a particular instantaneous power level, and then controlling average power through on/off modulation of the LEDs (e.g. such as with high frequency switched-mode power supplies as described herein). Implementing this with multiple paths for energy transfer to the output may be accomplished by the energy transfer paths being controlled such that when any subset of paths is conducting the load is delivered a constant output power. One way this can be accomplished is to interleave the on-time of each subset of the energy transfer paths. As a result, each subset may deliver the desired instantaneous output power, and only a single subset may be delivering power at a particular instant of time.

The previously described implementations include the use of two energy transfer paths and a capacitive energy storage network. The scope hereof includes the generalization of this technique to a plurality of paths for energy transfer to the output, where the energy transfer paths are controlled to deliver a fraction of the energy to a capacitive energy storage network, and a fraction of the energy to the load.

Many electronic systems require multiple regulated output voltages or currents derived from a single input source. For instance, in a cellular telephone there are typically multiple buss voltages—a logic core voltage, an intermediate voltage for interface, and a third that is used for the RF power amplifier. Some phones may require a high voltage or power output for driving LED camera flashes or displays, as well. Many complex systems have similar requirements. Often these are met by using a multitude of independent regulators, whether linear or switch-mode, where each produces one of the desired outputs.

Another common realization of multiple outputs is a single converter, such as a switch-mode power supply (SMPS), with multiple taps on a transformer or inductor winding. Each point on the winding can be used to provide a desired output voltage relative to a single regulated voltage. This has the benefit of reducing the overall complexity (and typically, size) of the system, but only permits the regulation of one output voltage. The others are subject to variations introduced by AC-side reactance, such as transformer leakage inductances that make the output voltage a function of the load current.

Regulation of each tap in a multiple-output converter as described above may be accomplished (where required) by means of linear post regulation stages. A low-dropout, linear regulator (LDO) is inserted between a tap and provides compensation for the droop that normally occurs. This is effective, but requires the addition of an LDO for each desired output (excepting the one that is already regulated), adding cost and complexity to the system. It also reduces efficiency, as some minimum dropout voltage is required for the LDO to function properly.

Herein we describe a high-efficiency converter system that is capable of producing multiple independently regulated output voltages and/or currents using a single converter without the addition of a tapped magnetic structure, or LDO post-regulation stages. In the proposed converter system, multiple outputs may be obtained when the single converter core is employed on a time-share basis. This allows a single power stage to alternately connect to any one of the loads to affect regulation as needed. In most cases, this may require a very high bandwidth power stage, precluding the approach for SMPS systems operating at typical switching frequencies (1 MHz and below). VHF power converters, such as those described herein may have the necessary bandwidth allowing many outputs to be serviced with high bandwidth.

Figure 27:
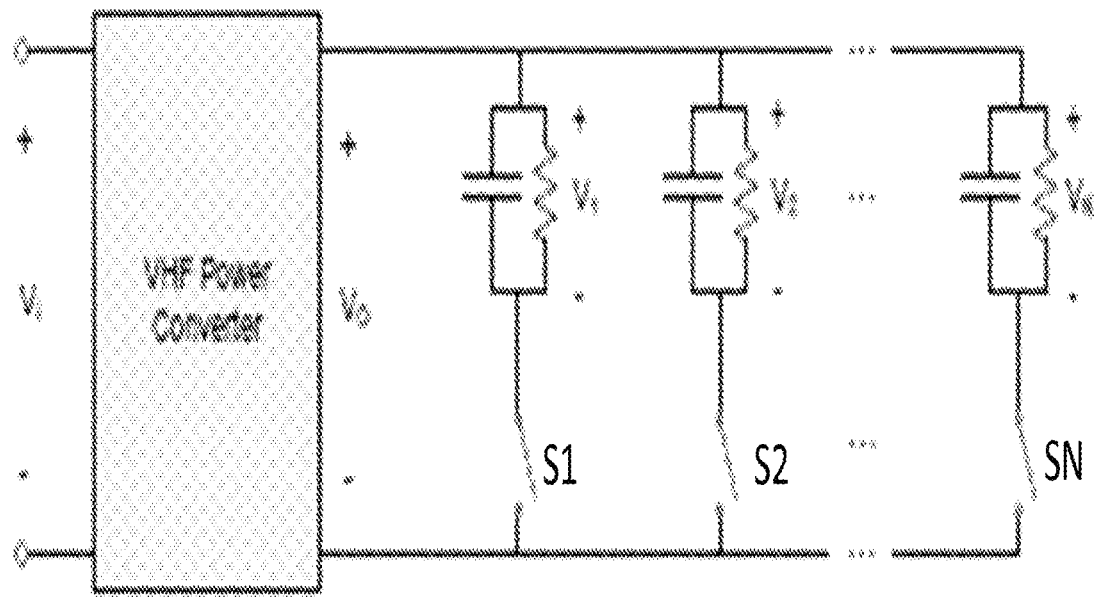
FIG. 27 depicts a multi-channel embodiment of a VHF converter.

FIG. 27 shows a VHF power converter implementation with multiple time-shared outputs implemented as described herein. The converter may be a high-bandwidth converter that alternately supplies energy to a plurality of loads according to a schedule imposed by a control system. The converter system may be capable of supplying the total average power delivered to each load as well as the peak power required of any given load over the course of a modulation cycle. It may also operate over the output voltage range set by the difference between the minimum and maximum output voltages.

In one method of control, a controller may simultaneously monitors each load (V1, V2, V3 . . . ) as depicted in FIG. 27. The converter is then connected through switches S1, S2, S3 . . . to each load over an even fraction of the total modulation period TM equal to TM/N, where N is the number of loads. When any individual load is connected to the converter cell (a period henceforth referred to as a load window), the converter may operate such that the average output voltage or current over TM is maintained at the desired value according to a reference value that may be accessible to the controller. This may be achieved by varying the on-off modulation duty ratio of the converter cell during the load window. As the load demands more power, the duty ratio may be increased and vice versa. The controller cycles through all the load windows in the period TM, therefore no load remains unregulated for a period longer than TM−TM/N. Since TM can be short with a high performance power stage, the effective regulation bandwidth can be very high.

This method of regulation may be achieved when the power stage is capable of a peak output equal to N times the highest average load power. This derives because the converter cell may only deliver power to a load for 1/N of the modulation period, TM. When a constant output is desired, the load capacitors shown in parallel with the load V1, V2 are preferably sized to sustain the output during at least the period (N−1)TM/N.

Another method of control relaxes the requirements on the converter and filters. In this method, the load window periods may be dynamically scaled according to the average output power of each load. This may permit the converter to spend more time supplying power to larger loads while reducing the peak power required of the converter for a given average load power. One such method is to scale the load window period in direct proportion to the average power demanded from the load. This will give longer windows to higher loads. In steady stage this may correspond to requiring minimum peak converter power. The load window scaling period may be adjusted at a frequency well below the cutoff of a control loop frequency of the converter. However, in certain cases it will be advantageous to make the load window period nearly equal to or equal to the duty ratio of the converter with respect to the load.

For the converter depicted in FIG. 27, the operation when supplying three loads with different output voltages is described subsequently. Each output is assumed to be a unique value for the purpose of illustration, though all could be identical in practice.

The modulation period is divided into three distinct periods defined by which load is connected to the converter's output. Each of these periods is a load window, occurring when the respective load switch (S1-3) is closed and the others remain open. For this particular example, the load windows are of constant length and active sequentially.

During operation, a master controller continually monitors the output voltage of each load. When a load window becomes active, the converter output voltage may quickly rise (or fall) to close to the load voltage required. The converter may then be operated for a fraction of the load window period, such that the output voltage is maintained within pre-specified limits over the entire modulation period. The fraction of the load window period may range from 0 to 1 and may be determined in an average sense by the controller. In one example control scheme, each load is controlled by an independent window loop where the fraction of the window would correspond to a duty ratio similar to a standard PWM control scheme. A primary difference being that the fraction relates to the actual converter on-time, such as by a scale factor of TW/TM.

When the master controller asserts the "next" window, control of the converter is based on a "next" window loop. The converter output may immediately slew to the "next" output voltage. The converter may then be operated with the appropriate duty ratio as described above. This cycle may repeat continuously as the master control loop sequentially shifts the active window.

Owing to the very small energy storage inherent in a VHF power stage, the output voltage slew time at the start of each new load window may be very short. As a result, it has substantially no effect on the control system in an average sense. Instead, control may be dominated by the load-output capacitor time constant, and the window-window modulation delay. This may allow standard PWM schemes to be directly compatible. Many other control schemes are possible where the converter output is time-shared across multiple loads. These include hysteretic, average current mode control, and PWM with hysteretic override.

A primary benefit of this scheme is the ability to simplify the overall converter architecture while achieving multiple fully-regulated outputs. This derives from the time-sharing aspect of this technique as enabled by a high-bandwidth VHF converter as described herein.

One application of particular interest is for control of multiple LED strings to affect color shifting and modulation of overall brightness. In this case, the converter may operate as a current regulator. Each string may be one load. As the converter cycles through each load window, the output current may be regulated to the desired value and the power stage may naturally obtain the desired string voltage very rapidly. Since the current to each stage can be independently regulated using this scheme, color shifting may be readily achieved. A master control loop may set the current for each string such that the color temperature and brightness may be simultaneously satisfied.

Since the AC/DC VHF converter stages described herein may also have very high control bandwidth, a VHF AC/DC converter may be readily controlled in this manner. The result is a converter system that achieves independent regulation of multiple output strings in a single stage. This compares favorably with existing technology that requires a separate AC/DC stage to provide a regulated DC rail followed by a dedicated set of controllers that are DC/DC converters to match the voltages required by each string. For the LED case, in particular, it may not be necessary to use hold-up capacitors at the output because the modulation frequency can be maintained very far above the persistence of vision limits of the human eye.

Another application of particular interest is in portable electronics that require multiple output voltages, for example, the cell phone. In this case, each output is buffered by a capacitor that is sized to sustain the output during the interval when the converter is servicing other loads. Allowing for dynamic windowing in this case can minimize the load capacitor sizes. The total system size may be reduced regardless, because multiple power stages may be replaced by a single controllable stage that may have equivalent or greater power density.

A VHF power converter architecture as described herein may operate with very high efficiency. Efficiencies of 70% or greater can be delivered by a VHF soft-switched power converter through modest control optimization. Although higher efficiencies may be desirable in limited applications, the VHF power converter architecture described herein may operate at efficiencies of 90% or greater with control optimized for efficiency.

Very high efficiency may also ameliorate a demand that is often an important consideration in switch mode power supply integration—heat build up from efficiency loss. The result may be a very highly efficient converter that produces less heat energy per unit volume (power density) than conventional converters for a given output power requirement. At 50% efficiency, a SMPS must dissipate half of the energy that it consumes from an input as heat. Whereas an 80% efficient VHF power converter based on the soft-switched cell technology and the like described herein need only be concerned with dissipating twenty percent of power consumed as heat.

VHF power converter size may be influenced by the component technology required; therefore faster switching rates generally enable smaller devices. Key component size considerations include inductors and capacitors. By reducing the amount and quality of stored energy, the high efficiency, soft-switching VHF converters described herein may be successfully and economically implemented with small value (and therefore small size) inductors and capacitors. While these two components are not the only beneficiaries of the architecture and switch control techniques described herein, they are generally significant size factors. By enabling use of air-core printed circuit board etch-based inductors and/or transformers with or without magnetic core material, physical device size is essentially moot. The stacked cell high efficiency, soft-switched VHF power converter architectures described herein may be applied in an LED driver application without requiring inductors greater than one micro-henry. Likewise a switching AC to DC power converter based on the cell-based architectures described herein may be implemented with no inductors larger than five micro-henry.

Such a small form factor device may be implemented as a stacked cell serial input, parallel out high efficiency fully resonant switching VHF AC to DC power converter further including synchronous rectification at the output. Other features and/or benefits from using a VHF converter in such a small form factor device may include built in FCC emissions filtering, lightning strike protection, a diode-based input rectifier, no need for electrolytic capacitors, VHF operation frequency, little or no DC energy storage while providing substantially pure DC output from an AC source, capable of driving an LED with no visible light flicker, substantially no output ripple, substantially no 2F line frequency being propagated to the output, and the like. A small form factor VHF converter may further include generating an output voltage that is independent of instantaneous input voltage to allow for delivering substantially constant output power throughout an AC line cycle.

By enabling the use of ceramic surface mount capacitors and printed circuit board etched inductors (rather than discrete inductors and/or large capacitors) a VHF power converter shape may result in a substantially planar form. Such a form can readily be integrated into small spaces such as laptop display screens, mobile phones, and the like.

The size benefits of a VHF cell-based power converter as described herein may facilitate providing an AC to DC high isolation converter in a volume less than five US quarter dollar coins (approx. 4,050 cubic millimeters). Other features that may be provided in this small volume may include providing substantially ripple free (arbitrarily small ripple) output, ultra-high efficiency (e.g. greater than 75%), and the like. In a volume of approximately three US quarter dollar coins (approx. 2,430 cubic millimeters), the VHF conversion techniques and architecture described herein may provide a very high power 50 W capable VHF power converter (e.g. for a laptop computer). Alternatively an ultra-small 15 W capable VHF power converter (e.g. for driving an LED) may be provided in a volume smaller than one US quarter dollar coin (approx. 800 cubic millimeters).

Figure 28:
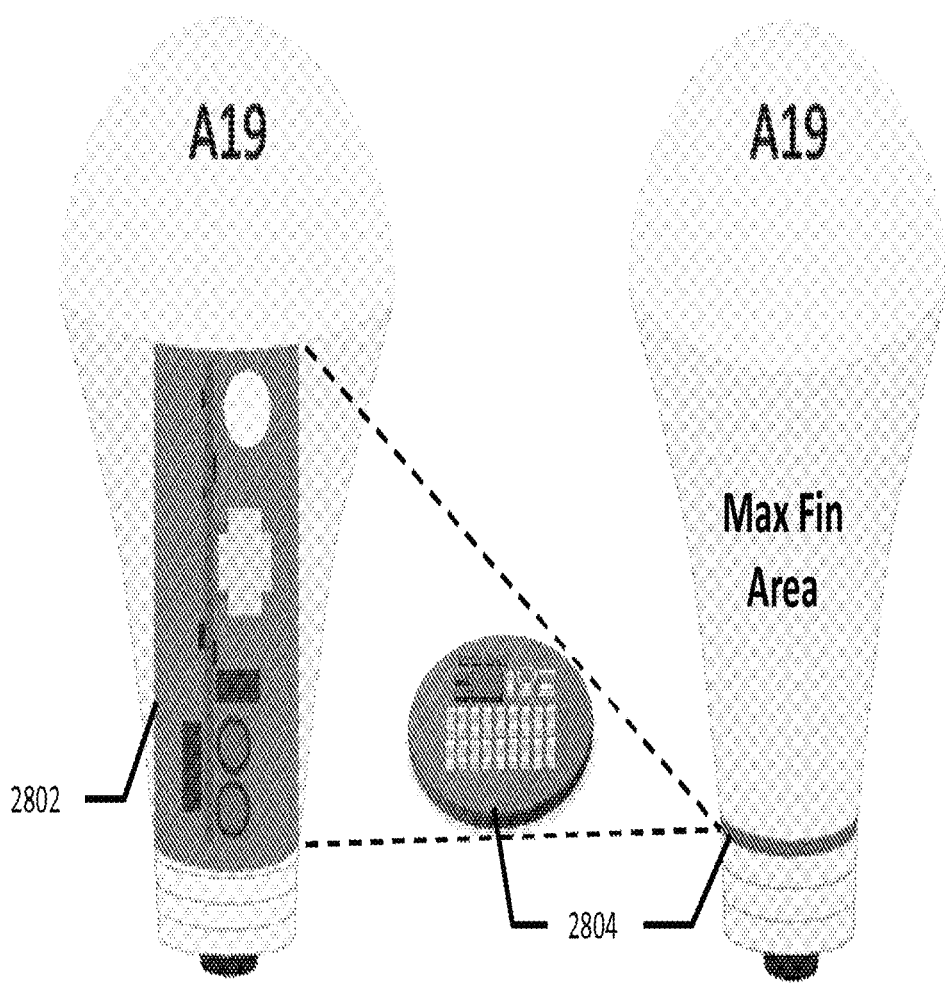
FIG. 28 depicts an application of a VHF converter for replacing an incandescent bulb with a multiple LED light.

LED lighting may be controlled/powered by the inventive VHF converter cell-based architecture described herein. Referring to FIG. 28, a circuit for replacing an incandescent bulb with a multiple LED light 2802 is compared to an LED driver 2804 based on the VHF converter techniques and architecture described herein. Not only is size of the converter substantially reduced, but the space that was previously occupied by the LED driver 2802 can be used for heat sinking/cooling the LEDs thereby enabling much higher potential light output from the same size package (e.g. an A19 style bulb).

LED lighting controllers that may be possible with the VHF cell-based power converter methods and systems described herein may include: an AC to DC VHF converter to pulse-width-modulate an LED; a VHF converter to pulse-width-modulate an LED; a stacked VHF converter to pulse-width-modulate an LED; an AC to DC VHF switching converter to power an LED; a VHF switching power converter to power an LED; a stacked cell VHF converter to power an LED; a power converter operating at greater than 5 MHZ to drive an LED without use of an electrolytic capacitor; cycling on/off a power conversion stage of the VHF converter to control an LED; using a conversion stage of the VHF converter as a pulse-width-modulation mechanism; a stacked-cell series input, parallel output high efficiency soft-switching/fully resonant switching VHF LED power supply including PWM control of the LED with optional power factor correction.

The VHF power converter of the present invention may be used in laptop power supplies, mobile phones, sports equipment, household appliances, LED-based lights, wireless base stations, electric vehicles, radar systems, soldier-carried military field equipment and the like. The VHF power converter described herein may be used with any application where a higher voltage, such as 12V may need to be converted to a lower voltage, such as 3V to power digital electronics and the like. The inventive VHF power converter may have fast transient response and may be configured to accept a very wide range of inputs such as from 12V Direct Current (DC) to 240 V Alternating Current (AC). Note that the voltage references here are merely exemplary and different voltages and current types (e.g. 15 VAC input, 12V output) may be used and/or provided by the VHF converter. Further, the methods and systems of a VHF power converter described herein may provide significant size benefits to product designers by enabling configuration of a very small sized power source for use with electronic devices.

Examples of an electronic device that may receive DC power from the inventive VHF power converter or other power circuit may include a handheld computer, a miniature or wearable device, a portable computer, a desktop computer, a router, an access point, a backup storage device with wireless communications capabilities, a mobile telephone, a music player, a remote control, a global positioning system device, a device that combines the functions of one or more of these devices, and the like.

A laptop may present several opportunities for use of the VHF converter including converting may DC motherboard power to provide various DC voltages as is sometimes needed for operating a processor, bus logic, peripherals, display backlight and the like. Not only are these supplemental power needs met by the inventive VHF converter, but the main power converter from AC line (e.g. to charge the laptop battery) may be provided. The small size of the power converter may require less space than other contemporary solutions. For example, the main AC to DC power supply, that is typically found in-line with the line cord may be made substantially smaller or even eliminated because the VHF power converter may be put inside the laptop or battery enclosure.

Another laptop application is to use the inventive VHF power converter as a source of power for the display (e.g. for a display backlight). This may benefit the quality of the display because the fast transient response offered by the VHF power converter may provide improved display quality, brightness, sharpness, and the like. In addition, the VHF power converter small size requirement may allow it to be built into the display housing (e.g. the laptop fold-up top cover) thereby reducing assembly complexity of the laptop system.

As mentioned herein, the power converter may receive a wide range of inputs for powering low voltage systems mentioned herein and further including devices such as portable radios, two-way radios, televisions, audio equipment, wearable microphones, headsets, virtual reality eyewear, augmented reality headgear, and the like. In addition to these mostly portable devices, other small devices that may be powered from the AC line such as a mobile phone charger, a battery charger, and the like may benefit from application of the inventive VHF converter described herein. Other AC line applications include, without limitation charging a palmtop, a smart phone, a Global Positioning System (GPS) system, electric razor, and the like. In embodiments, the power converter of the present invention may be used for powering devices that range in power from a high-power laptop to a low-power cell phone.

Further, the power converter may be used in wireless security monitoring system, energy saving lamps and other household appliances. The power converter may convert standard AC voltage supply in houses to DC voltages required in wireless security monitoring system, energy saving lamps and other household appliances. The inventive VHF power converter may accept a very wide range of inputs, and hence, it can be employed in different household appliances requiring different voltages. Further, the small size requirement of the VHF power converter may allow it to be built into any household appliance.

The VHF power converter may be used for sports equipment, such as a helmet camera. A helmet camera may also require a variety of voltages, for powering the memory, image sensor, lighting, radio, and the like. An embodiment of the VHF power converter may convert a DC voltage that may be supplied from a battery (e.g. 18V) various DC voltages required in the operation of the helmet camera. By applying the multi-channel capabilities described herein, each load (lighting, sensor, radio, etc.) that requires a different voltage or current for proper operation can be serviced by a single multi-channel converter described herein. Further, because of its small size, the VHF power converter may fit easily into the helmet camera housing and may be readily integrated into a printed circuit board that may include the logic and functional elements powered by the converter.

The inventive VHF power converter may be integrated into a display screen module to provide power for backlighting the display of a laptop or the like. This may benefit the quality of the display because the fast transient response offered by the VHF power converter may provide improved display quality, brightness, sharpness, and the like. In addition, the small size requirement of the VHF power converter may allow it to be built into the display screen module housing, thereby reducing assembly complexity of the display screen module.

The inventive VHF power converter may be integrated into an AC power cord. As mentioned earlier, the inventive VHF power converter may receive a wide range of power inputs. Hence, the AC power cord having the inventive VHF power converter may be connected to nearly any type of power source (e.g. AC line cord, 12V car charger, and the like). In a typical application, line AC power may be converted to low voltages that meet low-voltage safety requirements (e.g. less than 30V). The small size of the power converter may require less space than other contemporary solutions so that a typical 50 W line cord power converter may be disposed in an enclosure no larger than five U.S. quarter dollar coins (approx. 4050 cubic mm).

Mobile phone applications of the VHF power converter include providing the main electronics power from a battery, dedicated power for the phone's display including a backlit display, keypad back lighting, camera flash lamp, and the like. The high degree of integration afforded by the inventive VHF power converter described herein and the simplified PCB-based embedded inductor functionality with which the VHF power converter is compatible may afford direct integration on the main electronics printed circuit board.

The inventive VHF power converter may also be used in LED-based lighting. LED lighting products that are compatible with existing incandescent fixtures need to operate from standard AC line voltage. LED light bulbs include multiple diodes, which use direct current (DC). The inventive VHF power converter may convert standard AC voltage to DC voltage required by diodes in LED light bulbs. In addition, the small size requirement of the VHF power converter may allow it to be built into the base of an LED-based replacement light bulb, thereby reducing assembly complexity of the LED light bulbs and providing a substantial amount of the interior of the bulb for heat sinking the LEDs.

A multi-channel embodiment of the inventive VHF power converter may be used to power LED strings so that each light or group of lights can be individually controlled for brightness, color, on/off (blink), and the like by employing a separate output value (current or voltage) for each light/group of lights. In addition, the inventive VHF power converter may improve design and packaging of the LED strings owing to its small size.

The inventive VHF power converter may also be used in color changing LEDs. The inventive VHF power converter may provide color light intensity control. The inventive VHF power converter may further provide color point maintenance against LED junction temperature change, and limiting LED device temperature to prolong LED lifetime.

The inventive VHF power converter may also be used in a wireless base station. The inventive VHF power converter may convert an input voltage to an output voltage or current required by the wireless base station transceiver. The inventive VHF power converter may benefit low power RF applications through its fast transient response time, RF envelope tracking output, and small size.

The VHF converter may find varied applications in vehicle-based electronics. In an embodiment, the power converter may be used for powering vehicle accessories such as cell phone chargers, GPS Systems, mp3 players, stereo system, and the like that may plug into a 12 VDC vehicle power port. The inventive VHF power converter may provide power to display units of GPS systems. This may result in improved display quality, brightness, sharpness, and the like because of the fast transient response offered by the VHF power converter. In addition, the small size requirement of the VHF power converter may allow it to be built into the display unit, thereby reducing assembly complexity of the GPS system. Owing to the small size, the inventive VHF power converter may be integrated into the cell phone chargers, GPS Systems, mp3 players, and stereo systems in vehicles.

The inventive VHF power converter may also be used in airborne radar. Airborne radar presents unique design challenges, mainly in the installation constraints on the size of the airborne radar. The inventive VHF power converter small size requirement may allow it to be built into the airborne radar, thereby solving installation constraints of the airborne radar. Radar systems may further benefit from the fast transient response ability of the VHF power converter and wide range of output voltage capability, extremely low ripple, high isolation, and the like.

The inventive VHF power converter may also be used in Soldier-carried military field equipment. The inventive VHF power converter may convert an input signal to an output signal (e.g. voltage), as per requirement of a military field equipment, and aid in efficient power management. The military field equipment may include night-vision goggles, laptops, and communication devices such as GPS, sensors, and the like. The small size requirement of the VHF power converter may allow it to be built into the military field equipment, thereby making the military field equipment lightweight, reliable, and portable. In addition, the inventive VHF power converter may provide military equipment designers with a single power converter design that is able to adapt to the power needs of all sorts of military field equipment.

The inventive VHF converter methods and systems described herein may be combined with varactor-based network tuning to support a very large load range. Such a combination may take advantage of varactor control of resonance and VHF on/off switching to facilitate compensation for impedance changes as a function of load.

What is claimed is:

1. A power converter, comprising:
    a plurality of power cells configured to provide a plurality of energy transfer paths from a voltage-varying input of the plurality of power cells to an output of the plurality of power cells; and
    one or more energy storage networks at an input of at least one of the plurality of power cells,
    wherein the plurality of power cells is configured to deliver a first fraction of available input energy to the one or more energy storage networks, deliver a second fraction of available input energy to the output of the plurality of power cells, and adjust the first fraction and second fraction for facilitating outputting a substantially constant output of the plurality of power cells and for controlling the energy drawn from the voltage-varying input of the plurality of power cells,
    wherein the plurality of power cells comprises a first power cell and a second power cell,
    wherein an input of the first power cell is connected in series with an input of the second power cell,
    wherein the one or more energy storage networks comprises a capacitor, and
    wherein the capacitor is connected to a terminal between the input of the first power cell and the input of the second power cell, and
    wherein the power converter further comprises a switch configured to bypass the capacitor when a voltage of the voltage-varying input is less than a voltage across the capacitor.

2. The power converter of claim 1, wherein an output of the first power cell is connected in parallel with an output of the second power cell.

3. The power converter of claim 1, wherein the first power cell is configured to control the energy drawn from the voltage-varying input.

4. The power converter of claim 3, wherein the second power cell is configured to control the output of the plurality of power cells to be substantially constant.

5. The power converter of claim 1, wherein the plurality of power cells has a switching frequency higher than 1 MHz.

6. The power converter of claim 1, further comprising a rectifier connected to an input of the plurality of power cells.

7. A power converter, comprising:
    a plurality of power cells providing a plurality of energy transfer paths from a time-varying input of the plurality of power cells to an output of the plurality of power cells;
    at least one energy storage network coupled to an input of at least one power cell of the plurality of power cells; and
    a controller configured to control at least one first power cell of the plurality of power cells to control power factor of the power converter, and control at least one second power cell of the plurality of power cells to regulate the output of the plurality of power cells,
    wherein the plurality of power cells comprises a first power cell and a second power cell, wherein an input of the first power cell is connected in series with an input of the second power cell,
    wherein the at least one energy storage network comprises a capacitor,
    wherein the capacitor is connected to a terminal between the input of the first power cell and the input of the second power cell, and wherein the power converter further comprises a switch configured to bypass the capacitor when a voltage of the time-varying input is less than a voltage across the capacitor.

8. The power converter of claim 7, wherein an output of the first power cell is connected in parallel with an output of the second power cell.

9. The power converter of claim 7, wherein the first power cell is configured to control the power factor.

10. The power converter of claim 9, wherein the second power cell is configured to regulate the output of the plurality of power cells.

11. The power converter of claim 7, wherein the plurality of power cells has a switching frequency higher than 1 MHz.

12. The power converter of claim 7, further comprising a rectifier connected to an input of the plurality of power cells.

* * * * *